(12) United States Patent
Petrovskaya et al.

(10) Patent No.: US 10,055,892 B2
(45) Date of Patent: Aug. 21, 2018

(54) ACTIVE REGION DETERMINATION FOR HEAD MOUNTED DISPLAYS

(71) Applicant: Eonite Perception Inc., Palo Alto, CA (US)

(72) Inventors: Anna Petrovskaya, Los Altos, CA (US); Peter Varvak, Los Altos, CA (US); Anton Geraschenko, Palo Alto, CA (US); Dylan Koenig, Palo Alto, CA (US); Youssri Helmy, Los Altos Hills, CA (US)

(73) Assignee: Eonite Perception Inc., Palo Alto, CA (US)

( * ) Notice: Subject to any disclaimer, the term of this patent is extended or adjusted under 35 U.S.C. 154(b) by 0 days.

(21) Appl. No.: 15/406,642

(22) Filed: Jan. 13, 2017

(65) Prior Publication Data

US 2017/0205892 A1    Jul. 20, 2017

Related U.S. Application Data

(60) Provisional application No. 62/279,604, filed on Jan. 15, 2016, provisional application No. 62/279,615, filed on Jan. 15, 2016.

(51) Int. Cl.
*G06T 19/00*    (2011.01)
*G06F 3/01*    (2006.01)
(Continued)

(52) U.S. Cl.
CPC ........ *G06T 19/006* (2013.01); *G02B 27/0101* (2013.01); *G06F 1/163* (2013.01);
(Continued)

(58) Field of Classification Search
None
See application file for complete search history.

(56) References Cited

U.S. PATENT DOCUMENTS 5,832,212 A    11/1998    Cragun et al.
6,922,701 B1    7/2005    Ananian et al.
(Continued)

OTHER PUBLICATIONS

Anna Petrovskaya, PhD Thesis, "Towards Dependable Robotic Perception", avaialble at (http://cs.stanford.edu/people/petrovsk/dn/publications/anya-thesis.pdf) (retrieved Oct. 22, 2014), Jun. 2011.
(Continued)

*Primary Examiner* — Michelle Chin

(57) ABSTRACT

Some augmented reality (AR) and virtual reality (VR) applications may require that an "activity region" be defined prior to their use. For example, a user performing a video conferencing application or playing a game may need to identify an appropriate space in which they may walk and gesture while wearing a Head Mounted Display without causing injury. This may be particularly important in VR applications where, e.g., the user's vision is completely obscured by the VR display, and/or the user will not see their actual environment as the user moves around. Various embodiments provide systems and methods for anticipating, defining, and applying the active region. In some embodiments, the system may represent real-world obstacles to the user in the user's field of view, e.g., outlining the contour of the problematic object to call the user's attention to the object's presence in the active region.

19 Claims, 33 Drawing Sheets

(51) Int. Cl.
| | |
|---|---|
| *G06F 3/0346* | (2013.01) |
| *G06F 1/16* | (2006.01) |
| *G06T 15/04* | (2011.01) |
| *G06T 17/20* | (2006.01) |
| *G06F 3/00* | (2006.01) |
| *G06F 3/03* | (2006.01) |
| *G02B 27/01* | (2006.01) |

(52) U.S. Cl.
CPC .............. *G06F 3/005* (2013.01); *G06F 3/012* (2013.01); *G06F 3/017* (2013.01); *G06F 3/0308* (2013.01); *G06F 3/0346* (2013.01); *G06T 15/04* (2013.01); *G06T 17/20* (2013.01); *G02B 2027/014* (2013.01)

(56) References Cited

U.S. PATENT DOCUMENTS

| | | |
|---|---|---|
| 7,313,825 B2 | 12/2007 | Redlich et al. |
| 7,382,244 B1 | 6/2008 | Donovan et al. |
| 7,546,334 B2 | 6/2009 | Redlich et al. |
| 7,583,275 B2 | 9/2009 | Neumann et al. |
| 8,275,635 B2 | 9/2012 | Stivoric et al. |
| 8,452,080 B2 | 5/2013 | Endgedal |
| 8,521,128 B1 | 8/2013 | Welsh et al. |
| 8,620,532 B2 | 12/2013 | Curtis et al. |
| 8,839,121 B2 | 9/2014 | Bertolami et al. |
| 8,933,931 B2 | 1/2015 | Balan et al. |
| 9,124,635 B2 | 9/2015 | Robinson et al. |
| 9,304,970 B2 | 4/2016 | Wirola et al. |
| 9,754,419 B2 | 11/2017 | Petrovskaya et al. |
| 9,916,002 B2 | 3/2018 | Petrovskaya et al. |
| 2002/0013675 A1 | 1/2002 | Knoll et al. |
| 2004/0107356 A1 | 6/2004 | Shamoon et al. |
| 2005/0132070 A1 | 6/2005 | Redlich et al. |
| 2006/0238380 A1 | 10/2006 | Kimchi et al. |
| 2008/0195956 A1 | 8/2008 | Baron et al. |
| 2009/0047972 A1 | 2/2009 | Neeraj |
| 2009/0104585 A1 | 4/2009 | Diangelo et al. |
| 2009/0104686 A1 | 4/2009 | Lee et al. |
| 2010/0060632 A1 | 3/2010 | Lefevre et al. |
| 2010/0103196 A1 | 4/2010 | Kumar et al. |
| 2010/0166294 A1 | 7/2010 | Marrion et al. |
| 2010/0182340 A1 | 7/2010 | Bachelder et al. |
| 2011/0046925 A1 | 2/2011 | Bidard et al. |
| 2011/0102460 A1 | 5/2011 | Parker |
| 2011/0199479 A1 | 8/2011 | Waldman |
| 2011/0221771 A1 | 9/2011 | Cramer et al. |
| 2011/0286631 A1 | 11/2011 | Wagner |
| 2011/0313779 A1 | 12/2011 | Herzog et al. |
| 2012/0197439 A1 | 8/2012 | Wang et al. |
| 2012/0315884 A1 | 12/2012 | Forutanpour et al. |
| 2012/0329486 A1 | 12/2012 | Gits |
| 2013/0026224 A1 | 1/2013 | Ganick et al. |
| 2013/0042296 A1 | 2/2013 | Hastings et al. |
| 2013/0044130 A1 | 2/2013 | Geisner et al. |
| 2013/0101163 A1 | 4/2013 | Gupta et al. |
| 2013/0116968 A1 | 5/2013 | Wirola et al. |
| 2013/0129230 A1 | 5/2013 | Shotton et al. |
| 2013/0132477 A1 | 5/2013 | Bosworth |
| 2013/0132488 A1 | 5/2013 | Bosworth |
| 2013/0174213 A1 | 7/2013 | Liu et al. |
| 2013/0182891 A1 | 7/2013 | Ling |
| 2013/0222369 A1 | 8/2013 | Huston et al. |
| 2013/0242106 A1 | 9/2013 | Leppanen et al. |
| 2014/0002444 A1 | 1/2014 | Bennett et al. |
| 2014/0204077 A1 | 7/2014 | Kamuda et al. |
| 2014/0210710 A1 | 7/2014 | Shin et al. |
| 2014/0241614 A1 | 8/2014 | Lee |
| 2014/0254934 A1 | 9/2014 | Laxminarayana Bhat et al. |
| 2014/0267234 A1 | 9/2014 | Hook et al. |
| 2014/0276242 A1 | 9/2014 | Chen et al. |
| 2014/0292645 A1 | 10/2014 | Tsurumi |
| 2014/0307798 A1 | 10/2014 | Taubman et al. |
| 2014/0323148 A1 | 10/2014 | Schmalstieg et al. |
| 2014/0324517 A1 | 10/2014 | Harris |
| 2014/0357290 A1 | 12/2014 | Grabner et al. |
| 2014/0368532 A1 | 12/2014 | Keane |
| 2015/0143459 A1 | 5/2015 | Molnar et al. |
| 2015/0204676 A1 | 7/2015 | Zhang et al. |
| 2015/0228114 A1* | 8/2015 | Shapira .................. G06T 17/10 345/421 |
| 2015/0287246 A1 | 10/2015 | Huston et al. |
| 2015/0296170 A1 | 10/2015 | Farrell et al. |
| 2015/0317518 A1* | 11/2015 | Fujimaki ................ G08C 17/02 345/633 |
| 2015/0332439 A1 | 11/2015 | Zhang et al. |
| 2016/0026253 A1 | 1/2016 | Bradski |
| 2016/0080642 A1 | 3/2016 | Jung et al. |
| 2016/0110560 A1 | 4/2016 | Forte et al. |
| 2016/0180590 A1 | 6/2016 | Kamhi |
| 2016/0189419 A1 | 6/2016 | Fakih |
| 2016/0260260 A1 | 11/2016 | Fei et al. |
| 2016/0335275 A1 | 11/2016 | Williams et al. |
| 2016/0335497 A1 | 11/2016 | Williams et al. |
| 2016/0335802 A1 | 11/2016 | Bradski |
| 2016/0337599 A1 | 11/2016 | Williams et al. |
| 2016/0358485 A1* | 12/2016 | Sommer .................. G08G 9/02 |
| 2016/0360970 A1 | 12/2016 | Tzvieli et al. |

OTHER PUBLICATIONS

B. Curless and M. Levoy, "A Volumetric Method for Building Complex Models From Range Images", in proceedings of the 23rd annual conference on Computer Graphics and Interactive Techniques, pp. 303-312, ACM, 1996.

W. E. Lorensen and H. E. Cline, "Marching Cubes: A High Resolution 3D Surface Construction Algorithm", in ACM Siggraph Computer Graphics, vol. 21, pp. 163-169, ACM, 1987.

International Search Report & Written Opinion, PCT/US2015/60744; dated Feb. 2, 2016; 8 Pages.

* cited by examiner

Input: initial camera pose $T_0$

1 foreach *new frame of data $D_t$* do
2     begin Prediction Step:
3         Compute the prediction $\overline{bel}_t$
4         Let $T_t^- := MP(\overline{bel}_t)$ be the most likely pose.
5     end
6     begin Measurement Update:
7         Prepare model and data
8         repeat starting with $T_t^{(0)} := T_t^-$, $bel_t^{(0)} := \overline{bel}_t$, and $i := 0$
9             Compute correspondences using the most recent estimate of the camera pose $T_t^{(i)}$.     E-STEP
10        Refine the estimate of belief $bel_t^{(i)}$ to obtain $bel_t^{(i+1)}$ assuming the correspondences are fixed.     M-STEP
11        Let $T_t^{(i+1)} := MP(bel_t^{(i+1)})$ and $i := i + 1$.
12        until *convergence*
13     end
14     Provide the new pose estimate $T_t := T_t^{(i)}$ to the mapper or the AR device.
15 end

*FIG. 13*

Example Scaling Series algorithm for belief estimation.

Input: $V_0$ - initial uncertainty region, $\mathcal{D}$ - data set, $M$ - number of particles per $\delta$-neighborhood, $\delta_*$ - terminal value of $\delta$.

1: $\delta_0 \leftarrow Radius(V_0)$
2: $zoom \leftarrow 2^{-1/dimX}$
3: $N \leftarrow \lfloor \log_2(Volume(\mathcal{S}_{\delta_0})/Volume(\mathcal{S}_{\delta_*})) \rfloor$
4: for $n = 1$ to $N$ do
5:    $\delta_n \leftarrow zoom \cdot \delta_{n-1}$
6:    $\tau_n \leftarrow (\delta_n/\delta_*)^2$
7:    $\overline{\mathcal{X}}_n \leftarrow$ Even_Density_Cover$(V_{n-1}, M)$
8:    $\mathcal{W}_n \leftarrow$ Importance_Weights$(\overline{\mathcal{X}}_n, \tau_n, \mathcal{D})$
9:    $\mathcal{X}_n \leftarrow$ Prune$(\overline{\mathcal{X}}_n, \mathcal{W}_n)$
10:   $V_n \leftarrow$ Union_Delta_Neighborhoods$(\mathcal{X}_n, \delta_n)$
11: end for
12: $\mathcal{X} \leftarrow$ Even_Density_Cover$(V_N, M)$
13: $\mathcal{W} \leftarrow$ Importance_Weights$(\mathcal{X}, 1, \mathcal{D})$

Output: $(\mathcal{X}, \mathcal{W})$ - a weighted particle set approximating the belief.

*FIG. 16*

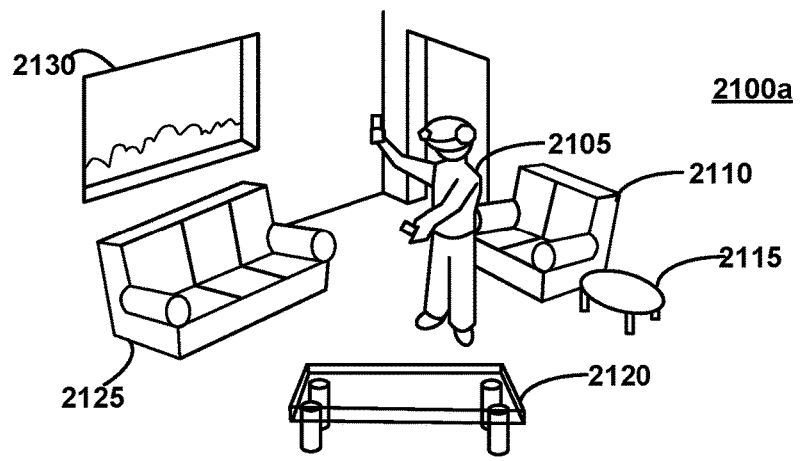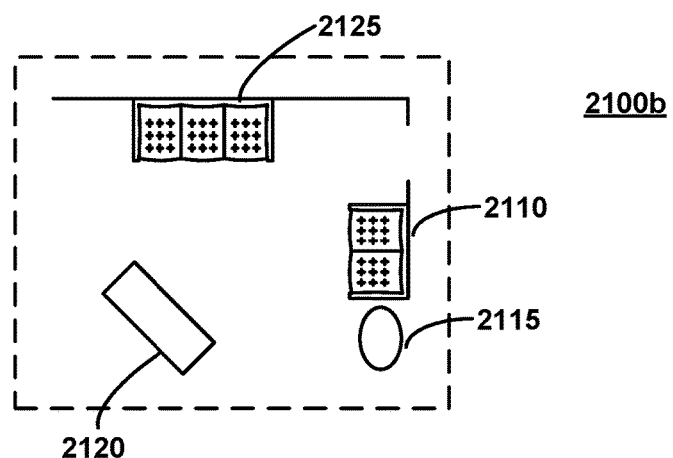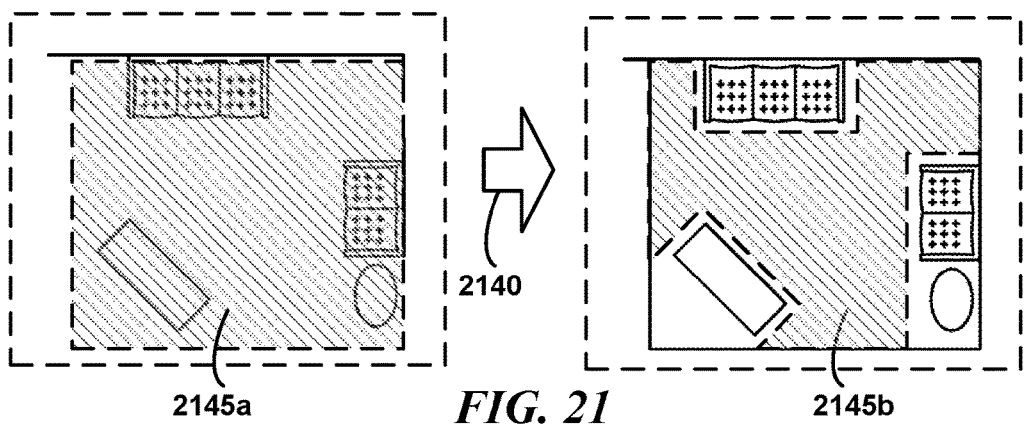
*FIG. 21*

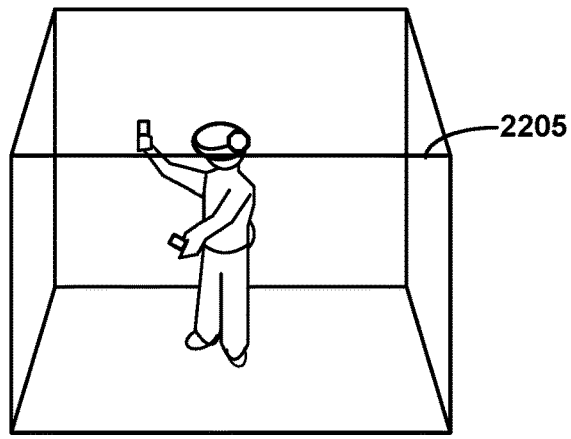
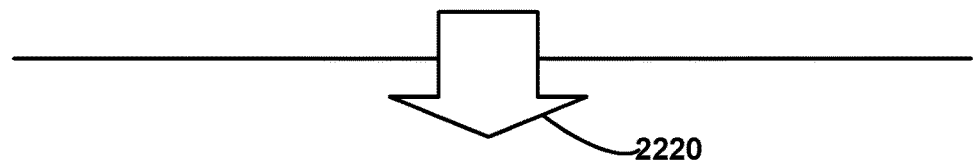
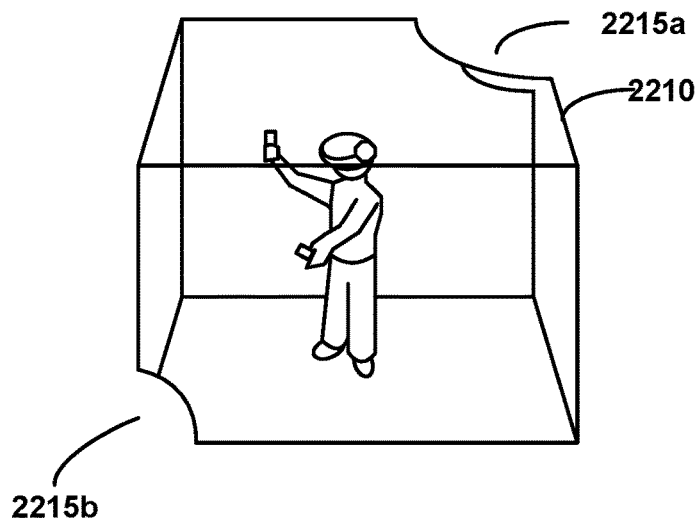
*FIG. 22*

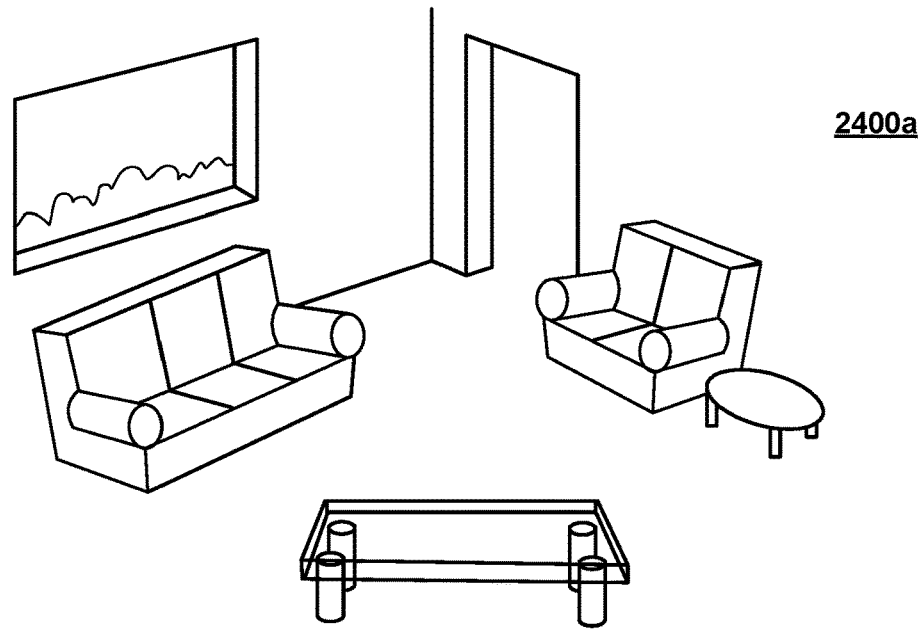
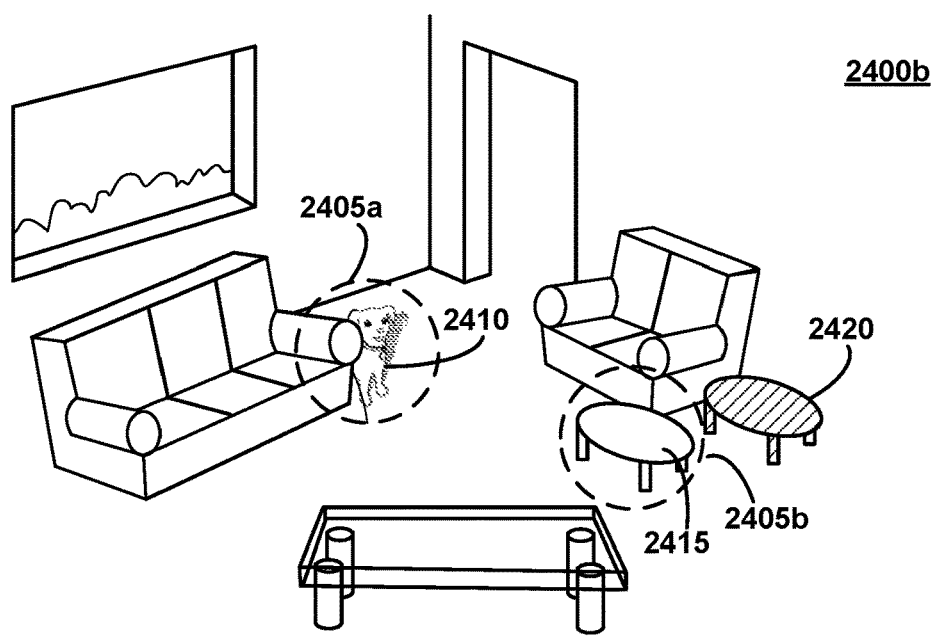
FIG. 24

ACTIVE REGION DETERMINATION FOR HEAD MOUNTED DISPLAYS

CROSS-REFERENCE TO RELATED APPLICATIONS

This application claims the benefit of and priority to U.S. Provisional Patent Application No. 62/279,604 filed Jan. 15, 2016, as well as U.S. Provisional Patent Application No. 62/279,615 filed Jan. 15, 2016, each of which are incorporated by reference herein in their entireties for all purposes. This application also incorporates herein by reference in their entireties for all purposes U.S. Provisional Patent Application No. 62/080,400 filed Nov. 16, 2014, U.S. Provisional Patent Application No. 62/080,983 filed Nov. 17, 2014, U.S. Provisional Patent Application No. 62/121,486, filed Feb. 26, 2015, as well as U.S. Non-Provisional application Ser. No. 15/054,082 filed Feb. 25, 2016.

TECHNICAL FIELD

Various of the disclosed embodiments relate to optimizations and improvements for head mounted displays.

BACKGROUND

Head Mounted Displays (HMDs) are becoming increasingly popular for augmented reality (AR) and virtual reality (VR) applications. While many AR systems provide "see-through" transparent or translucent displays upon which to project virtual objects, many VR systems instead employ opaque, enclosed screens. These enclosed screens may completely obscure the user's field of view of the real world. Indeed, eliminating the user's perception of the real world may be integral to a successful VR experience.

Unfortunately, such an opaque view may be dangerous to the user. Particularly, a user engaged in an AR or VR experience using such a headset is likely unaware of the real-world objects in their surrounding. Stepping upon or colliding with such objects may injure the user. Even when such objects are absent, the user may still fail to fully enjoy or participate in the AR or VR experience, as they are constantly in fear of their real-world surroundings. While one could demarcate a cage-like space, or dedicate an entire room to the AR or VR experience, this is likely impractical, and certainly inimical to the design goals of most AR experiences.

Accordingly, there exists a need for systems and methods to easily determine and monitor a safe region within which the user may engage in AR or VR headset activities without fear of collisions. Ideally, such systems and methods would be suitable for headsets whether they employed transparent, translucent, or opaque fields of view. Additionally, such solutions should be sufficiently precise that they can readily ascertain even subtle changes to the environment that may present an unexpected danger to the user.

BRIEF DESCRIPTION OF THE DRAWINGS

Various of the disclosed embodiments may be better understood by referring to the following Detailed Description in conjunction with the accompanying drawings, in which like reference numerals indicate identical or functionally similar elements:

FIG. 13 is a pseudocode listing reflecting one possible Estimation Maximization algorithm as may be implemented in some embodiments;

FIG. 16 is a pseudocode listing reflecting one possible Scaling Series algorithm implementation as may be implemented in some embodiments;

FIG. 21 is an example environment with illustrations of the activity region as may be constructed in accordance with some embodiments;

FIG. 22 illustrates the progressive construction of an activity region as may occur in some embodiments;

FIG. 24 is a perspective view of a real-world environment during an AR application, wherein displaced and dynamic objects are highlighted, as may occur in some embodiments;

Figure 1:
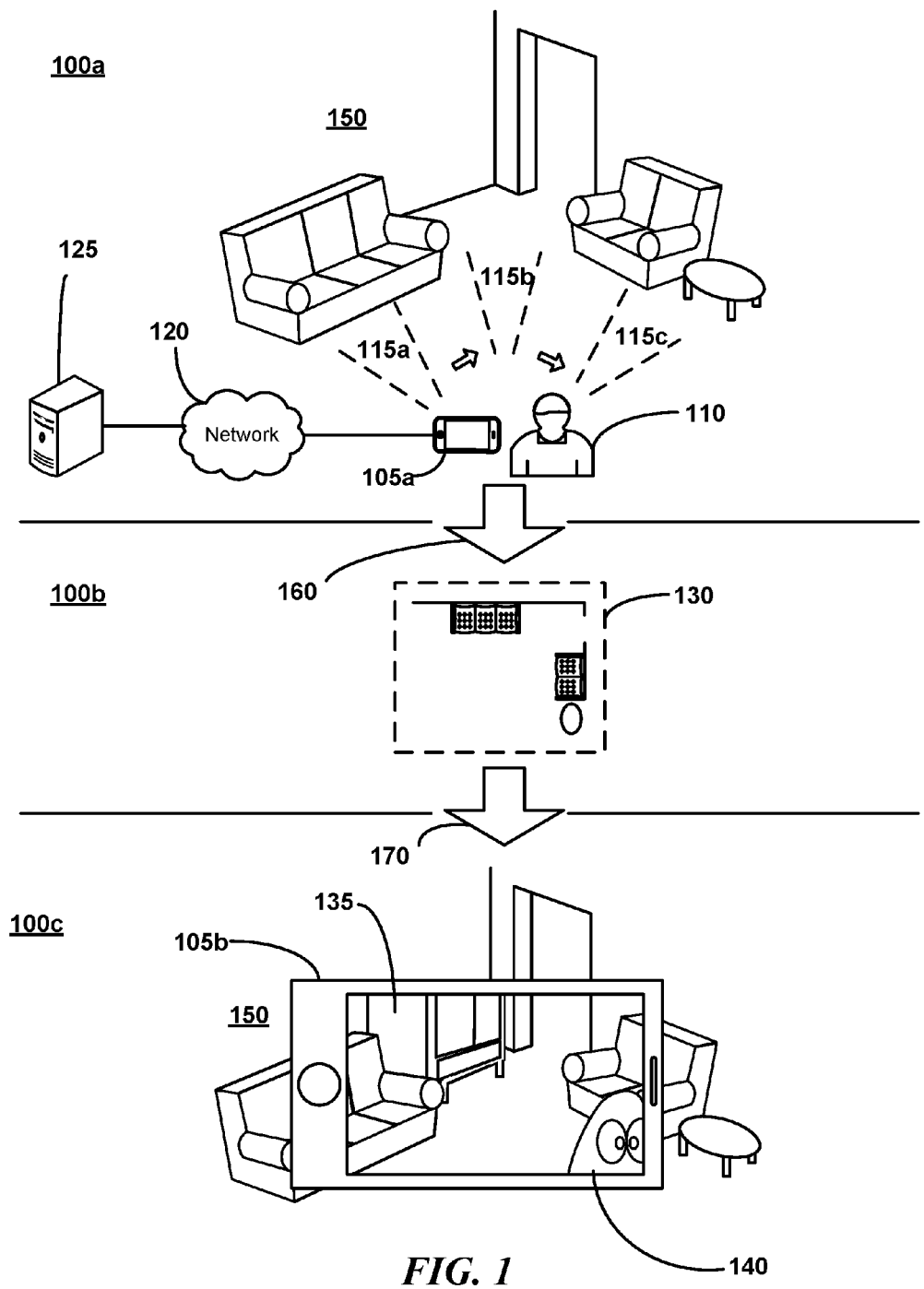
FIG. 1 is a conceptual diagram illustrating an overview of environment data capture, model creation, and model application as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments.

DETAILED DESCRIPTION

Various of the disclosed embodiments relate to optimizations and improvements for head-mounted displays. Particularly, various embodiments determine an "activity region" (also referred to herein as an "active region") around the user. The user may move within this region during the VR or AR application without fear of unexpectedly encountering an object. The user or the system may determine the active region initially, modify it to suit various exceptions, and then monitor the region during the experience to determine if any foreign objects appear. For example, a user performing a video conferencing application or playing a game may need to identify an appropriate space in which they may walk and gesture while wearing the HMD without causing injury. This may be particularly important in VR applications where, e.g., the VR display completely obscures the user's vision, and/or the user will not see their actual environment as the user moves around. Thus, the HMD may be actively acquiring depth data during the application, to supplement the user experience so as to avoid such collisions (e.g., halting the VR experience to present a warning when an object enters the active region unexpectedly).

Some embodiments may apply to opaque or "non-see-through" HMDs (such as, e.g., Oculus™, HTC™, home-made cardboard systems, etc.). These systems may include a depth sensor, alone or integrated, e.g., with an RGBD camera. At the beginning of a user session, the system may ask/guide the user to look around (thereby moving the depth sensor) so as to generate a terrain map. In some embodiments, this initial inspection may itself be a preliminary AR experience, with the system providing virtual object cues to the user to guide the creation of the terrain map. The active region may simply be a portion of the floor identified in this terrain map, or may also include a 3D volume (each referred to as an "activity region" or "active region" herein). In some embodiments, the system may emphasize the floor when directing the user, anticipating more obstacles at that location than, e.g., at eye level.

Following this initial determination, the user may then be allowed to walk within the activity region while the application runs. If the user moves too close to an obstacle the system may warn the user or adjust the VR/AR application's behavior accordingly. In some embodiments, this behavior may be combined with previously built maps of the environment, to show the user if there is something out of place. The system may allow the user to either move problematic objects out of the way or to leave them and remap their environment. If dynamic obstacles appear in the user's path, the system may flag the object to the user and/or adjust the application's behavior accordingly. In some embodiments, the system may represent real-world obstacles to the user in the user's field of view, e.g., outlining the contour of the problematic object to call the user's attention to its presence.

Some of the embodiments may be enabled by recently developed technology, e.g., the high fidelity and more efficient systems and methods presented in U.S. Provisional Patent Application No. 62/080,400 and U.S. Provisional Patent Application No. 62/080,983. Accurate mapping and localization may facilitate commercial and social interactions that would otherwise be unfeasible.

1. Example AR System Overview—Example System Topology

Various of the disclosed embodiments include systems and methods which provide or facilitate an augmented reality, and possibly in some instances virtual reality, experiences. Augmented reality may include any application presenting both virtual and real-world objects in a user's field of view as the user interacts with the real-world. For example, the user may hold a tablet, headpiece, head-mounted-display, or other device capable of capturing an image and presenting it on a screen, or capable of rendering an image in the user's field of view (e.g., projecting images upon a transparency between the user and the real-world environment), projecting an image upon a user's eyes (e.g., upon a contact lens), but more generally, in any situation wherein virtual images may be presented to a user in a real-world context. These virtual objects may exist persistently in space and time in a fashion analogous to real objects. For example, as the user scans a room, the object may reappear in the user's field of view in a position and orientation similar to a real-world object.

FIG. 1 is a conceptual diagram illustrating an overview of environment data capture, model creation, and model application as may be relevant to some embodiments. Initially 100a, a user 110 may scan a capture device 105a (illustrated here as a device similar to that depicted in FIG. 4 and discussed in greater detail herein) about an environment 150. The capture device 105a may include a depth sensor and may additionally include a camera for capturing photographic images (e.g., some suitable devices for various embodiments include a Kinect® sensor, a Senz3D® sensor, ASUS Xtion PRO®, etc.). Generally, a "camera" as referenced herein refers to a device able to capture depth and/or photographic images. As the user 110 moves the capture device 105a, the capture device 105a may acquire a plurality of depth frames 115a, 115b, 115c using the depth sensor. Each depth frame may provide depth values for each point in the capture device's 105a field of view. This raw data may be recorded on the capture device 105a in a data log (including, e.g., depth, RGB, and IMU data) as the user walks through and/or scans the environment 150. The data log may be a file stored on the capture device 105a. The capture device 105a may capture both shape and color information into a form suitable for storage in the log. In some embodiments, the capture device 105a may transmit the captured data directly to a remote system 125 (e.g., a laptop computer, or server, or virtual server in the "cloud", or multiple servers e.g. in the "cloud") across a network 120 (though depicted here as communicating across a network, one will recognize that a portable memory, e.g., a USB memory stick, may also be used). In some embodiments, the data may be transmitted in lieu of local storage on the capture device 105a. Remote system 125 may be at the same location or a different location as user 110. An application running on the capture device 105a or on a remote system 125 in communication with the capture device 105a via a network 120 may integrate 160 the frames in the data log to form a three-dimensional internal model representation 130 (e.g., one or more vertex meshes represented here in a top-down view 100b). This integration, also referred to as "mapping" herein, may be performed on the capture device 105a or on the remote system 125 or on a combination of the two. The capture device 105a may also acquire a photographic image with each depth frame, e.g., to generate textures for the map as described herein.

An augmented reality (AR) device 105b (which may be the same as the capture device 105a) may then use 170 the model 130 in conjunction with incoming depth frame data to present an augmented reality experience 100c. For example, a user (perhaps the same user as user 110) may hold the AR device 105b in view of the environment 150. As real-time RGB images are captured of the environment 150 and displayed on the AR device 105b, the AR system may supplement the images with virtual elements (the real-time images may be converted to a textured mesh in some embodiments as described herein). For example, here a virtual piece of furniture 135 appears behind a real-world sofa. Similarly, a virtual character 140 is presented in the scene as though it were standing in the real-world environment (rotating the device to the right and downward may bring the character fully into view). The AR device 105b may have more than one camera (e.g. to provide a stereoscopic experience) and the AR system 105b may modify each separate camera image mutatis mutandis (though the capture device 105a, e.g., may have had only one camera).

The model 130 may also be used in a standalone capacity, e.g., for creating a virtual world mimicking the real-world environment, or for performing measurements of the real-world environment independent of any augmented reality application. Though depicted here in a home environment, one will recognize that the same systems and methods may be applied in other settings, e.g., an office or industrial environments, inside an animal body, etc.

In order to display virtual objects (such as virtual piece of furniture 135 and virtual character 140) faithfully to the user, some embodiments establish: (a) how the camera(s) on the AR device 105b are positioned with respect to the model 130, or object, or some static reference coordinate system (referred to herein as "world coordinates"). Some embodiments also establish (b) the 3D shape of the surroundings to perform various graphics processing applications, e.g., to properly depict occlusions (of virtual objects by real objects, or vice versa), to render shadows properly (e.g., as depicted for virtual piece of furniture 135 in FIG. 1), perform an Artificial Intelligence operation, etc. Problem (a) is also referred to as the camera localization or pose estimation, e.g., determining position and orientation of the camera in 3D space.

Various of the disclosed embodiments employ superior methods for resolving how the camera (eyes) are positioned with respect to the model or some static reference coordinate system ("world coordinates"). These embodiments provide superior accuracy of localization, which mitigate virtual object jitter and misplacement—undesirable artifacts that may destroy the illusion to the user of a virtual object being positioned in real space. Whereas prior art devices often rely exclusively on special markers to avoid these issues, those markers need to be embedded in the environment, and thus, are often cumbersome to use. Such markers may also restrict the scope of AR functions which may be performed.

In contrast to the previous AR solutions, many of the disclosed embodiments provide, e.g.: operation in real time; operation without user intervention; display of virtual objects in a correct location and without jitter; no modification of the environment or other cumbersome preparations; occlusions and shadows on-the-fly; presentation to a user in an easy-to-use package (e.g. smart phone, tablet, or goggles); can be produced at consumer-friendly prices; etc. One will recognize that some embodiments may present only some or none of these features.

Figure 2:
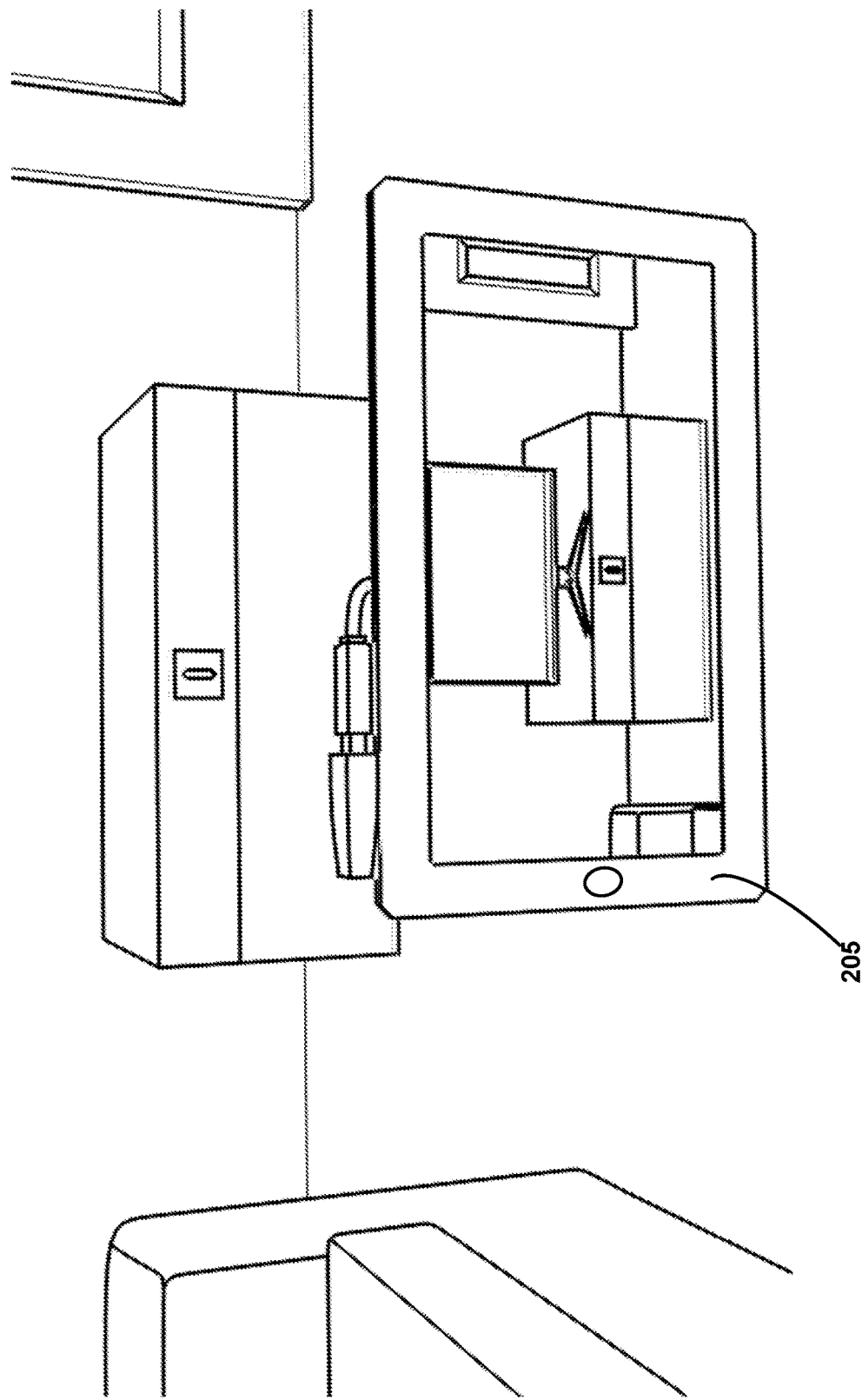
FIG. 2 is an image of an example tablet device implementing a portion of an AR system as may be used in some embodiments.

As an example, FIG. 2 is a recreation of a photograph of an embodiment in operation, wherein a virtual television playing a home video is depicted atop a real-world piece of furniture in an AR device 205. The TV does not actually exist in the real-world, but a user viewing their surroundings with AR device 205, may not be able to distinguish between real and virtual objects around them.

Figure 3:
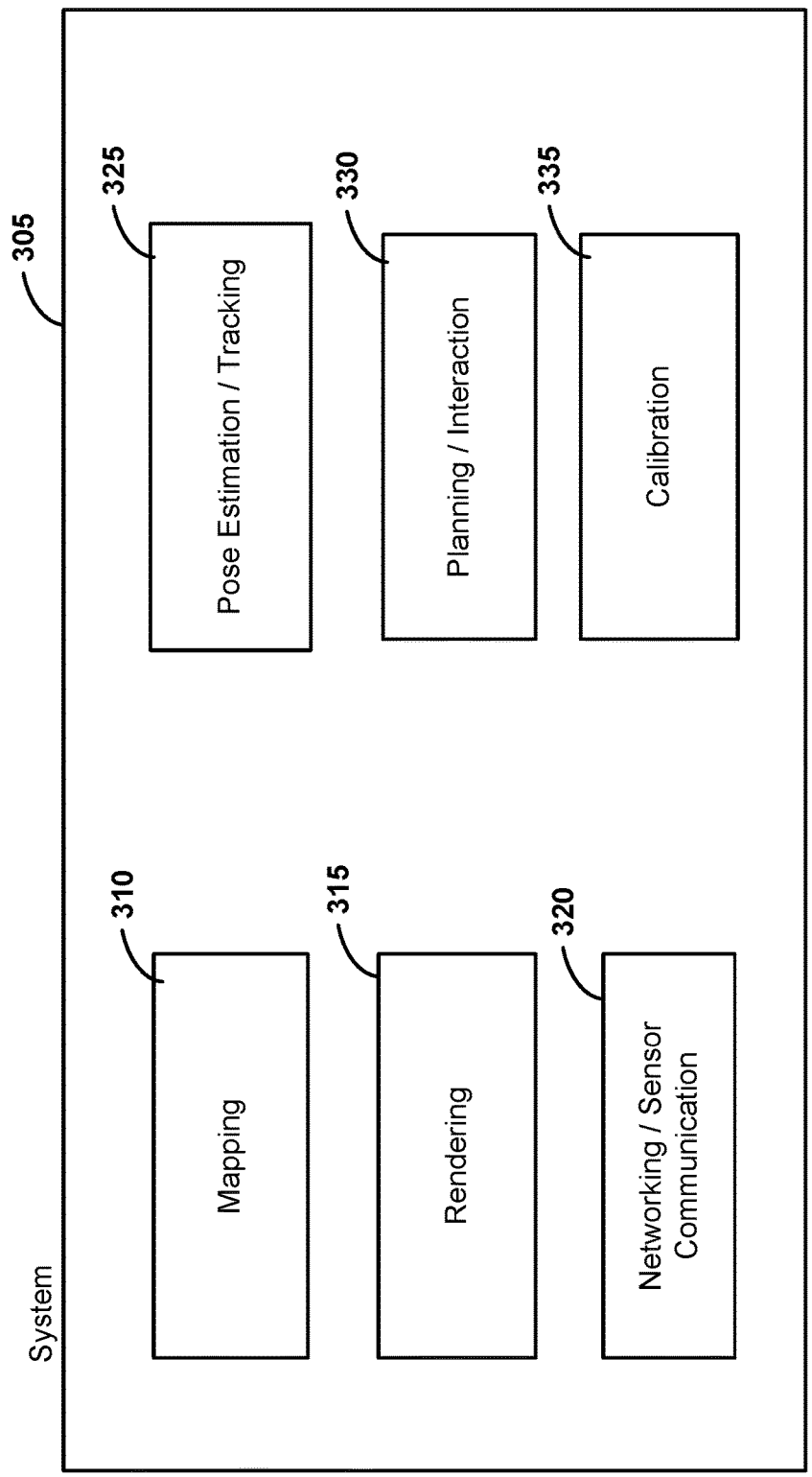
FIG. 3 is a block diagram of various components appearing in a system as may be implemented in some embodiments.

FIG. 3 is a block diagram of various components appearing in a mapping and AR system as may be implemented in some embodiments (though the mapping and AR systems may exist separately in some embodiments). These operational components may consist of the following sub-systems: mapping 310; pose estimation/tracking 325; rendering 315; planning/interaction 330; networking/sensor communication 320; and calibration 335. Though depicted here as components of a single overall system 305, one will recognize that the subcomponents may be separated into separate computer systems (e.g., servers in a "cloud" network), processing functions, and/or devices. For example, one system may comprise a capture device. A second system may receive the depth frames and position information form the capture device and implement a mapping component 310 to generate a model. A third system may then implement the remaining components. One will readily recognize alternative divisions of functionality. Additionally, some embodiments are exclusive to the functions and/or structures associated with one or more modules.

Similarly, though tracking is discussed herein with reference to a user device to facilitate explanation, one will recognize that some embodiments may implement applications using data captured and processed using the disclosed techniques in alternate form factors. As just one example, depth or other sensors may be placed about a user's house and a device for projecting images on a contact lens provided. Data captured using the disclosed techniques may then be used to produce an AR experience for the user by projecting the appropriate image onto the contact lens. Third party devices may capture the depth frames of a user's environment for mapping, while the user's personal device performs the AR functions. Accordingly, though components may be discussed together herein to facilitate understanding, one will understand that the described functionality may appear across different functional divisions and form factors.

2. Example Combined Capture and Augmented Reality Device

Figure 4:
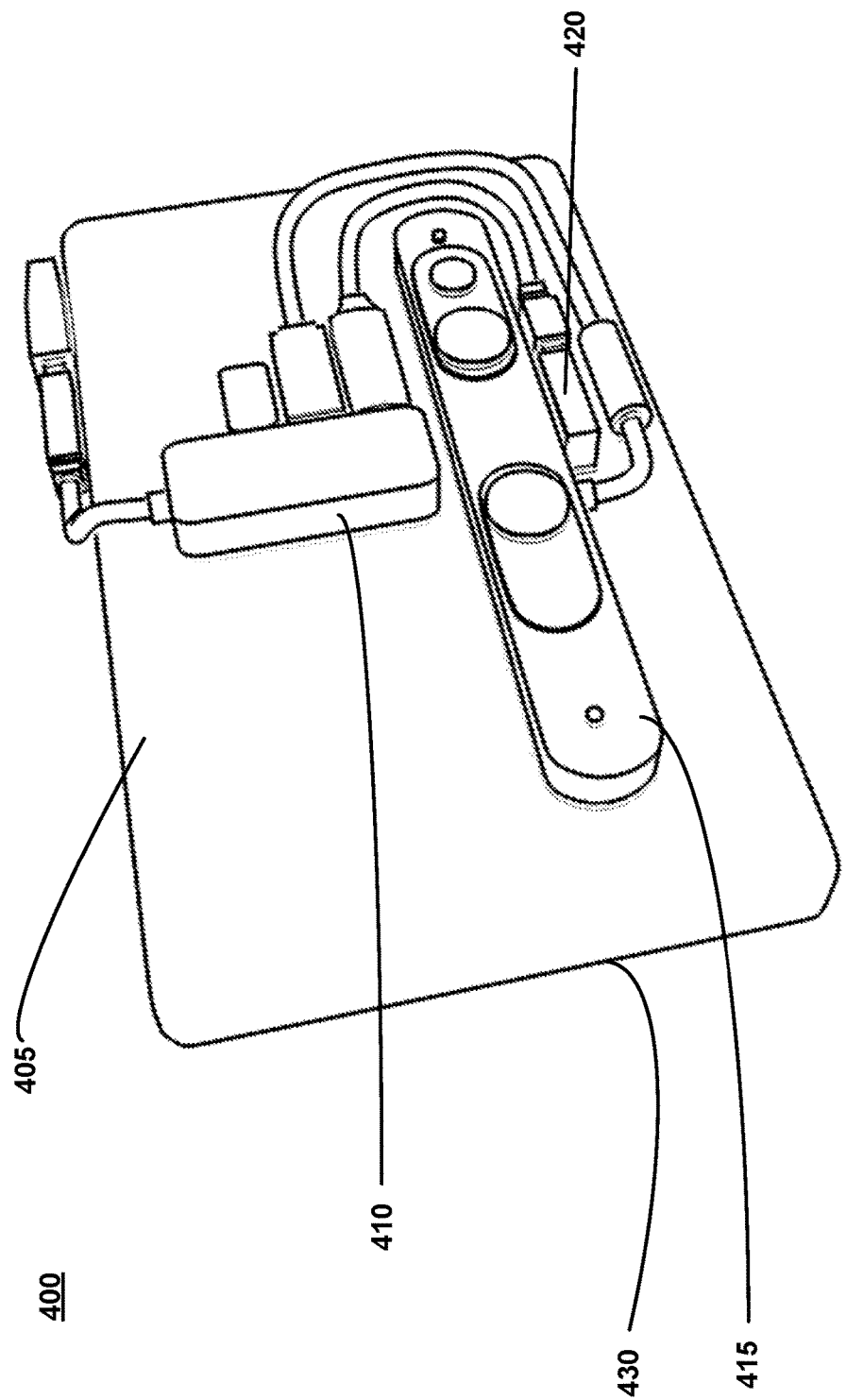
FIG. 4 is a perspective view of example mapping and AR device as may be used in some embodiments.

FIG. 4 is a perspective view of example mapping and application device 400 as may be used in some embodiments. Various embodiments may be implemented using consumer-grade off-the-shelf components. In some embodiments, the AR device consists of a tablet, to which an RGBD camera and optionally an IMU have been attached. As depicted, the example device comprises a tablet personal computer 405, with the panel opposite the display attached to a USB hub 410, RGBD camera 415, and an Inertial Measurement Unit (IMU) 420. Though the IMU 420 and camera 415 are here depicted as separate from the tablet's 405 form factor, one will readily recognize variations wherein the IMU 420, camera 415, and tablet personal computer 405 comprise a single form factor. A touch-screen display 430 (not shown) may be provided on the opposing surface of the tablet. Though shown here separately from the display device, the camera and IMU may be available in embeddable form, and thus could be fitted inside a tablet in some embodiments. Similarly, where a headset display (e.g., a virtual or augmented reality system) is used, the depth-sensor, camera, and/or IMU may be integrated into the headset. Hence, the device can take on multiple forms, e.g., a tablet, a head-mounted system (AR/VR helmet or goggles), a stand-alone device, or a smart phone. Various of the disclosed embodiments, or aspects thereof, may be implemented in software, hardware, and/or firmware (e.g., a system on a chip, an FPGA, etc.).

In one example implementation, a Razer Edge Pro® Tablet may be used as the capture and/or AR device. An example RGBD Sensor used for capture and/or for AR may be an ASUS Xtion PRO LIVE® or a Primesense® camera. An example IMU sensor which may be used is a "VectorNav VN100"®. This example configuration may also include a 4-port USB hub. For computations on a separate device, a Dell Alienware Laptop® (implementing, e.g., a Dual GeForce GTX 880m GPU) may be used.

As mentioned, the mapping and AR device need not be the same device as depicted here. For example, a device without a display may be used to acquire the depth frame data. A head mounted display may be used as a combined mapping and AR device, or as just one or the other.

3. Example Workflow Overview

Figure 5:
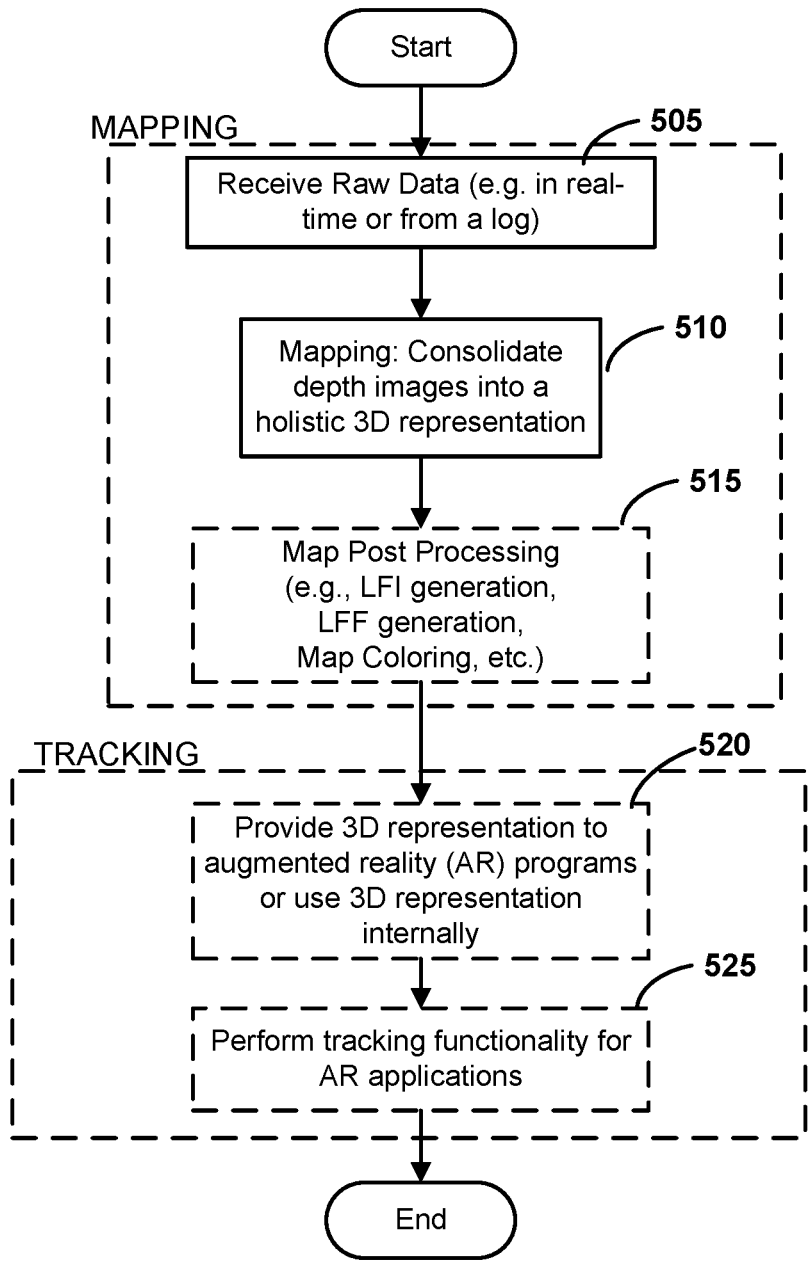
FIG. 5 is a flow diagram generally depicting an overview of various steps in a mapping and tracking process as may be implemented in some embodiments.

Many of the disclosed features are found in the system operations, which may appear as software, firmware, hardware, or a combination of two or more of these (e.g., the implementation could be done on-chip). The general processing and application pipeline may occur as depicted in FIG. 5. At block 505, a mapping system may receive the raw depth frame, image frame, and/or capture device orientation data (e.g., inertial measurement unit data including, e.g., acceleration, gyroscopic, magnetometer data, etc.). This data may be received from a log created by a capture device (previously), or in a real-time delivery from the capture device. The environment may be scanned by a user walking through the environment with the capture device. However, variations where a device moves itself or rotates itself (e.g., where the device is located on a robot or animal) to capture multiple depth frames will also be recognized. The capture device may record location information (accelerometer, and/or gyroscopic, and/or magnetometer, and/or GPS data, encoder data, etc.), a depth frame, and possibly a visual image frame with each capture.

At block 510, mapping generation operations may be performed using the acquired raw data. For example, a mapping system may generate a vertex mesh reflecting the environment based upon depth data. In some embodiments, the resulting maps are represented as polygonal meshes with colored vertices or with textures (though other representations, e.g., voxels, will be readily recognized).

At block 515, the mapping system may also apply any desired post-processing operations, e.g., map coloring. Post processing may also involve the creation of data structures facilitating tracking as discussed in greater detail herein. For example, an LFI and an LFF representation of the map may be created (in some embodiments, only one or both of these representations are created and there is no separate vertex "map").

At block 520, the system may provide the 3D representation, e.g., the 3D vertex mesh and/or LFF and LFI structures, to an AR system. For example, a development toolkit may be provided to the AR developer, allowing them to access the 3D representation.

The AR developer's application may also have access to tracking routines at block 525. These tracking routines may allow the AR program to determine the pose of an AR device in the environment represented by the 3D representation. In some embodiments, the mapping sub-system produces 3D models ("maps") of the environment, which may be used during tracking. The generated maps may be highly detailed and accurate. As the user views the environment through the device, the tracking sub-system may compute the precise camera pose in real time. This pose, the 3D model, and other 3D data (e.g., virtual object models), may then be used by the rendering sub-system to display altered environment to the user in real time. Though tracking and mapping are depicted separately here, one will recognize that during tracking the capture frames may be used to perform mapping functions, e.g., to update or augment an existing map.

A planning and interaction sub-system may also use pose, model, and data to compute interactions between virtual and real-world object, to make decisions for virtual characters (e.g., plan trajectories), and to perform other virtual-real-world interactive functionality.

Example applications include: room organization (identifying and highlighting displaced items, e.g., for security, safety, or child development purposes); shopping (e.g., virtual placement to assess furniture before purchase); interior decorator/redecorator; remodeling (e.g., to virtually assess a change to an environment); video games (Real-Time Strategy, First-Person-Shooter, etc.); education (e.g., learning new languages by encountering words in relation to objects in the environment); etc.

4. Concept Summary for Some Embodiments

Figure 6:
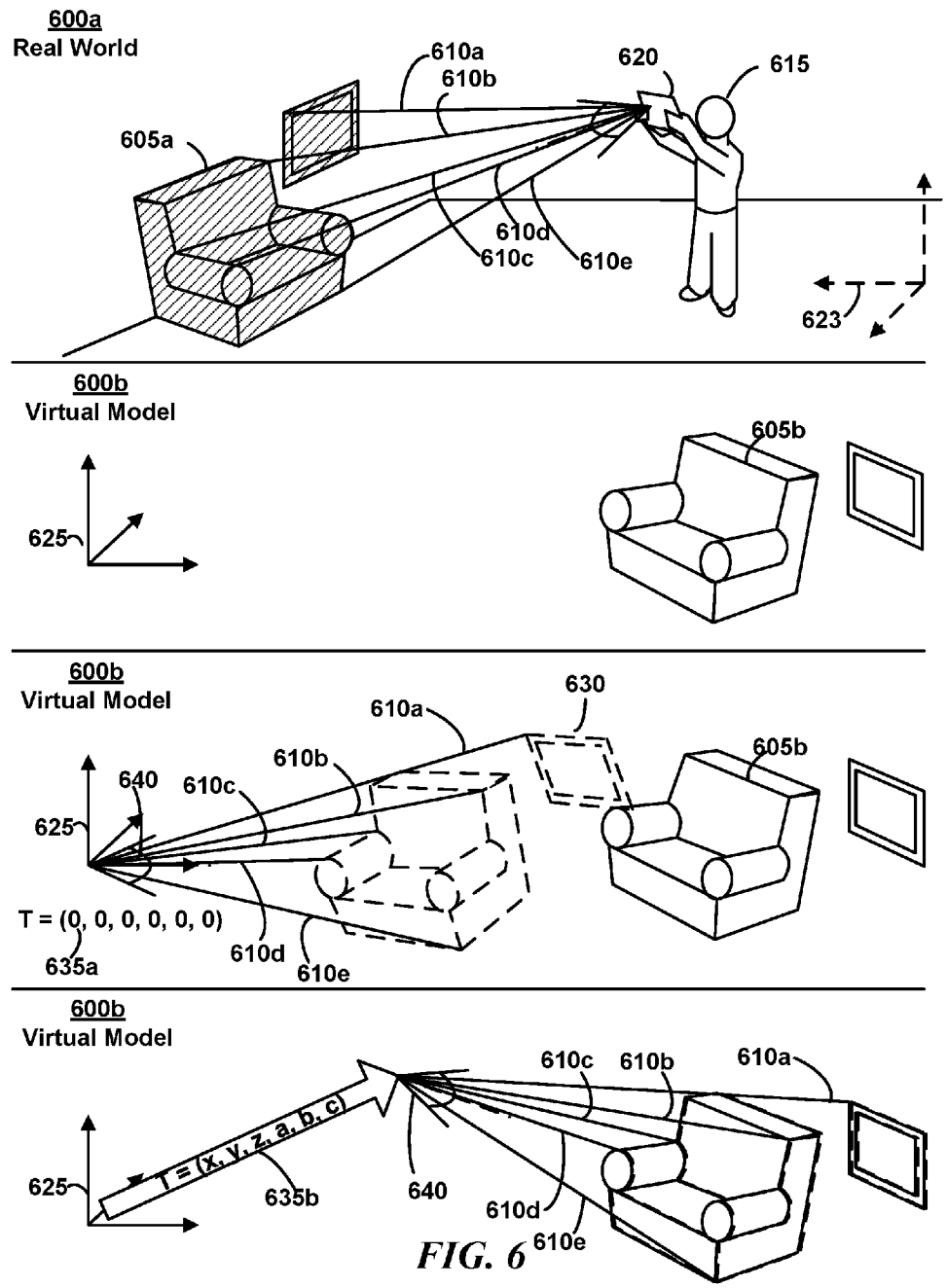
FIG. 6 is a conceptual diagram illustrating a transform representation of a pose as may be used in some embodiments.

To facilitate an understanding of the terminology used in this disclosure, FIG. 6 is a conceptual diagram illustrating a transform representation of a pose as used in some embodiments. Particularly, imagine a situation where a user 615 stood before a chair 605a in the real world 600a, held a capture device 620 above their head, and captured a depth frame having values 610a-e while looking down upon the chair 605a.

The user may have previously created, or be in the process of creating, a virtual model 600b of all, or a portion, of the real-world environment 600a. In this example, the virtual model already includes a virtual representation of the chair 605b (e.g., as a TSDF or vertex mesh) which corresponds to the real world chair 605a. The virtual representation 600b may be stored in a computer. The virtual model has an origin 625 relative to which objects, such as the chair 605b may be oriented. While there is no "central frame of reference" in the physical world to facilitate understanding, one may consider a "real-world" coordinate frame having an origin 623. Some embodiments may make a one-to-one correspondence between real-world coordinate frame 623 and virtual coordinate frame 625. Accordingly, they may each be referred to as a "world coordinate frame" variously herein. Thus, relative to the origin 625 of the virtual environment, the representation of the chair 605b may be located at the indicated position, which would correspond to where the real-world chair 605a is located in relation to the real-world coordinate origin 623 (one will recognize that the particular origin placement in this example is merely to facilitate understanding).

The system may seek to determine the pose of the capture device 620 relative to the world coordinate frame 623 when the depth frame having depth values 610a-e was captured (in some embodiments). This capture device pose may be estimated by fitting or aligning the depth data to the virtual model. To facilitate understanding, assume that the system naively may assume that the depth values 610a-e were generated when the capture device was at the origin 625, in an unrotated position. This may correspond to a naïve transform 635a of the depth values that involves no rotation or translation. As illustrated, this assumption would result in an incorrect alignment 630 of the depth values.

Thus, the system may seek to identify a more appropriate transform 635b of the depth values 610a-e. This improved transform 635b (a translation and/or rotation of the depth frame values 610a-e) will better reflect the position and orientation of the capture device 620 relative to the virtual coordinate frame 625, which would serve as an estimate of the transform between the pose of the device 620 and world coordinate frame 623, when the depth frame with values 610a-e was captured. As the "transformation" represents the transformation between the pose 640 of the device 620 and the world coordinate frame 623 and virtual model origin 625, the terms "pose" and "transform" are used interchangeably herein.

Thus, though the icon 640 may be used herein to refer to a "pose", one will recognize that the "pose" may also be represented as a transform, e.g., relative to a world coordinate frame, or any other suitable coordinate frame. Camera poses may be represented by rigid transformations in 3D with respect to the world coordinate frame. A starting pose may be referred to as $T_0$ herein and a camera pose at time t by $T_t$.

Figure 7:
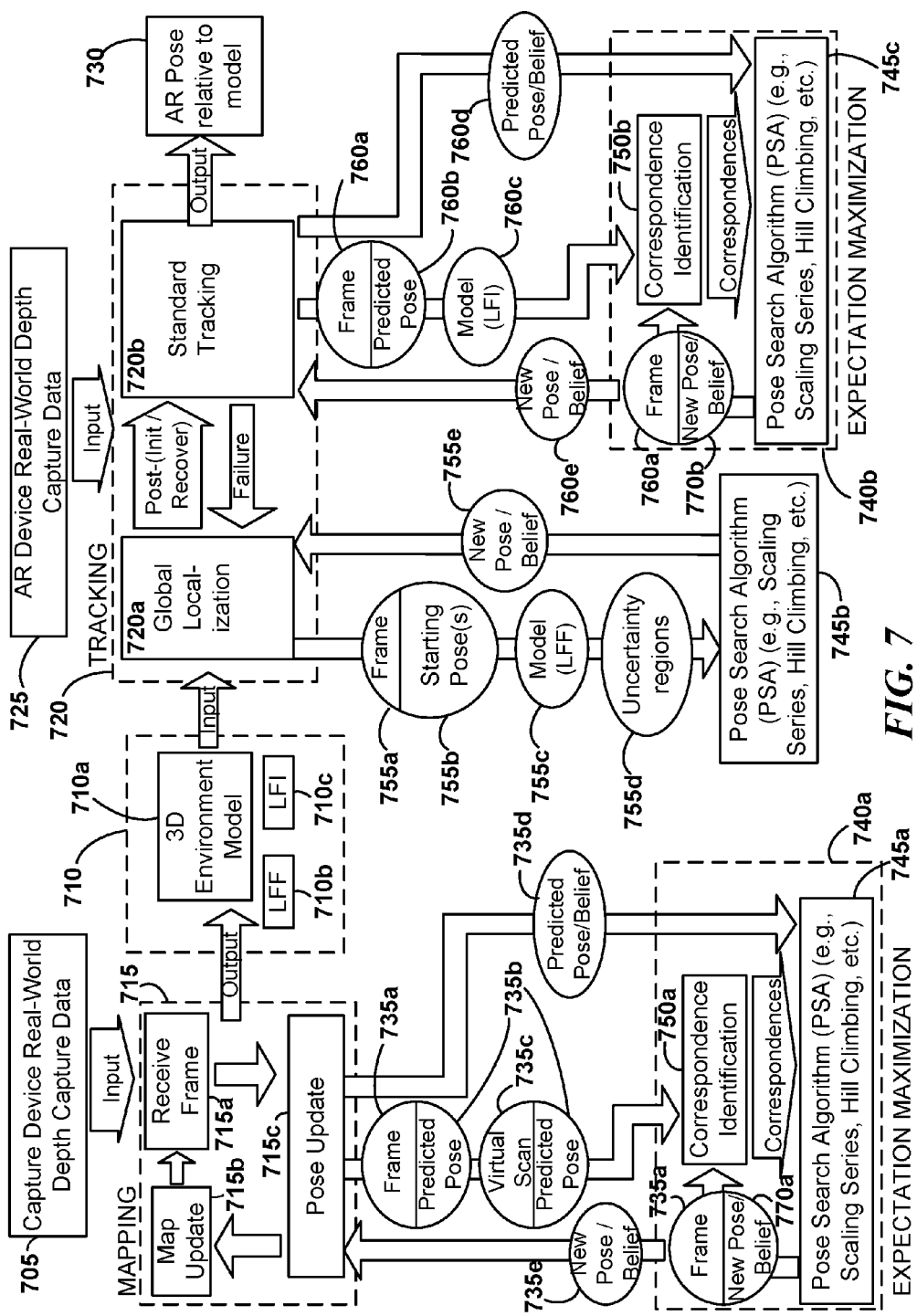
FIG. 7 is a conceptual block diagram of the relations between various concepts relevant to some embodiments.

FIG. 7 is a conceptual block diagram of the relations between various concepts relevant to some embodiments. Generally, at a high level, depth capture data 705 from a capture device may be provided in a log file or in real time to a mapping system 715. The mapping system may generate a plurality of outputs 710, e.g., a 3D model 710a (such as a vertex mesh) of the environment, an optimized LFF representation 710b, and an optimized LFI representation 710c (e.g., as described in greater detail herein, either initially or during post-processing).

These outputs 710 may be used by a tracking system 720. During an AR session, an AR device may provide real-world depth information 725 (e.g., a depth frame taken when the AR device is in some pose in the real world) to the tracking system 720. The tracking system 720 may then determine a pose of the AR device relative to the 3D model 710a corresponding to the AR device's real-world pose based upon the depth data 725. The tracking system 720 may provide this pose information as output 730 to the AR application.

Tracking system 720 may include a Global Localization system 720a and a Standard Tracking system 720b ("Standard" here referring to the frequently repeated character of some operations in some embodiments, rather than any preexisting standard of operation known in the art). The Global Localization system 720a may, e.g., be used to determine the AR device's pose relative to the model when the AR device is first used in the environment (e.g., when the first frame is received) or when the AR device is lost (e.g., when the user relocates the device more quickly than expected to a new pose, or if the sensor was covered or too close to an object for the sensor to receive appropriate depth data, or the data is misleading). One will recognize that Global Localization may be used for other purposes as described herein (e.g., for standard tracking operations, in instances where a dynamics model is unavailable, etc.). Following initialization, standard tracking operations may be performed in the Standard Tracking system 720b. These standard tracking operations may result in the generation of the AR pose data 730.

The Mapping system 715 may be composed of a Map Update process 715b and a Pose Update process 715c. The Pose Update process 715c and the Map Update process 715b may be applied iteratively as frame data 715a is considered (e.g., as frame data is pulled from a stored log or as the frames are generated at a capture device). The Map Update process 715b may construct a map representation (e.g., a TSDF representation) while the Pose Update process 715c determines a proper pose relative to the incomplete map at which to consider the incoming frame data 715a. The first Map Update may be performed from a default, or user-specified pose, rather than using the Pose Update determined pose.

Both the Mapping system 715 and the Tracking system 720 each may refer to a Pose Search Algorithm (PSA) 745a, 745b, 745c (Scaling Series is one example of a PSA, but other examples, e.g., Hill Climbing or Optimization Search will be recognized) to identify a new pose (e.g., a transform) 735e, 755e, 760e (also referred to as a "final pose" in various instances herein) which more correctly places the depth frame data with respect to the virtual representation (and, by correspondence, the correct position in the real-world coordinate frame). For example, the "predicted pose" 735b, 760b may be the system's initial, approximate pose (e.g., the most likely pose for the predicted belief as discussed in greater detail herein) for the frame data in the virtual environment. The PSA 745a, 745b, 745c may determine a more appropriate rotation and translation based on this estimate. Though depicted separately here, in some embodiments two or more of PSAs 745a, 745b, 745c may be the same PSA (and may be implemented using the same hardware/firmware/software). In some embodiments, the belief of the pose 735d and 735e may be a probability distribution, referred to herein as a "belief" (e.g., a distribution of probabilities across a corpus of candidate pose transforms). In some embodiments (e.g., where the PSA is a hill climber), the belief 735d and 735e may instead be represented by a single transform. This single transform may be the pose used to create the virtual scan 735c and the predicted pose for the frame 735a (for use by, e.g., correspondences). Where a probability distribution is used, e.g., the most likely candidate transform may be used as the pose to create the virtual scan 735c (e.g., if the belief is represented by a Gaussian probability distribution, the most likely pose would be the mean). As discussed herein, the belief may be represented by a particle system. When using a belief represented, e.g., by particles, samples, grids, or cells, it may be possible to select a single transform in many ways. For example, one could take the highest weighted particle (if weights are available), take the mean of some or all particles, use a Kernel Density Estimation to determine most likely pose, etc. Where poses are used directly, rather than derived from a belief, in some embodiments, the poses may be accompanied by "search regions" directing the PSA where and/or how to limit its search.

Similarly, the belief 760d used in Standard Tracking may also be represented by a single transform or distribution, and this transform, or the most likely candidate of the distribution, may also be used as the predicted pose 760b. In some embodiments (e.g., as discussed in greater detail herein below), the belief 735d and 735e may be represented as a collection of regions of possible poses and their likelihoods as derived, e.g., from a dynamics model (using IMU data, timestamps, etc.), or as determined by PSA.

The Pose Update process 715c and the Standard Tracking process 720b may apply the PSA 745a, 745c as part of an Expectation Maximization (EM) process 740a, 740b. The EM processes 740a, 740b may iteratively refine an intermediate belief and/or pose determination 770a, 770b (derived initially from the belief and/or predicted pose 735b, 735d, 760b, 760d—again the pose 735b is the same as, or derived from pose/belief 735d and pose 760b is the same as, or derived from pose/belief 760d) to determine a refined, final pose/belief to be returned 735e, 760e. The "expectation" refers to the correspondence identification process 750a, 750b which may determine correspondences between the frame data and the model data (either virtual scan 735c or the model 760c) using the most recent pose determination 770a, 770b. The "maximization" may refer to the application of the PSA 745a, 745c to identify a more refined belief and a more appropriate pose 770a, 770b with which to perform the correspondence. Hence, one "maximizes" (e.g., improves) the alignment of the depth data to the model given "expected" pose correspondences. Again, though they are depicted separately here the EM processes 740a, 740b may be the same, or implemented on the same device, in some embodiments.

In contrast to the EM systems, the Global Localization process 720a may refer directly to a PSA 745b without seeking an iteratively determined optimal fit or fixing the correspondences prior to running the PSA. This may be because Global Localization process 720a seeks to find the pose when considering large portions of the model—attempting to find a correspondence between the frame data and the model as a whole may not be useful. An LFF data structure may already reflect relations between "corresponding" points.

With regard to the Pose Update process 715c, the Pose Update process 715c may generate a depth frame representation of the incomplete map construction called, herein, a virtual scan 735c. The virtual scan 735c may be generated from the perspective of a predicted pose 735b. Initially, the current frame depth data 735a may also be assumed to be taken at the predicted pose 735b (e.g., as the system in FIG. 6 naively assumed the data was taken at the origin, though the predicted pose 735b may be a much better estimate in many embodiments). The virtual scan 735c, predicted pose 735b, and frame depth data 735a may be provided to the correspondence identification process 750a. The frame depth data 735a may be subsampled in some embodiments.

In some embodiments, any points/pixels contained in a "border" area (around the edge of the captured depth image, where the edge could be of some pixel width, e.g., constant, or some distance after skipping any part of the edge where there are no pixels containing depth data, etc.) may be filtered out, or removed from consideration, and hence not considered by the correspondence identification 750a process. This would reduce the amount of previously unseen "new data" appearing in a depth frame relative to a previously acquired and processed depth frames. Note that border filtering may be applied to the frame depth data during Correspondence Identification 750a during Pose Update 715c process, but need not be applied during Map Update 715b, or Standard Tracking Correspondence Identification 750b in some embodiments.

The process 750a may determine which depth values in the virtual scan 735c correspond to the depth values in the frame data 735a (as depth "values" correspond to "points" in space in accordance with their pixel position, the terms depth values and depth points may be used interchangeably herein). Given these correspondences, the PSA 745a may seek a pose (and refined belief in some embodiments) 735e for the frame data 735a that brings the corresponding points closer together.

The PSA 745a may use the predicted belief/pose to constrain its search. The determined pose 770a may then be used in the next correspondence determination to better identify corresponding depth points in the virtual scan 735c and in the frame data 735a. This process 740a may continue until a best resulting belief and determined pose 735e is generated. Note that the virtual scan 735c remains as a representation at the predicted pose 735b in each iteration, but the frame data 735a is reconsidered at the new most likely pose 770a during each EM iteration.

With regard to the Standard Tracking process 720b, some embodiments may generate a virtual scan 735c, and for some embodiments the Standard Tracking process 720b may, instead of generating a virtual scan, or in addition to creating a virtual scan, have access to a model of the environment, e.g., in an LFI representation 760c. A recently captured frame 760a, a predicted pose 760b, and the LFI representation 760c may be provided to the correspondence identification process 750b to identify points in the model 760c corresponding to the frame depth values 760a. The frame 760a may be subsampled in some embodiments. Given these correspondences, the PSA 745c may seek a pose (and in some embodiments, a refined belief) for the frame data 760a that brings the corresponding points closer together. Again, the PSA may make this determination with reference to the predicted pose/belief 760d. The determined pose 770b may then be used in the next correspondence determination to better identify depth values in the LFI representation 760c corresponding to the depth values in the frame data 760a. This process 740b may continue until a best determined pose/belief 760e is generated. Like the virtual scan, the LFI representation 760c does not change with each iteration.

With regard to the Global Localization process 720a, the Global Localization process 720a seeks to determine the AR device's pose relative to the entire model. As the model may be large, a low fidelity determination may be made by the Global Localization process 720a (and a subsequent high fidelity determination made later by the Standard Tracking process 720b). In some embodiments, the frame data may be subsampled for each of the Pose Update, Global Localization, and Standard Tracking operations, though the frame data may be subsampled to a greater degree for Global Localization as compared to Pose Update and Standard Tracking.

Global Localization process 720a may provide a frame 755a to the PSA 745b. When the AR device initializes, frame 755a may be the first frame captured. When the device is lost, or unsure of its pose, frame 755a may be the last viable frame that was captured. The frame 755a may be subsampled to speed the search process. The frame 755a may be associated with one or more "starting poses" 755b and uncertainty regions 755d. In some embodiments, the starting search poses 755b may have been determined when the model was generated (e.g., the Mapping system 715 may have identified rooms and placed a starting pose at the center of each room). The starting poses 755b may be considered sequentially or in parallel as discussed in greater detail herein by one or more PSA 745b instances. An LFF representation 755c of the model may also be provided to PSA 745b. A single uncertainty region 755d covering the entire model may be used in some embodiments, or multiple uncertainty regions 755d large enough such that the union of the starting poses with their corresponding uncertainty regions 755d will cover the entire model. The PSA 745b may identify a belief and a most likely pose 755e that relocates the frame data 755a to a position better matching the LFF model 755c data. Where multiple PSA instances are applied, e.g., in parallel (e.g., one instance for each starting pose), the Global Localization process 720a may select the best of the resulting poses 755e and, in some embodiments, the corresponding belief, or in other embodiments the combined belief.

One will recognize variations to the figure for various embodiments. For example, some embodiments do not apply Expectation Maximization for the Pose Update and Standard Tracking. In these instances, each of the Pose Update, Standard Tracking, and Global Localization may reference a PSA directly.

Figure 8:
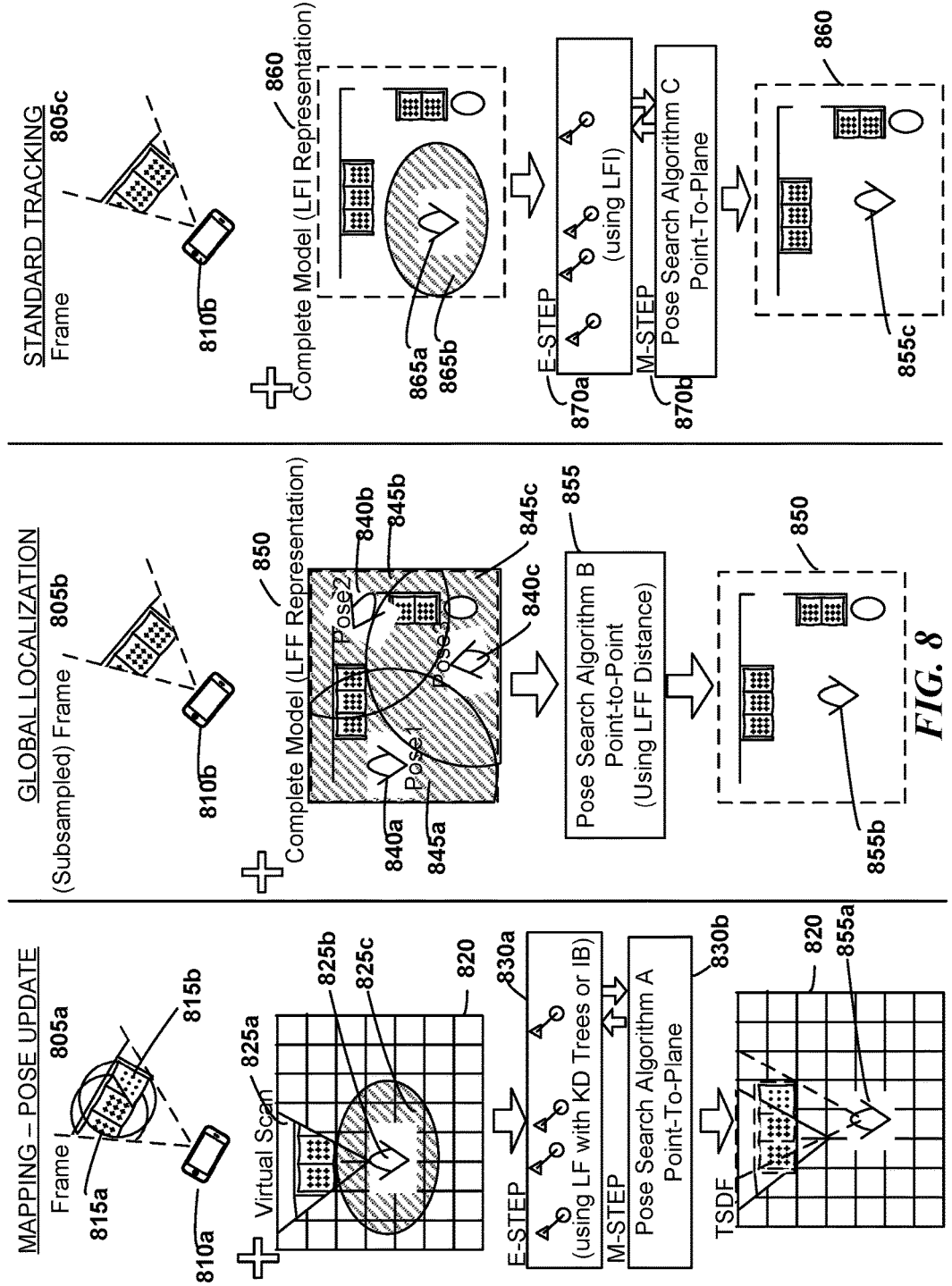
FIG. 8 is a series of inputs, configurations, and outputs as may be applied to a Pose Search Algorithm (PSA) for Mapping, Standard Tracking, and Global Localization, as may occur in some embodiments.

To facilitate a visual understanding of the Pose Update, Global Localization, and Standard Tracking's use of their respective PSAs, FIG. 8 reflects a series of inputs, outputs, and configurations as may be applied in some embodiments. With respect to the Pose Update in the Mapping process, a frame 805a of depth values in the field of view of a capture device 810a may be provided to an EM process comprising an E-step 830a (correspondence determination) and an M-Step 830b (application of the PSA to find an improved belief and its most likely pose). The frame 805a may include depth values 815a corresponding to previous captures which are now represented in an intermediate representation 820 (e.g., a TSDF structure), as well as new depth values 815b which are not yet represented in intermediate representation 820. In addition, a virtual scan 825a construction of the incomplete model 820 using a predicted pose 825b (which, e.g., could be the highest probability pose in the predicted belief 825c) may be provided to the EM process. In some embodiments, a predicted belief 825c may also be provided to the EM process, for example, to the PSA applied in the M-Step. The PSA 830b may apply a Point-to-Plane metric to determine an updated belief and a most likely pose/transform. The correspondences may be implemented, e.g., using LF with KD-trees, or with IB. The EM process may then identify a final pose 855a relative to the incomplete model 820. The new data points in the data frame may then be used to supplement the incomplete model 820.

Global Localization may also provide a frame 805b from an AR device 810b (though the frame may be subsampled relative to frames 805a and 805c). The Global Localization system may also provide a plurality of starting poses 840a, 840b, 840c and corresponding uncertainty regions 845a, 845b, 845c which may together cover the entirety of the map model. The model 850 may be provided as an LFF representation which may be used in a Point-to-Point metric by the PSA 855 as described in greater detail herein. The PSA may then compute the resulting belief and use the most likely pose as a final pose 855b relative to the model 850.

With regard to Standard Tracking, Standard Tracking may also provide a frame 805c from an AR device 810b (e.g., a same device as was used for all or part of Global Localization) to an EM process comprising an E-step 870a (correspondence determination) and an M-Step 870b (application of the PSA to find an improved belief and pose). The Standard Tracking system may also provide a predicted belief 865b and its most likely pose as the predicted pose 865a to the EM process. The model may be provided as an LFI representation 860 to the EM-process. The EM-process may then identify a final belief and its most likely pose 855c relative to the model 860.

5. Mapping

Figure 9:
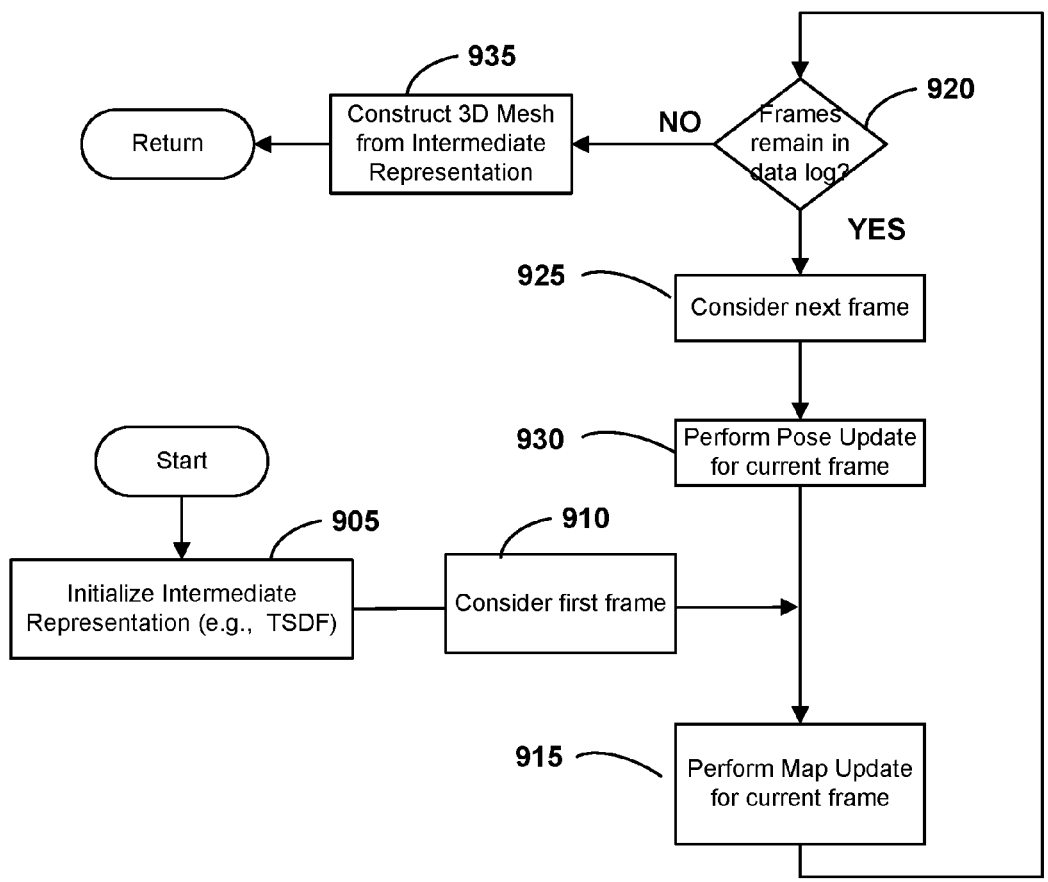
FIG. 9 is a flow diagram generally depicting various steps in a Mapping process to create a model of an environment (e.g., a Truncated Signed Distance Function (TSDF)-based representation) as may be implemented in some embodiments.

The Mapping system produces 3D models (maps) of the environment. The maps may be very accurate to facilitate subsequent operation. FIG. 9 is a flow diagram 900 generally depicting an overview of various steps in a map creation process, e.g., as may occur at block 510 of FIG. 5. In some embodiments, the mapping system uses a Bayesian filter algorithm, e.g., a simultaneous mapping and tracking (SLAM) algorithm, which builds a map based on the camera's pose with respect to the environment. The SLAM method may perform estimation iteratively over the incoming depth frames. Each iteration may consist of a camera Pose Update (e.g., as depicted at block 930) and a Map Update (e.g., as depicted at block 915), though the first frame 910 may be directly applied to the Map Update in the first instance as indicated.

In some embodiments, the mapping system may use an "intermediate" representation when generating the map and may convert this intermediate representation to a final form when finished. For example, in FIG. 9 the first frame 910 may be, e.g., the first frame in a data log or a first frame as it is acquired real-time from a capture device. The intermediate representation may be, e.g., a truncated signed distance function (TSDF) data structure (though one will readily recognize other suitable data structures). However, for purposes of explanation, most of the examples described herein will be with respect to TSDF.

At block 915, the system may perform a Map Update and update the internal representation, e.g., a TSDF representation, with a frame's data. Initially, all the lattice points in the TSDF (also referred to as "cells" or "cell corners" in some instances) may be initialized to a default value at block 905. Applying the Map Update process may adjust some of the TSDF lattice points to reflect a frame's depth data. In some embodiments, to assist with the first frame positioning, the IMU down vector (as measured, e.g., by accelerometers in the captured device) may be aligned with the Z axis. The floor plane may then be extracted. The normal of the floor plane may then be aligned with the Z axis. Rotation around the Z axis as well as 3D translation can be adjusted manually if needed in some embodiments.

While frames remain to be considered at block 920, the system may consider the next frame at block 925. The system may then perform a Pose Update at block 930. For example, during the initial Map Update at block 915 the system may rely upon an arbitrary pose for applying the depth frame data to update the TSDF. During subsequent iterations, however, the incoming depth data should be aligned properly relative to the previous TSDF updates. Accordingly, the Pose Update 930 can improve a camera pose estimate for this frame. The TSDF may then be updated at the Map Update 915.

Once all, or a sufficient number (e.g., to complete a model), of frames have been considered at block 920, at block 935 the system may build a 3D mesh out of the TSDF representation, or construct other representations, such as an LFF and/or LFI as discussed in greater detail herein.

6. Pose Estimation—Pose Tracking

Figure 10:
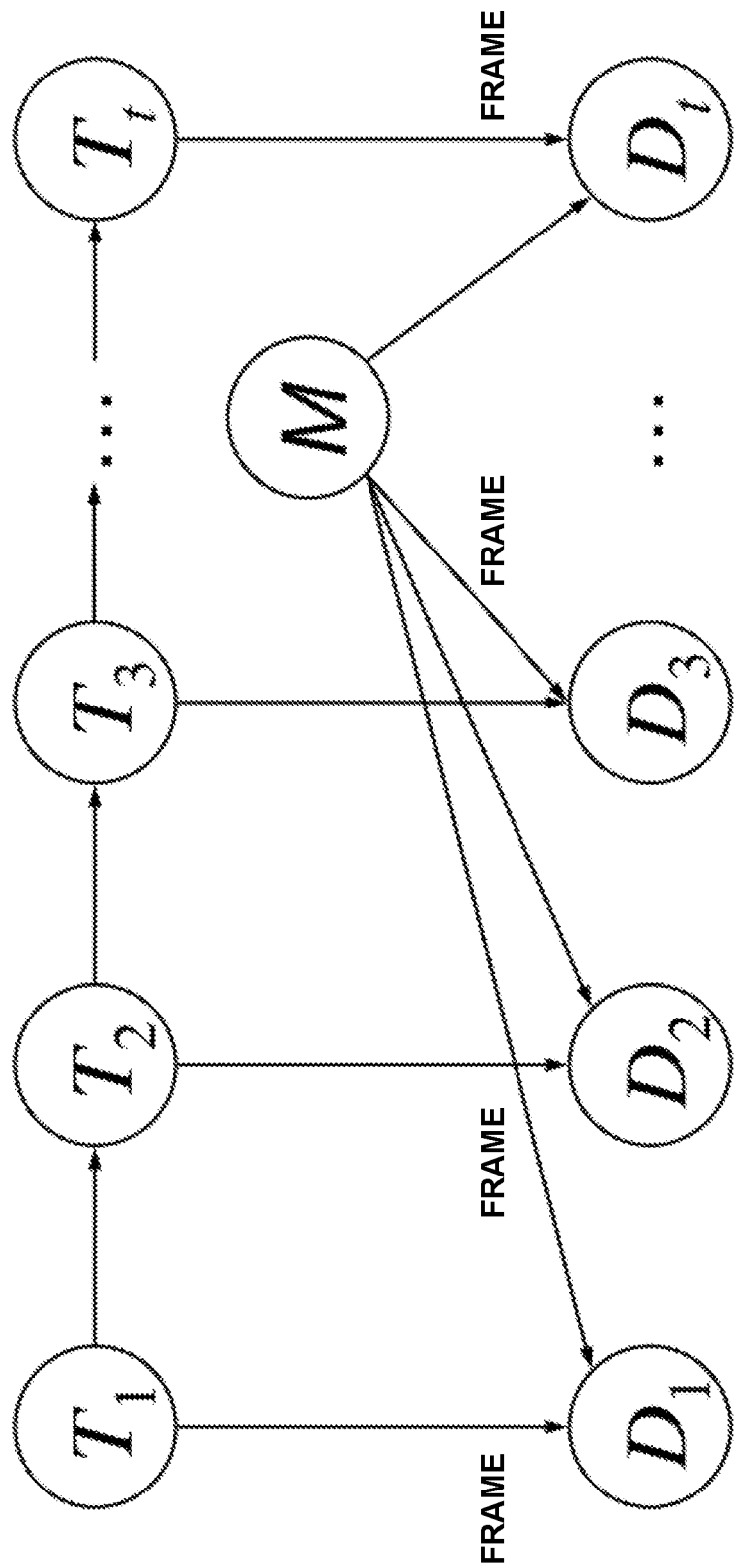
FIG. 10 is a block diagram of a dynamic Bayesian network as may be used in accordance with some embodiments.

In some embodiments, pose tracking can be modeled as a Bayesian process in which the camera pose $T_t$ changes over time due to camera motion. FIG. 10 is a block diagram of a dynamic Bayesian network as may be used in accordance with some embodiments. At each time step t the pose estimation system may obtain a new sensor measurement $D_t$ from the RGBD camera (or any other suitable sensor as discussed herein), e.g., a frame of depth data. Here M represents the environment and $T_1$, $T_2$, etc. the camera poses in the environment at the time when the depth data $D_1$, $D_2$, etc. were taken. $T_1$, $T_2$, etc. are unknown (e.g., unobserved), whereas $D_1$, $D_2$, etc. are known (e.g., observed). During Standard Tracking, M may be considered known (e.g., represented by the previously built model of the environment). During mapping, the map M may be an unknown alongside $T_1$, $T_2$, etc., but unlike the camera pose, the map does not change over time. The system may seek to estimate poses $T_1$, $T_2$, etc., (and possibly estimate M) based on the depth data $D_1$, $D_2$, etc. Due to sensor noise and modeling imprecision, the system may not be able to determine the camera pose with absolute certainty. Instead, the uncertain knowledge of the camera's pose may be described by a probability distribution called the Bayesian "belief" at a given time, $bel_t$.

$$bel_t := p(T_t | D_1, \ldots, D_t) \quad (1)$$

Figure 11:
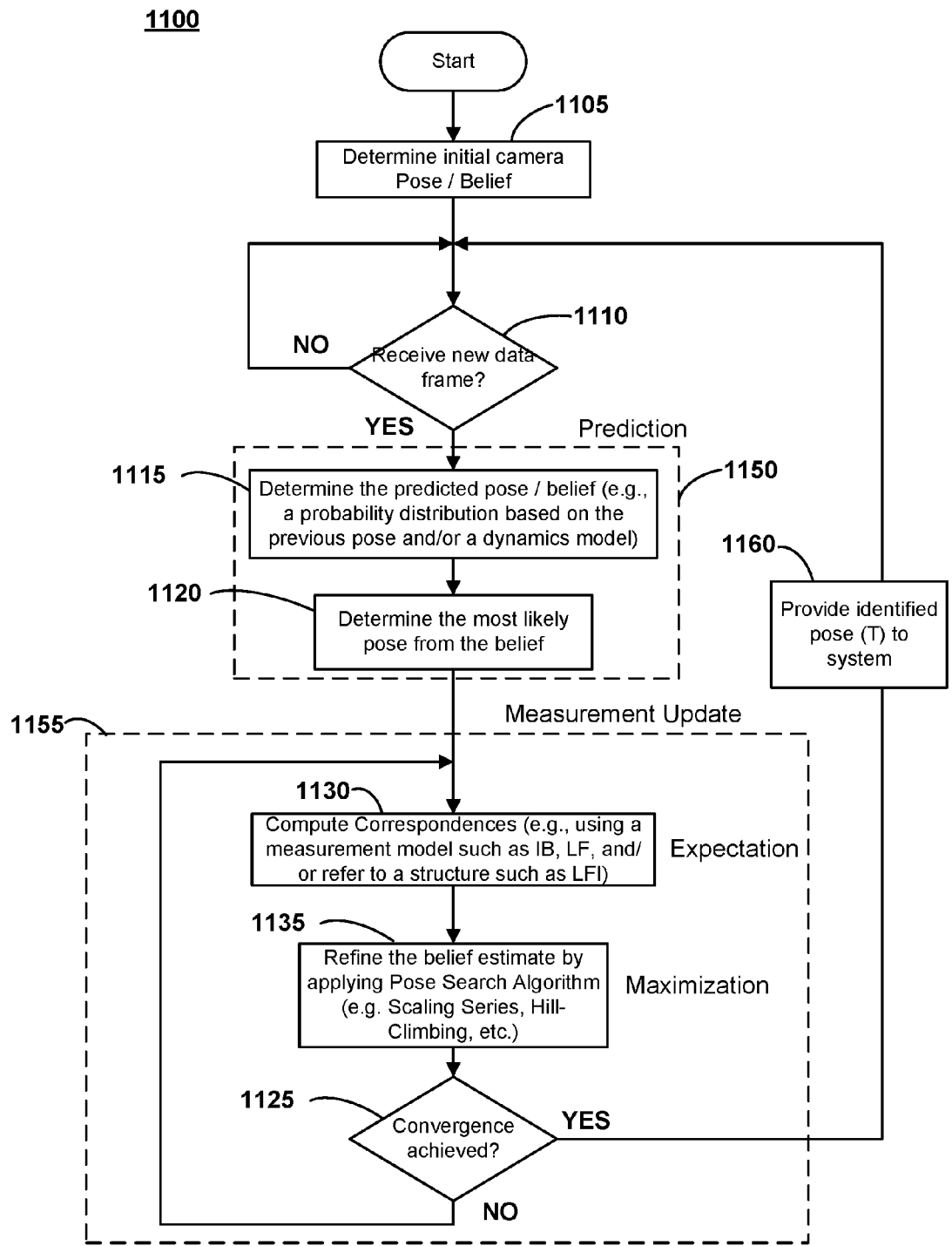
FIG. 11 is a flow diagram generally depicting a summary of an Estimation Maximization algorithm (e.g., for tracking) as may be implemented in some embodiments.
Figure 12:
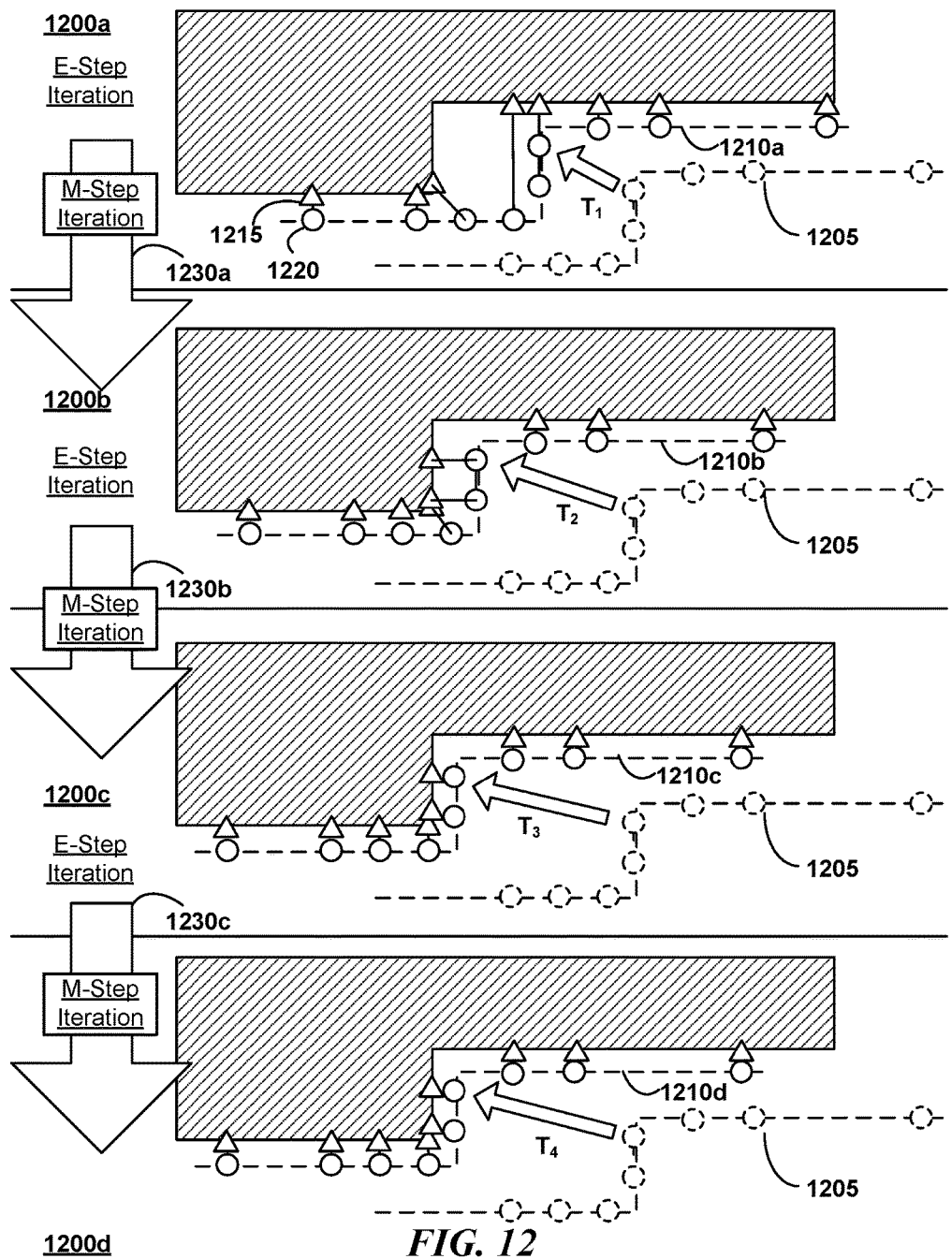
FIG. 12 is a graphical depiction of an example iterative convergence procedure during Estimation Maximization as may be applied in some embodiments.

This probabilistic approach may have the advantage of computing the optimal solution given all the available data, while also properly taking into account sensor noise and modeling uncertainties. The belief may be estimated recursively using the Bayesian recursion formula $$bel_t = \eta p(D_t | T_t) \int p(T_t | T_{t-1}) bel_{t-1} dT_{t-1} \quad (2)$$

where $\eta$ is a normalization constant and $bel_{t-1}$ is the belief at the prior time step t−1. From here on, the term $\eta$ is used to denote the normalization constant. Its value will be different between different equations, but such that the right-hand side of that particular equation integrates to one. The first probability term $p(D_t | T_t)$ is referred to herein as the measurement model, a probabilistic statement that describes how the sensor measurements are taken. The second probability term $p(T_t | T_{t-1})$ is the dynamics model, a probabilistic statement that describes how the camera can move (which may, e.g., consider how fast a human being could move a device, past poses, IMU data, etc.). The Bayesian filter estimates the belief by iterating Prediction and Measurement for each time step t. FIG. 11 a flow diagram generally depicting a summary 1100 of an Estimation Maximization algorithm (e.g., for tracking) as may be implemented in some embodiments. For example, FIG. 11 may reflect the combined operations of the Pose Update process 715c and EM process 740a or the combined operations of the Standard Tracking process 720b and EM process 740b. FIG. 12 is a graphical depiction of an example iterative convergence procedure during Estimation Maximization as may be applied in some embodiments. FIG. 13 is a pseudocode listing reflecting one possible tracking algorithm as may be implemented in some embodiments.

Initially, the system may receive a first camera pose and/or belief at block 1105. This may be an arbitrary, default assumption. In some embodiments, if Standard Tracking is just starting, then it may receive this initial pose and/or belief as the pose and/or belief generated by Global Localization. As new data frames are received at block 1110 the system may update the pose and/or belief estimates.

In Prediction, generally corresponding to blocks of group 1150 in FIG. 11, the system may determine the predicted belief based on, e.g., a frame timestamp, IMU data, (block 1115) and determine the most likely pose (block 1120). Prediction may be part of Pose Update process 715c or Standard Tracking process 720b. For example, the system may use a dynamics model, and compute the integral term from EQN. 2, also referred to as the Bayesian prediction $$\overline{bel}_t := \eta \int p(T_t | T_{t-1}) bel_{t-1} dT_{t-1} \quad (3)$$

This term may reflect the prediction of the camera pose given all the prior measurements, except the very last one. In other words, $$\overline{bel}_t := p(T_t | D_1, D_2 \ldots, D_{t-1}) \quad (4)$$

These steps may generally correspond to the example of lines 3-4 in FIG. 13. $MP(\overline{bel}_t)$ denotes the maximum-a-posteriori of $bel_t$, e.g., the most likely pose of the camera based on the prediction belief $\overline{bel}_t$.

At the Measurement Update, generally corresponding the blocks of group 1155, if convergence has not yet been achieved (block 1125), the system may determine the correspondences (block 1130) and refine the belief estimate (block 1135) (e.g., determine an improved transform for the pose). These steps may generally correspond to lines 7-12 in FIG. 13. The Measurement Update 1155 may generally correspond to EM process 740a or EM process 740b. The system may compute the resulting belief $bel_t$ for the time step by incorporating the latest measurement $D_t$ using the measurement model $p(D_t | T_t)$. Once convergence has been achieved (e.g., a comparison of the MAR difference between successive transforms is below a threshold, some number of iterations have been performed, etc.) the Measurement Update process may provide the most recent belief and pose 1160 to the requesting system (e.g., the Pose Update process or the Standard Tracking process).

An example of convergence is graphically presented in the block diagram of FIG. 12. The depth values associated with a frame relative to an untranslated, unrotated pose at the origin may result in the depth value positioning at location 1205. A Prediction step 1150 may generate a belief with a most likely transform/pose $T_1$ relocating the depth values to the position 1210a. Correspondences may then be determined in the E-Step 1200a using, e.g., LF with KD-Trees, IB, or LFI models. For example, the depth value 1220 may be determined to correspond with a point 1215 on the surface of an object. The system may provide these correspondences, e.g., to a PSA in the next M-step iteration 1230a.

The M-Step 1230a may produce a new belief with a most likely transform/pose $T_2$ which relocates the depth values to the position 1210b, which may be used by the second EM iteration to generate a second set of correspondences in the E-step 1200b. Similar iterations may continue: M-Step 1230b producing a new belief with a most likely transform/pose $T_3$ which could then be used to identify correspondences for data at the position 1210c; M-Step 1230c producing a new belief with a most likely transform/pose $T_4$ which could then be used to identify correspondences for data at the position 1210d; etc. As indicated, however, as the transform relocates the depth data closer and closer to the "correct" position, the successive transforms may change very little. For example, the difference between $T_4$ and $T_3$ is much less than between $T_4$ and $T_1$. The difference between transforms may be assessed with a metric, e.g., MARs (with an appropriate R selected), and when the difference is beneath a threshold "convergence" may be said to be achieved. The most recent belief and its most likely transform/pose (e.g., $T_4$) may then be returned.

At line 9 of FIG. 13, the LFI data structure may allow for fast correspondence matching and may be used in some embodiments. Without LFI (e.g., during mapping), computing correspondences for the entire model may be very costly. In these cases, some embodiments resort to alignment of the new data to a Virtual Scan of the model, which is generated from the predicted most likely camera pose $T_t^-$ as generated by line 4 of FIG. 13. For the tracker, a "virtual scan" may instead be generated in some embodiments by rendering the model mesh into an OpenGL depth buffer and then reading back the depth values. A PSA optimized to use an LFI data structure, however, may generate better results in some embodiments.

The use of a Virtual Scan may mean that the pose estimation aligns new data only to the Virtual Scan rather than the entire model. For small camera motions (as, e.g., during mapping), this may not be too significant, but for larger motions it may be suboptimal. In contrast to Virtual Scans, LFI has the advantage of aligning the data to the entire model, which may be better for larger motions that can arise during tracking.

The data scan and the virtual scan (if used) may have smooth normal computed. The model may already be smooth enough, but the data may need to be smoothed in order to obtain useful normal in some embodiments. For efficiency reasons, the smooth normal computation may be performed on a GPU. For improved performance, the data scan can also be sub-sampled to reduce the number of point comparisons in some embodiments. During mapping, some embodiments may also remove a border of some width from the data depth scan for the purposes of Pose Update while, e.g., using the entire data scan for Map Update.

With regard to Line 8 of FIG. 13, this loop may gradually refine an estimate of $bel_t$ using expectation maximization (EM) method, specifically a hard-assignment EM version in this example. EM alternates an expectation step (E-Step) and a maximization step (M-Step). The E-Step computes correspondences and the M-Step adjusts the pose.

With regard to Line 9 of FIG. 13, (E-Step), the system may first transform the data scan into world coordinates using the most recent camera pose estimate $\{y_n\}=\{T_t^{(i)}(x_n)\}$. Then, correspondences may be computed using IB, LF, or LFI models (e.g., correspondences as depicted graphically in FIG. 12). Next, the system may compute outliers, which are data points that do not match their corresponding model points very well. A data point may be considered an outlier, e.g., if it does not match up to a valid model point, is too far from the matched model point (more than some threshold $k_{dist}$), does not have a valid normal, or its normal is too different from the model normal. If the percentage of outliers is too great, the system may fail. The tracker can either attempt to restart from the same pose for the next data scan $D_{t+1}$, or it may require re-initialization using Global Localization techniques described in greater detail herein.

In some embodiments, the scan points in a frame of sensor data may come from two types of obstacles: the static obstacles and the dynamic obstacles. Static obstacles are the ones that remained in the same position since the map has been created, e.g., for, walls, etc. Dynamic obstacles are the objects that have moved since map creation. Dynamic obstacles may include people, pets, and any objects moved out of place since the previous mapping. When aligning a data scan to the map, the system, in some embodiments, may filter out dynamic obstacles as they are not on the map. Rejection of outliers is intended for filtering of dynamic obstacles. Thus, the smaller the outlier threshold $k_{dist}$ the more dynamic obstacles will be filtered. This may be desirable for very fine and accurate pose adjustment.

On the other hand, if the outlier threshold $k_{dist}$ is smaller than the error in the current pose estimate, then large portions of static obstacles may be filtered out as well. Without these obstacles, it may be difficult to converge to the correct pose. Since the pose error should gradually get smaller with EM iterations, some embodiments set $k_{dist}$ to a larger value at the start of EM and gradually reduce $k_{dist}$ towards a minimum value.

With regard to Line 10 of FIG. 13, (M-Step), the alignment of selected data points to their corresponding model points may be performed, e.g., using Scaling Series starting with the most recent estimate of the belief $bel_t^{(i)}$ and producing a new estimate $bel_t^{(i+1)}$ (resulting, e.g., in the increasing accurate mappings of states 1200a, 1200b, 1200c, and 1200d in FIG. 12). Distances between points may be computed using a Point-to-Plane metric based on the model normals. Scaling Series updates may be highly parallelized on the GPU. One will recognize that other hill climbing or optimization search techniques may also be used in place of Scaling Series.

The starting uncertainty for Scaling Series may be set to the uncertainty of the prediction distribution $\overline{bel}_t$ produced by the dynamics update. The final uncertainty $\delta^*$ may be set very small in order to achieve a highly accurate alignment. The values for most parameters of Scaling Series may be learned by the system.

With regard to Line 11 of FIG. 13, the improved pose estimate $T_t^{(i+1)}$ may be updated to be the maximum-a-posteriori of $bel_t^{(i+1)}$ and i is incremented for the next iteration.

With regard to Line 12 of FIG. 13, the convergence condition can be, e.g., that either the change in the estimate of $T_t^{(i)}$ becomes very small or the maximum number of EM iterations is reached. Since EM can oscillate between several local minima, some embodiments compute the distance from $T_t^{(i)}$ to all the prior iterations $T_t^{(0)}, \ldots, T_t^{(i-1)}$. If the MAR (e.g., MAR-1) distance from any of the prior iterations is below the convergence threshold, the system may assume that EM has converged and exit the EM loop.

With regard to Line 14 of FIG. 13, once the convergence condition is reached, some embodiments set $bel_t$ and $T_t$ to be the estimates from the last EM iteration i.

7. Pose Estimation—Pose Tracking—Scaling Series

The Scaling Series algorithm (an example PSA) may compute an approximation of the belief bel by weighted particles. A particle represents a position in the search space. For example, where the device's pose is represented as six dimensions (x, y, z, pitch, yaw, roll) then each particle may represent a potential pose across all six dimensions. The initial uncertainty may be assumed to be uniform over the starting region. If the initial uncertainty is assumed to be uniform, the belief may be proportional to the data probability. Thus, the weights can be computed via the measurement model. A more through discussion of an example Scaling Series approach is provided in the PhD Thesis of Anna Petrovskaya, "Towards Dependable Robotic Perception". However, the embodiments described herein are not limited to particularities of that example. Indeed, some embodiments employ other Hill Climbing, or Optimization Search functions in lieu of Scaling Series entirely.

Figure 14:
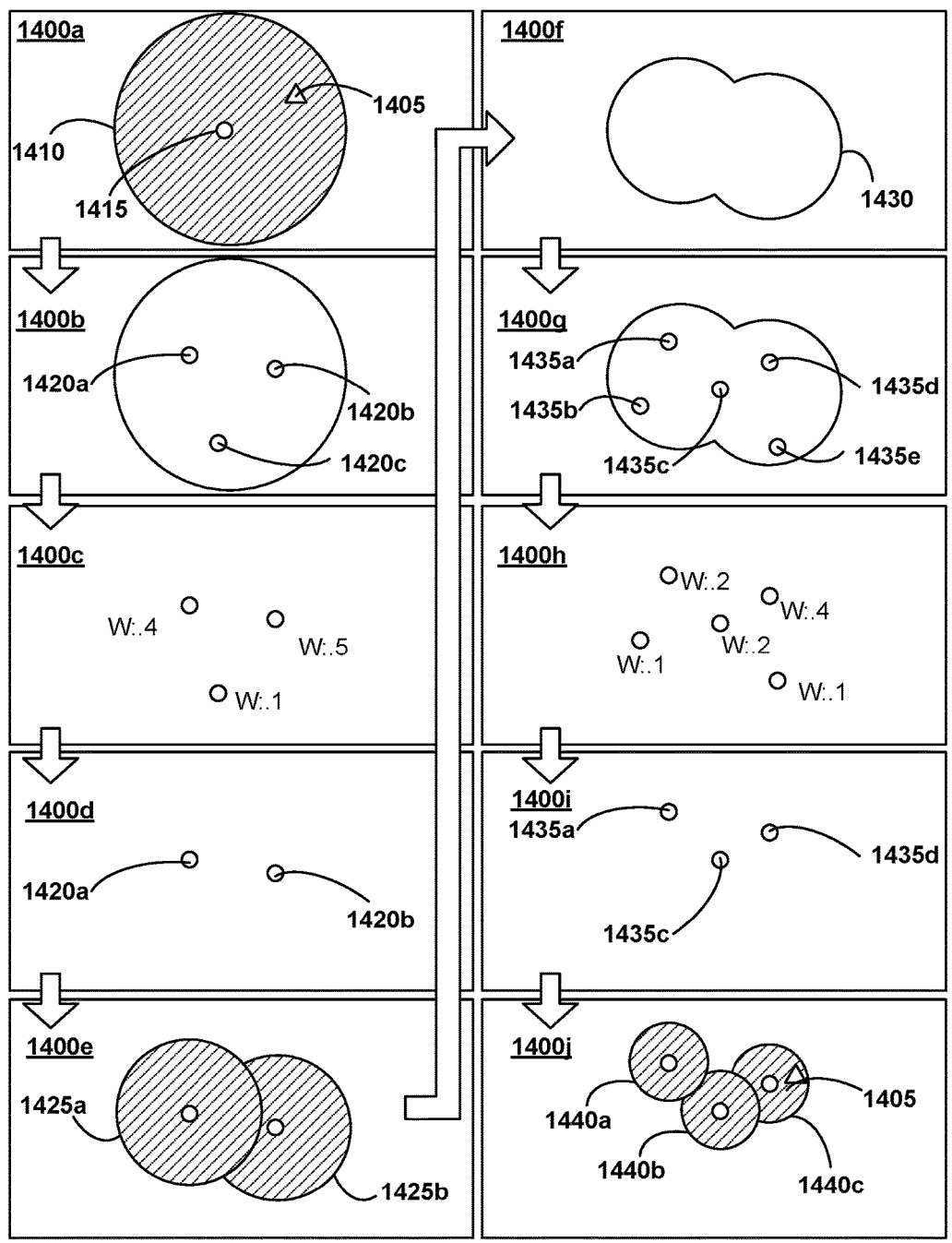
FIG. 14 is a graphical depiction of an example Scaling Series algorithm in a hypothetical two-dimensional universe to facilitate understanding of a higher-dimensional algorithm as may be implemented in some embodiments.
Figure 15:
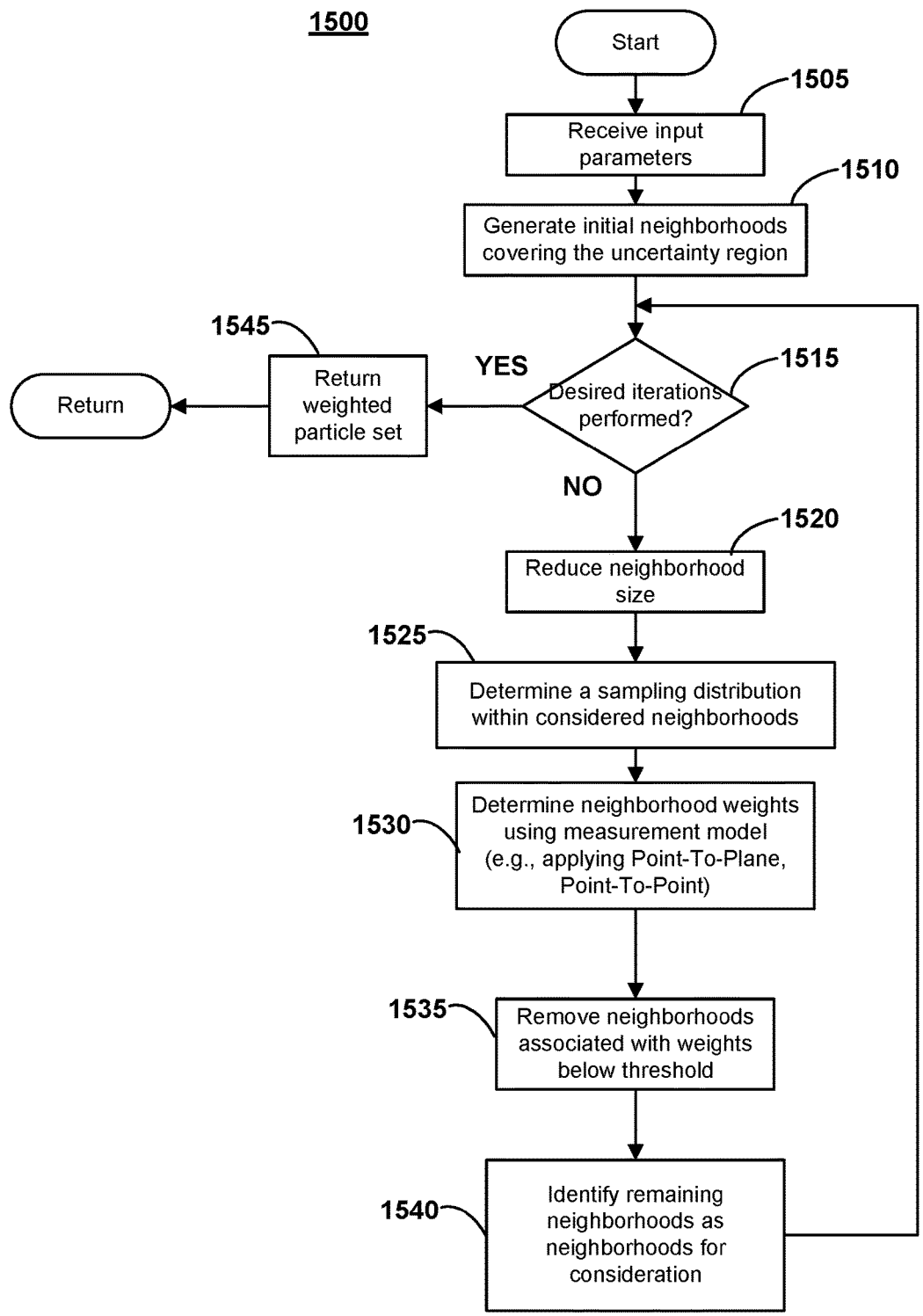
FIG. 15 is a flow diagram describing the operations of an example Scaling Series algorithm implemented in some embodiments.

FIG. 14 is a graphical depiction of a Scaling Series in a hypothetical two-dimensional universe as may be implemented in some embodiments. FIG. 15 is a flow diagram 1500 describing the operations of an example Scaling Series algorithm implemented in some embodiments. FIG. 16 is a pseudocode listing reflecting one possible scaling series algorithm as may be implemented in some embodiments. The search space in this example is depicted in each of steps 1400a-1400j as a two-dimensional rectangle (a typical search space would comprise, e.g., six rather than two dimensions). In this example, the actual position that best corresponds to the current data is the position 1405.

In this example implementation, at block 1505, the algorithm may take as input the initial uncertainty region, $V_0$, the data set, D (e.g., frame depth data), and two user-specified parameters: M and $\delta^*$. M specifies the number of particles to maintain per $\delta$-neighborhood. $\delta^*$ specifies the terminal value of $\delta$. The refinements may stop once this value is reached. At line 2 of FIG. 16 the scaling factor zoom is set so that the volume of each neighborhood is halved during scaling (though other scaling factors may be used).

At line 3 of FIG. 16, in this example algorithm, the number of iterations N is computed based upon the ratio of initial to final volume (this may be adjusted if, e.g., a different scaling factor is chosen). S denotes a neighborhood, R(•) denotes the radius, and Vol(•) denotes the volume (e.g., a six-dimensional volume) of the region.

As depicted in lines 1 of FIG. 16 the system may initialize the radius of the neighborhood to be considered to be the radius of the initial uncertainty region. Accordingly, initial neighborhoods covering the uncertainty space are generated at block 1510.

Lines 4-11 of FIG. 16 depict the steps occurring at each iteration of the algorithm. The iterations may be stopped at block 1515 based, e.g., on the number of iterations performed, the size of the neighborhoods, an applied metric, etc. At block 1520 the system may reduce the neighborhood size. For example, as indicated at line 5 of FIG. 16, at each iteration n, $d_n$, is computed by applying the zooming factor to $d_{n-1}$. Where the scaling series applies an annealing approach, at line 6 of FIG. 16, the corresponding temperature $\tau_n$ may also be determined assuming that $\delta^*$ correspond to the temperature of $\tau=1$.

At block 1525, the system may determine a sampling distribution within the neighborhood (e.g., which candidate poses within the space to consider). For example, at line 7 of FIG. 16 the system may draw a particle set $\overline{X}_n$ uniformly from $V_{n-1}$ ensuring that the required density of M particles per $\delta$-neighborhood.

At block 1530, the system may determine measurement weights based on a measurement model. Example measurement weights are described in greater detail herein. For example, at line 8 of FIG. 16, the system may weigh the particles by the annealed data probability at temperature $\tau_n$, which could be, e.g., the probability provided by the measurement model raised to the power of $1/\tau_n$. In the example of FIG. 16, it may also serve to normalize the weights so that they add to 1, depending on the Pruning function on Line 9 (in some embodiments it may not be desirable to normalize weights to have them add up to 1). In some embodiments, the probability provided by the measurement model can be in negative-log form (i.e. not exponentiated to the negative power, e.g. total measurement error squared over 2 as in EQN. 5), also known as energy, thus allowing much better numerical stability in some embodiments when using floating point values. In some implementations, instead of exponentiating energy and raising it to the power of $1/\tau_n$, the energy can be multiplied by $1/\tau_n$ and the probability weights can be kept in negative-log form.

At block 1535, based, e.g., upon the measurement model determinations at block 1530, the system may remove neighborhoods having weights beneath a threshold, e.g., a pruning factor times the highest weight among all particles. If the weights are kept in negative-log form, in some implementations, the pruning can be determined by subtracting the lowest negative-log weight among all particles (e.g., the highest weighted particle would be the lowest energy particle), and determining that it is greater than the negative-log of pruning factor (e.g., −log(f)). For example, at line 9 of FIG. 16 the system may exclude low probability regions (e.g., regions below a threshold).

At block 1540, the system may identify neighborhoods for consideration in a next iteration. For example, at line 10 of FIG. 16 the system may then determine the resulting subregion for this iteration.

FIG. 14 depicts these operations graphically. For example, after several iterations the system may identify a neighborhood in the initial step 1410 about a value 1415. They system may then perform an even density cover (Line 7 of FIG. 16) to identify the points 1420a, 1420b, 1420c ($\overline{X}_1$). Normalized weights may then be computed for each point at step 1400c (Line 8 of FIG. 16). Based on these weight values, the points may be pruned so that only 1420a and 1420b remain (Line 9 of FIG. 16) at step 1400d. Smaller neighborhoods 1425a and 1425b (state 1400e) may appear around these points and a union 1430 of these neighborhoods (state 1400f) (Line 10 of FIG. 16). A new iteration may then be performed. Particularly, an even density cover (Line 7 of FIG. 16) may be computed across the union 1430 to yield the points 1435a, 1435b, 1435c, 1435d, 1435e ($\overline{X}_2$). Normalized weights may then be computed for each point at step 1400h (Line 8 of FIG. 16). Based on these weight values, the points may be pruned so that only points 1435a, 1435b, and 1435c remain (Line 9 of FIG. 16) at step 1400i. Smaller neighborhoods 1440a, 1440b, and 1440c (state 1420j) may appear around these points. The union may be taken of the neighborhoods and the iterations may continue.

Once N iterations have been performed (though other stop conditions may be used in some embodiments) the system may return the results at block 1545. For example, the system may prepare the output at lines 12 and 13 of FIG. 16. These lines draw the final particle set and compute weights at temperature τ=1.

8. Pose Estimation—Pose Tracking—Scaling Series—Measurement Models

In some embodiments, the measurement model used to compute the normalized weights at line 8 of FIG. 16 is more complex than the dynamics model used by a Mapping or Tracking System. Generally, it's not possible to model a sensor exactly. On the other hand, this model may have a tremendous impact on accuracy of the estimate and also on the computation time required.

The measurement models applied in some embodiments may have a common structure. Generally, the measurement model may be computed as a Gaussian distribution over the total measurement error ε. For example, $$p(D|T) := \eta \exp\left(-\frac{\varepsilon^2}{2}\right) \quad (5)$$

Where η denotes a normalization constant. If a scan is a collection of 3D points $D:=\{x_1, \ldots, x_n\}$, the total measurement error ε is a function of the individual measurement errors $\varepsilon_n$ of each scan point $x_n$. Some embodiments assume that individual scan points are independent of each other given the pose of the camera T, then ε is the $L_2$-norm of the individual errors $$\varepsilon := \sqrt{\sum_n \varepsilon_n^2} \quad (6)$$

In reality, though, the individual scan points may not be completely independent of each other and an L1-norm may give better results:

$$\varepsilon := \sum_n |\varepsilon_n| \quad (7)$$

where |•| denotes the absolute value.

Each individual measurement $x_n$ may be expressed in the camera's local coordinate frame. Taking into account the current camera pose T, these points may be expressed in the world frame $y_n:=T(x_n)$. In some embodiments, each individual error is defined to be proportional to some measure of distance from the measurement $y_n$ to some corresponding point $C(y_n)$ on the 3D map:

$$\varepsilon_n := \frac{d(y_n, C(y_n))}{\sigma} \quad (8)$$

Where σ is the standard deviation of the error, which may depend on sensor and map accuracy. The measure of distance d(•,•) may be the Euclidean distance, though some embodiments instead apply the Point-To-Plane distance. Given the data point $y_n$, its corresponding model point $C(y_n)$ and the surface normal vector at that model point $v_n$, the point-to-plane distance is computed as the absolute value of the dot product $$d(y_n, C(y_n)) := |(C(y_n)-y_n) \cdot v_n| \quad (9)$$

where |•| denotes absolute value and • denotes the dot product operator. Particularly, as described elsewhere herein, both the Pose Update and Standard Tracking processes may determine correspondences $C(y_n)$ which may then be used to determine the distance using the above equations. Additionally, in some implementations, the corresponding point $C(y_n)$ and the normal vector $v_n$ may be provided as a plane (a,b,c,d), in such case the Point-To-Plane distance can be computed as:

$$d((x,y,z),(a,b,c,d)) := |a^*x+b^*y+c^*z+d| \quad (10)$$

where (x,y,z) is the location of $y_n$ and (a,b,c,d) is the corresponding plane representation. In some embodiments, the Global Localization process may instead use an LFF data structure to determine the distance (the LFF may provide the distance value directly without the need to compute the numerator "$d(y_n, C(y_n))$" explicitly). That is, $$\varepsilon_n = \frac{LFF(y_n)}{\sigma} \quad (11)$$

In the presence of outliers, some embodiments cap the value of $\varepsilon_n$ at a maximum value. The correspondence function C(•) may be defined differently in different measurement models as explained herein.

9. Pose Estimation—Pose Tracking—Scaling Series—Measurement Models—Likelihood Grid Model In some circumstances, the LF model may be far too time consuming for tracking (even when using KD trees) but it may be desirable to still use a smoother model (e.g., smoother than an IB model). Thus, in some embodiments, when mapping is complete, the mapping system may pre-compute a grid data structure (e.g., in 3 dimensions), storing the information about the closest model point in each grid cell. The Euclidean distance to a closest point on a surface may be stored as a float (the resulting data structure is referred to herein as an LFF). One will recognize other suitable data types. For example, an array of model points and their normals may be stored. An integer index of a closest point in each grid cell may then be stored. This resulting data structure is referred to herein as an LFI (likelihood field integer).

Figure 17:
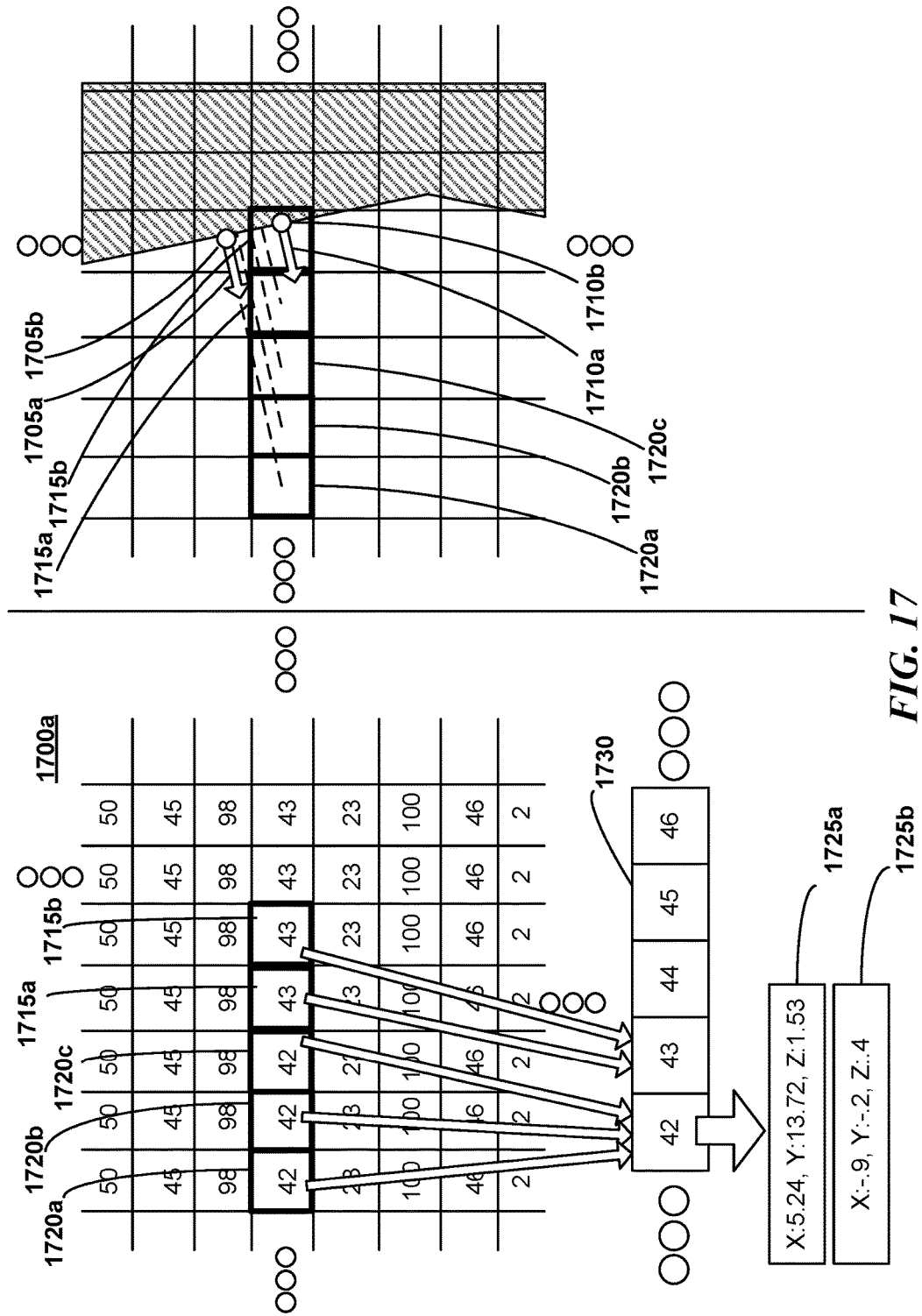
FIG. 17 is an idealized two-dimensional representation of a Likelihood Field Integer (LFI) data structure corresponding to a higher-dimensional structure in some embodiments.

FIG. 17 is an idealized two-dimensional representation of a Likelihood Field Integer (LFI) data structure as may be implemented in some embodiments. In this example, the center of cells 1715a and 1715b may be closest to the point 1710b on a surface having a normal 1710a at the point 1710b. Similarly, the center of cells 1720a, 1720b, and 1720c, may be closest to the point 1705b on a surface having a normal 1705a at the point 1705b. These same cells are highlighted in the view 1700a of the LFI cell structure to facilitate understanding. Cells 1720a, 1720b, and 1720c are assigned the same integer 42 and cells 1715a and 1715b are assigned the same integer 43. These assignments may correspond to entries in an array 1730. For example, the 42nd entry may contain position values 1725a and normal values 1725b corresponding to point 1705b and normal 1705a (more points may exist than those indicated on the surface, e.g., at discrete intervals along the surface). Note that points within the surface may also be associated with indices.

Figure 18:
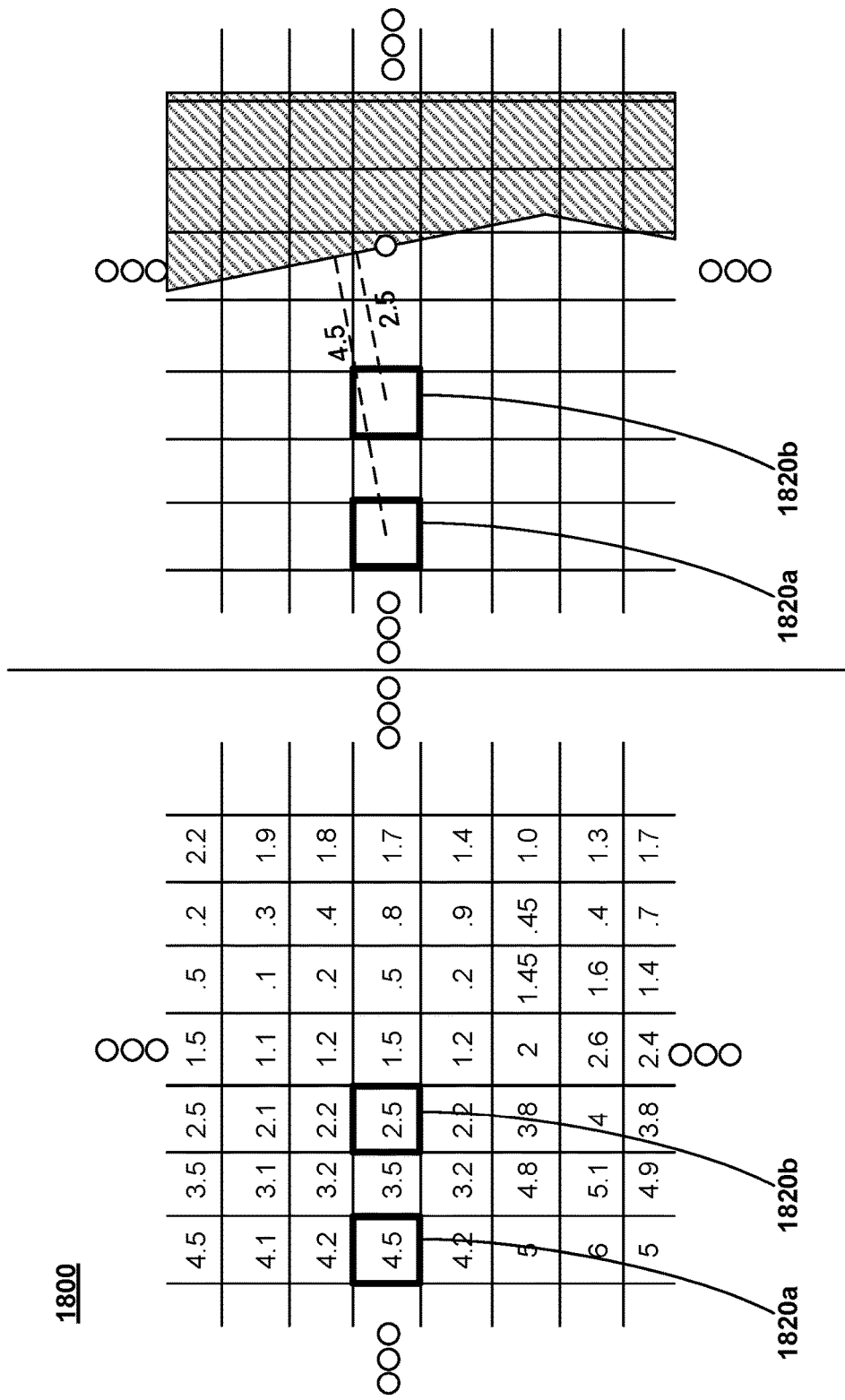
FIG. 18 is an idealized two-dimensional representation of a Likelihood Field Float (LFF) data structure corresponding to a higher-dimensional structure in some embodiments.

FIG. 18 is an idealized two-dimensional representation of a Likelihood Field Float (LFF) data structure as may be implemented in some embodiments. In this example, the center of a cell 1820a may be 4.5 units from a nearest surface and a center of a cell 1820*b* may be 2.5 units from a nearest surface. Accordingly, the LFF structure 1800 may include these values in the respective cells (highlighted here to facilitate understanding). Note that points within the surface may also be associated with distances to the surface (note that the distance values provided here are merely to facilitate understanding and may not be exact).

LFFs may be smaller and faster to look up than LFIs. LFIs may be slower due to double references, but may allow for point-to-plane distance computations. LFIs may also provide for more accurate matches at close distances since actual model points are used. Consequently, some embodiments use LFIs for pose tracking during regular operation of the AR device, and use LFFs for global localization.

10. Pose Estimation—Pose Tracking—Scaling Series—Measurement Models—Construction of LF Grids Both LFF and LFI may only have to be computed once for each new map and can be built right after the map construction. Construction may include putting all model points into a KD-tree, and then cycling through all grid cells and for each grid cell looking up the closest model point in the KD-tree. These KD-tree lookups can take a significant amount of time in some embodiments, especially for high-resolution LFFs and LFIs. To expedite construction, some embodiments may limit the maximum radius $\mu_r$ to be searched around each grid cell.

11. Mapping—Mesh Construction—Range Discontinuities

In some embodiments, the system may detect range discontinuities in the depth data during, e.g., mapping operations. Range discontinuities can be sharp transitions in the range to obstacles for neighboring pixels in the depth image. These discontinuities can be caused by object boundaries in the environment. When one pixel measures range to a close-up object, and the neighboring pixel just misses that object and measures range to the background, the difference in range can be very large.

To detect a range discontinuity, some embodiments compare the depth values of neighboring pixels. If the difference is greater than a threshold $k_{disc}$, then the system may identify a discontinuity. The value of $k_{disc}$ may depend on the noise properties of the specific RGBD sensor employed in the embodiment. For time-of-flight (TOF) cameras, $k_{disc}$ may remain constant. For projection cameras, $k_{disc}$ may be a function of the range to the scan point.

12. Mapping—Mesh Construction—Miscellaneous Techniques—Plane Priors

In some embodiments, even when a map is being built "from scratch", prior information about the environment may be readily available. For example, most homes have a planar floor. This information can be captured by initializing the TSDF with a planar surface. The planar surface may help ensure that the resulting map will have a flat floor. In contrast to using a prior map, some embodiments will not use global localization to position the first frame when applying plane priors. Instead, the system may estimate the floor plane in the first frame using techniques described herein (e.g., in the section with numerical identifier #13 and any corresponding subsections). The system may then align the first frame's floor plane with the given prior plane. This may still leave several degrees of freedom unconstrained for the first frame's pose (e.g., the frame could be translated along the floor and rotated around the vertical). In some embodiments, these additional degrees of freedom can be adjusted by the user.

13. Mapping—Map Post-Processing—Planes and Floor Extraction

A lot of useful knowledge about the environment can be obtained in some embodiments by extracting large planar surfaces. In some instances, the largest planar surface facing up will be the floor and largest planar surface facing down will be the ceiling. Walls may be identified as large vertical planar surfaces. One way to extract the planes from the mesh, in some embodiments, is to use the directional components described herein for mesh unwrapping. For each large enough component, the system may fit a plane to the vertices using decomposition technique, e.g., Principal Component Analysis (PCA).

The average deviation of the points from the plane may serve as a non-planarity score. Components with a non-planarity score below a certain threshold can be considered planar. For example, the largest such component aligned with +z axis may be identified as the floor. A similar technique can be used to extract planar surfaces from a depth scan. In this case, there may be no faces. Instead, neighbors of a scan point may be the scan points of the adjacent pixels (though some embodiments are careful not to cross depth discontinuity boundaries). Provided that the orientation of the camera in world coordinates is approximately known (e.g., from the IMU, or by having asked the user to point the camera down, or alternatively forward, etc.), the largest planar +z component may be identified as the floor. Some embodiments use this technique to extract the floor plane for the plane priors for example, as discussed in the section with numerical identifier #12 and any corresponding subsections.

14. User Interface and Applications—Home Organization and Inventory

Today people accumulate large amounts of items in their homes and it is becoming difficult to keep track of it all. For this reason, home inventory applications have become very popular. These applications require you to either manually enter an item's details, or scan a bar code on its packaging. These apps also require users to manually set where each item belongs in the house. The 3D map may provide a tremendous amount of information to the system, which can be used to greatly simplify and improve home inventory apps. The system may segment and recognize objects in a home or office without any manual entry. The system may also remember where it last saw each item, or which locations are common for a certain item. With this information, the system may act as a 3D search engine, helping users to locate items in their home, office, warehouse, laboratory, operating room, etc. The system may also keep track of item inventory and alert the user when supplies run low (e.g., of bottled water or paper towels). Thus scanning data may be consolidated across devices (e.g., an employee and a managers separate temporal scans may be used to assess the environment). Further, for each item, the system may help users identify the item's place in the environment, and thus help users to organize, e.g., their house.

Figure 19:
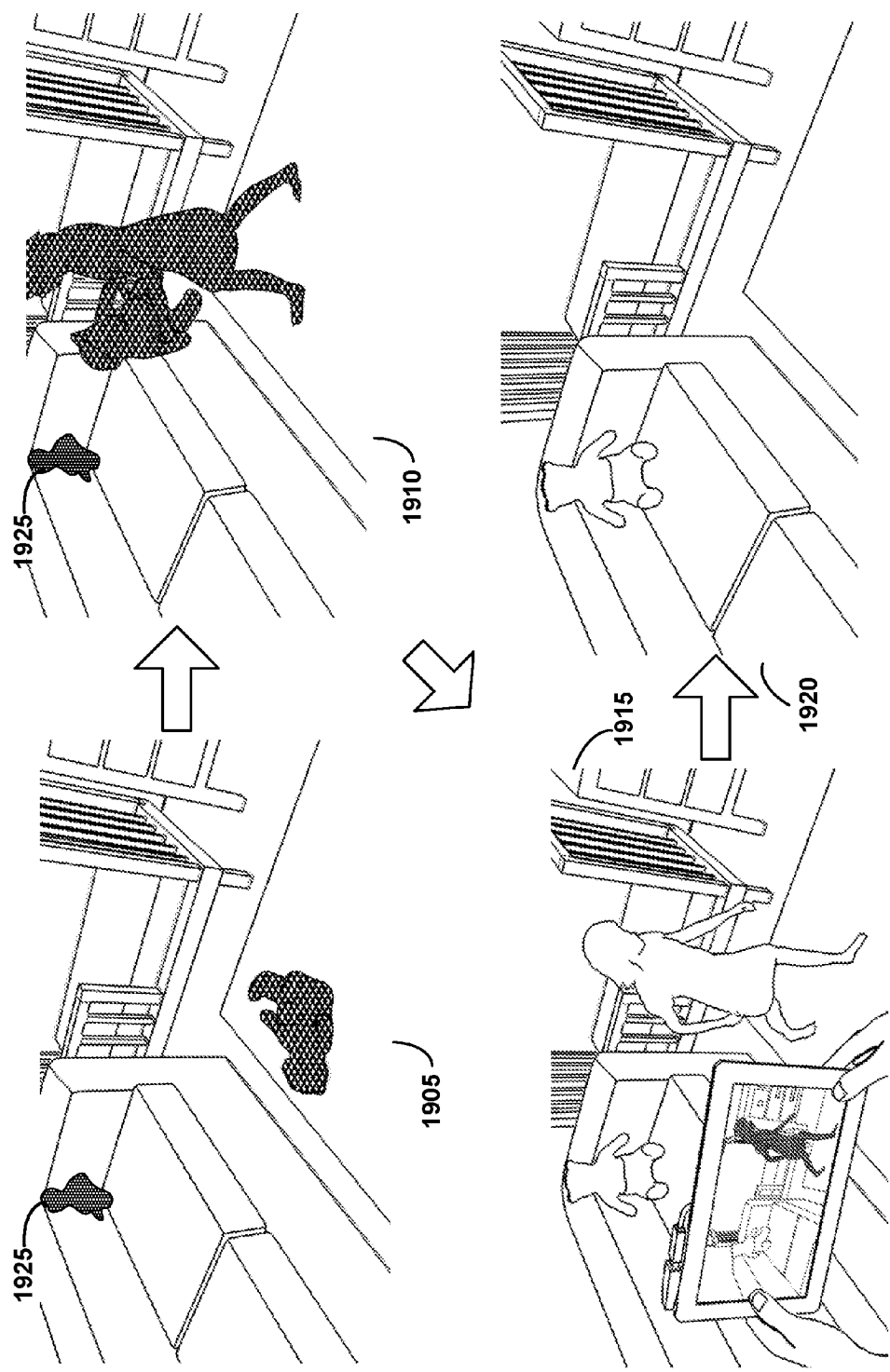
FIG. 19 is a sequence of screenshots and photographs illustrating features of a "clean-up mode" encouraging children to keep their rooms clean as may be implemented in some embodiments.

Some embodiments can detect when items are out of place using the 3D model. With this information, the system may, e.g., encourage children to clean-up their rooms as illustrated in FIG. 19. An application (e.g., running on a tablet device serving as an AR device) may award "points" once the child has cleaned-up his/her room (points may be used, e.g., to unlock games or other desirable features for the child). As shown in screenshot 1905 one toy (a teddy bear) is out of place. The toy and the place where it belongs 1925 are highlighted in red. For example, the pixels identified as corresponding to discrepancies in the map may be highlighted. As shown in screenshots 1910 and 1915 a child is cleaning up her room. After clean-up, as shown in screenshot 1920 the system may recognize the room as clean. For example, every evening a child (or parent) may scan the room with the AR device. The device will highlight all items out of place. By cleaning-up these items, the child may earn points, which he/she can later use to purchase games, toys, or other items. The system may also be configured to display advertisements to the child (e.g., upon replacing a doll to its proper location the system may inform the child of a newer version of the doll now available). Since more than one configuration of the child's room may be acceptable, embodiments of the system may allow the parent to approve several configurations. The room may be considered clean whenever any one of these configurations is achieved to a desired degree.

To implement the clean-up mode, some embodiments reuse the LFI data structure described in greater detail herein, e.g., in the section with numerical identifier #9 and any corresponding subsections. Given a data scan, each scan point may be classified as "cleaned-up" or "out-of-place" based on the distance to the map using the LFI data structure. The threshold, beyond which a scan point may be considered to be "out-of-place", can be the same as the range discontinuity threshold described in greater detail herein, e.g., in the section with numerical identifier #11 and any corresponding subsections.

Some embodiments mark "out-of-place" points red (e.g., as an overlay on the real-world image presented in the user device). The system may then split the red points into connected components by proximity. Clusters with very small number of points may be filtered out, e.g., as they may constitute outliers caused by sensor errors. The remaining clusters may be considered objects which are out of place. To mark a specific configuration of the room as acceptable, the user may point the camera at a part of the room and press a "Mark as Clean" button. Points from the red clusters found in the data scan may be added to the LFI. Then, the system may recompute LFI cells within some radius around these newly added points.

Head Mounted Embodiments Overview—Example System Topology

Figure 20:
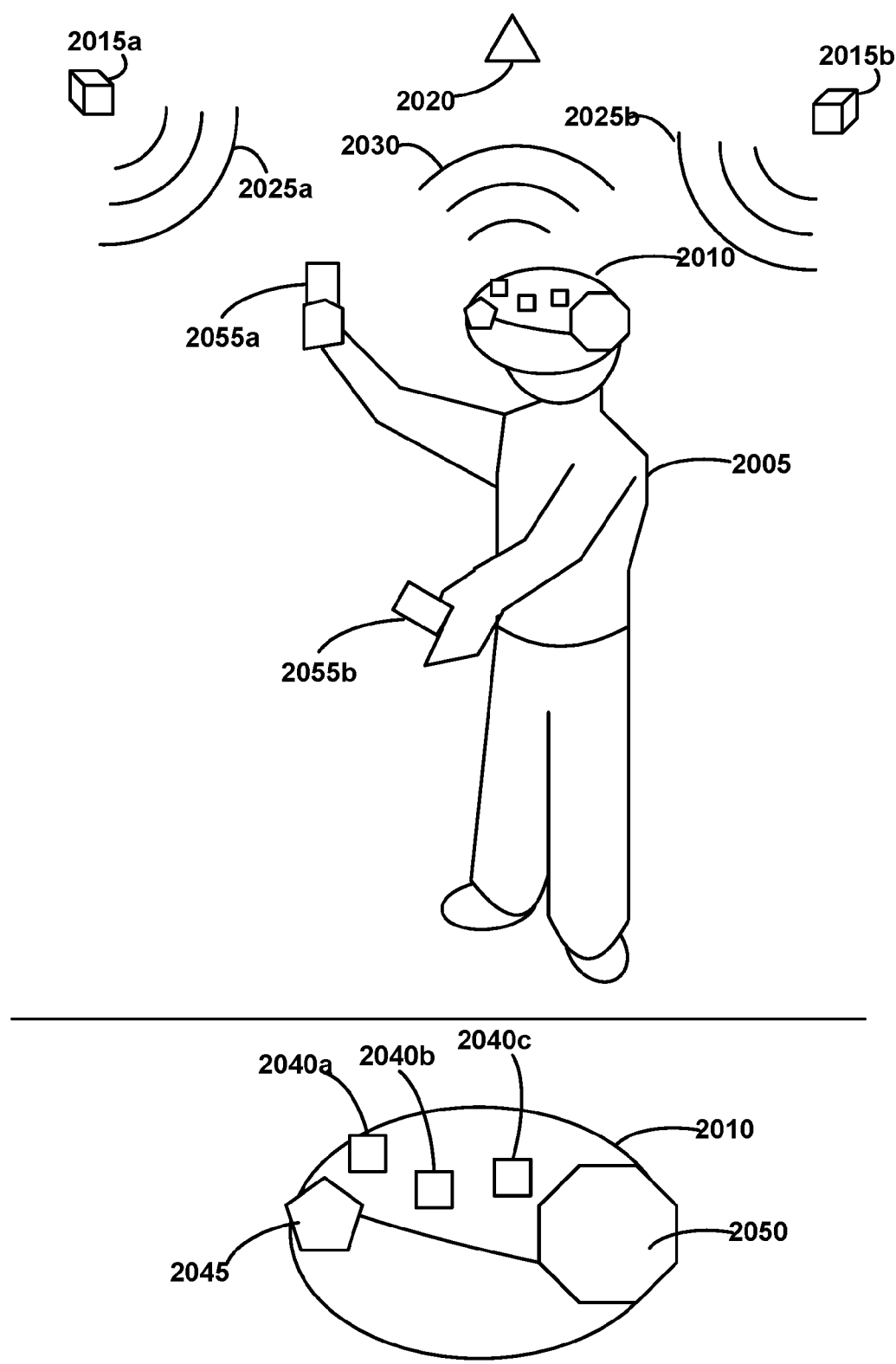
FIG. 20 is an example HMD configuration which may be used in some embodiments.

FIG. 20 is an example HMD configuration, which may be used in some embodiments. A user 2005 may wear an HMD 2010 with a screen providing a computer-generated field of view to the user 2005. The HMD 2010 may include a capture device 2045 configured to acquire depth and/or visual image data (e.g., RGB data). The capture device 2045 may be situated so as to capture data in the field of view of the user 2005 occluded by the HMD 2010. Some embodiments of the HMD 2010 may include earphones 2050 and other peripheral features, e.g., a microphone.

In some embodiments, pose estimation of the HMD 2010 (and consequently the user's head) may be performed locally using, e.g., an inertial measurement unit (IMU). Some embodiments may relay depth data information from capture device 2045 to a processing system which may infer the pose relative to a previously acquired depth map of the environment. In some embodiments, the HMD 2010 may include a plurality of reflectors or collectors 2040a, 2040b, 2040c which may be used in conjunction with a plurality of emitters 2015a, 2015b. Emitters 2015a, 2015b may generate electromagnetic signals 2025a, 2025b (e.g., via antennas or lasers) which may be then reflected from the reflectors or absorbed by collectors 2040a, 2040b, 2040c (e.g., the Valve™ Lighthouse™ positioning system need not use reflectors). Where reflectors are used, the reflected signals 2030 may then be collected at a collector 2020 and interpreted to ascertain the current pose of the HMD 2010. This pose may be relayed to the currently running application (e.g., to determine the relative orientation of the HMD 2010 to a virtual object in the AR or VR experience).

In some embodiments, the user may hold one or more interface controllers 2055a, 2055b. The controllers 2055a, 2055b may be in communication with the HMD application (e.g., via Bluetooth connection), relaying their orientation and/or position. The controllers 2055a, 2055b may include buttons, switches, analog sticks, etc.

15. Example Activity Region Generation

FIG. 21 is an example environment with illustrations of the activity region as may be constructed in accordance with some embodiments. The user 2105 may be invited to perform a region determination process before beginning an AR or VR application session. Where the user 2105 is located in an environment, such as an office or living room, various obstacles may limit their mobility. A couch 2125, chair 2110, coffee table 2115, and glass table 2120 may all present obstacles, impeding the user's 2105 range of motion in the room. Though many obstacles may be on the floor, some may also be in the air (e.g., a low-hanging chandelier). Though not impeding the user's motion, window 2130 may be transparent and accordingly be undetected by some depths sensors (accordingly, the user may need to manually identify both glass table 2120 and window 2130 as described herein).

In contrast to the perspective view 2100a, the top-down view 2100b, demonstrates an initial portion 2145a of the room floor designated for user movement during the AR/VR experience (e.g., an initial active region). Unfortunately, movement in these regions would cause collisions with, e.g., objects 2125, 2110, and 2115. Accordingly, the active region configuration process 2140 would ideally exclude regions around these objects to prevent collisions. For example, the system and/or user would preferably identify a modified floor pattern 2145b (e.g., the updated active region), that excludes the objects. Though the active region is referred to as a "floor" in some embodiments herein, one will recognize that the region may comprise a "volume" in some embodiments, which may itself include the floor as a surface of the volume.

When the user begins the configuration process, the system may invite the user 2105 to scan their head about the room. In this manner, the HMD's depth sensor 2045 may be able to readily identify opaque objects such as couch 2125, chair 2110, and table 2115. As opaque objects are detected, their exclusion from the active region may be indicated to the user, e.g., by coloring the floor of the active region as one color and/or adding a tint color to obstacles (e.g., as part of an AR experience). Some objects, however, such as the surface of glass table 2120, may not lend themselves to automated detection using the depth sensor as the depth sensor is not configured to recognize transparent objects (e.g., the electromagnetic wavelengths used by some depth sensors pass through transparent objects, rather than reflect from their surface). Accordingly, the user may manually identify these transparent objects in some embodiments, the manual identification being likewise reflected in the AR depiction of the presently configured active region.

For example, FIG. 22 illustrates the progressive construction of an active region as may occur in some embodiments. A virtual representation of the active region 2205 may be introduced into the user's view of the real world. As physical objects are detected (e.g., either manually by the user or automatically by the system), the representation may be adjusted 2220, introducing reductions 2215a, 2215b to produce a modified active region 2210. Again, in some embodiments the active region may be depicted as a three dimensional volume to the user (as here), as a portion of the floor surface, etc.

When the user recognizes that an obstructing object has not been considered in a reduction, e.g., because the glass table 2120 was not detectable with the depth sensor, the user may manually make the reduction. For example, the user may initiate a manual reduction designation process to specify the presence of, e.g., the glass table 2120. The user may move the HMD around the glass table 2120, or run one or more of controllers 2055a, 2055b across the glass table's 2120 surface, to identify the outer limits of the object. In some embodiments, the user may indicate the boundaries of the glass table with specific hand gestures. In some embodiments, the user may indicate the boundaries of the glass table (or other transparent object, or object not identified) by putting their hand on the table and pushing a button (e.g., on the HMD, on a controller, or other input device). The user may glide their hand along the boundary of the object (e.g., while the button is pressed, or until a "finished" signal is provided, such as by pressing a button or making a gesture). The system would, e.g., detect the user's hand, identify the "tip" or center of gravity of the hand as a defining portion, and then mark the entire trajectory that this portion traveled as a boundary. The HMD application may then introduce a reduction to the contemplated active region corresponding to the identified object or boundary (or otherwise exclude the object from the active region).

Rather than reducing a presumed volume via subtractions, some embodiments instead allow the user to define an active region by additions (e.g., allowing the user to walk around the region in which they are comfortable maneuvering). For example, the user may scan the room with the HMD, constructing the active region as they view different regions (e.g., as described in greater detail with respect to FIG. 25).

16. Example Activity Region Configuration Process

Figure 23:
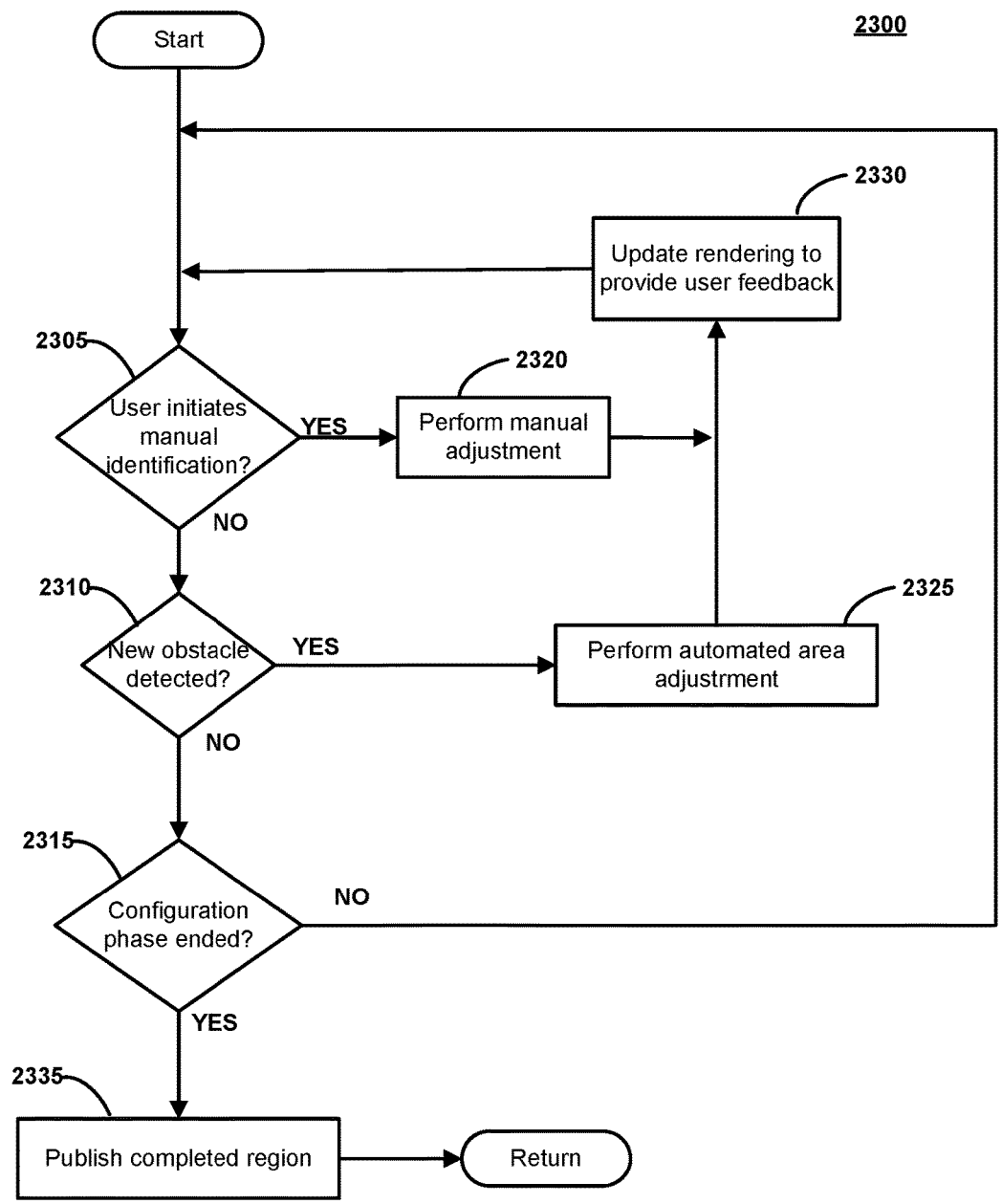
FIG. 23 is a flow diagram illustrating an example method for progressive construction of an activity region as may occur in some embodiments.

FIG. 23 is a flow diagram illustrating an example method 2300 for progressive construction of an activity region as may occur in some embodiments. At block 2305, the system may determine if the user has initiated a manual identification of an object. For example, the user may have pressed a button or made a hand gesture. If so, a manual process adjustment to the active region, using, e.g., controllers 2055a, 2055b, the user's hands, etc., may be initiated at block 2320. The system may then update the rendering of the active region to the user at block 2330, providing feedback regarding the ongoing or completed manual process adjustment. For example, the system may progressively render a subtraction from the representation of the active region based on the user's inputs.

At block 2310, the system may assess whether a new obstacle has been detected automatically, e.g., via passive assessment of the depth sensor as in "clean-up mode" described herein, while the user looks about the room. These automatically detected objects may also result in an adjustment at block 2325, and the AR rendering updated to provide feedback at block 2330 (e.g., again showing the change in dimensions of the active region).

Once the configuration phase has ended at block 2315, e.g., following a user indication that the region is acceptable, the system may publish the completed region at block 2335 to the AR or VR application. Publication may involve, e.g., the storage of the active region in memory for reference by subsequently run AR and VR applications. One will recognize that in some embodiments, such automated active region creation may occur simultaneously with creation of a virtual map of the environment (e.g., reconsidering the incoming depth frames both for map creation and for active region configuration). Thus, the user may scan their head while wearing the HMD, both to map the environment and to exclude portions from the active region.

17. Active Monitoring

Following configuration of the active region and during the subsequent AR or VR process, the system may continue to monitor the real-world surroundings to determine if new obstacles have appeared. Similarly, previously generated active regions may be reused in subsequent AR/VR sessions. Prior to, or during, the AR or VR session, the system may determine whether there are new or modified obstacles in the environment (e.g., again applying the "clean up mode" methods disclosed herein). When such problematic or unexpected obstacles are identified, the HMD may initiate a process (e.g., an AR application) to inform the user of the discrepancy and to have the user address the presence of the new object.

For example, FIG. 24 is a perspective view of a real-world environment, wherein displaced and dynamic objects relative to an original active region definition are highlighted, as may occur in some embodiments. Particularly, in the absence of any new problematic objects, the HMD may present only the real-world environment, as depicted in view 2400a, during a pre-configuration process. In the absence of any new problematic objects, the system may continue to observe the environment during an AR/VR session, but will not notify the user of any changes.

Should a dynamic obstacle, e.g., a real-world dog 2410, be detected during an AR/VR session, however, the system may suspend the AR/VR session and begin an AR session 2400b directing the user to address the new object. For example, highlighting the object 2405a, e.g., with a colored outline, shading, marching ants, etc. to call attention to the new object. The user can then decide whether to remove the object, or to incorporate it into the active region (thereby reducing the active region to not include the area under the object).

Similarly, when previously identified objects have been moved, the system may request user confirmation or correction via an AR process. For example, if a previous active region was determined while the table 2115 was in position 2420, the system may recognize that the table has been moved to a new position 2415 (before or during an AR/VR session—this may be implemented using, e.g., an implementation of the "clean-up mode" as described, e.g., in U.S. Provisional Patent Application 62/080,400 or U.S. Provisional Patent Application 62/080,983). Consequently, the system may not only initiate the AR process to invite the user to address the discrepancy, but may also introduce one or more virtual objects 2405b, illustrating the new 2415 and expected 2420 positions of the object. The virtual objects may include, e.g., a highlighted version of the object at its previous location 2420, a virtual circle 2405b surrounding the object at its new position 2415, etc. The user may then return the table to its original position, or decide to adjust the active region based upon the table's current position.

18. Mapping and Activity Region Determination

Figure 25:
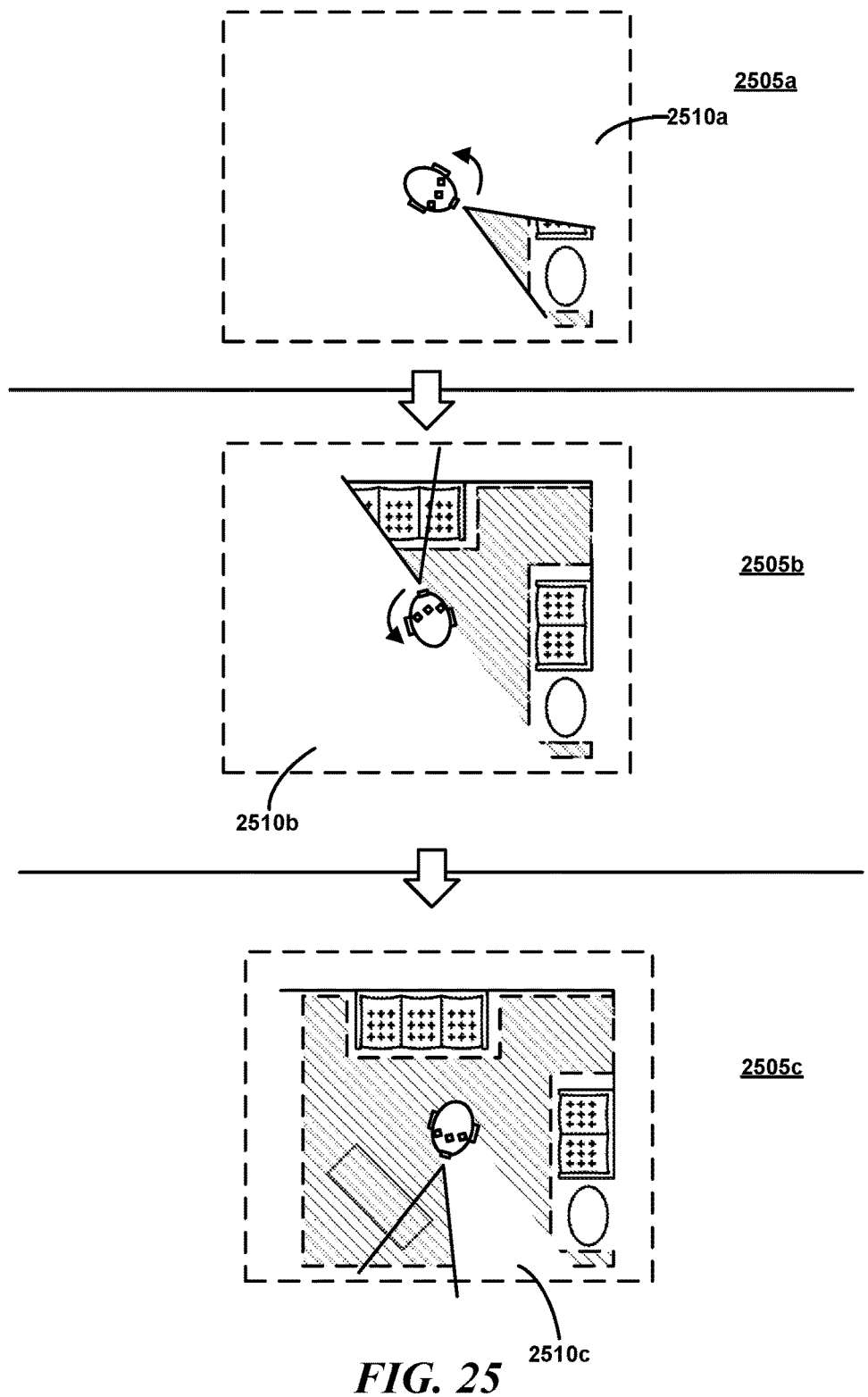
FIG. 25 is a top-down view illustrating portions of a mapping and activity region determination process as may occur in some embodiments.

FIG. 25 is a top-down view illustrating portions of a mapping and activity region determination process as may occur in some embodiments. For example, it may be convenient for the user to both map their environment (e.g., create a virtual model) while also designating the active region. As the user, standing in the middle of the room, rotates their head counterclockwise while wearing the HMD (or using any other suitable AR device) the unmapped portions of the room 2510a, 2510b, 2510c become progressively smaller in successive periods of time 2505*a*, 2505*b*, 2505*c*. The system may progressively generate the map of the environment and detect the floor, e.g., as described in U.S. Provisional Patent Application 62/080,400 and U.S. Provisional Patent Application 62/080,983. In some embodiments, the floor may be used to determine the volume of the activity region. The system may exclude regions beneath objects, such as the couch and coffee table, from the activity region. However, because the glass table does not reflect the depth sensor emissions, the system may unknowingly include the glass table within the activity region. In some embodiments, the user may manually remove the glass table and similar objects from the activity region.

Figure 26:
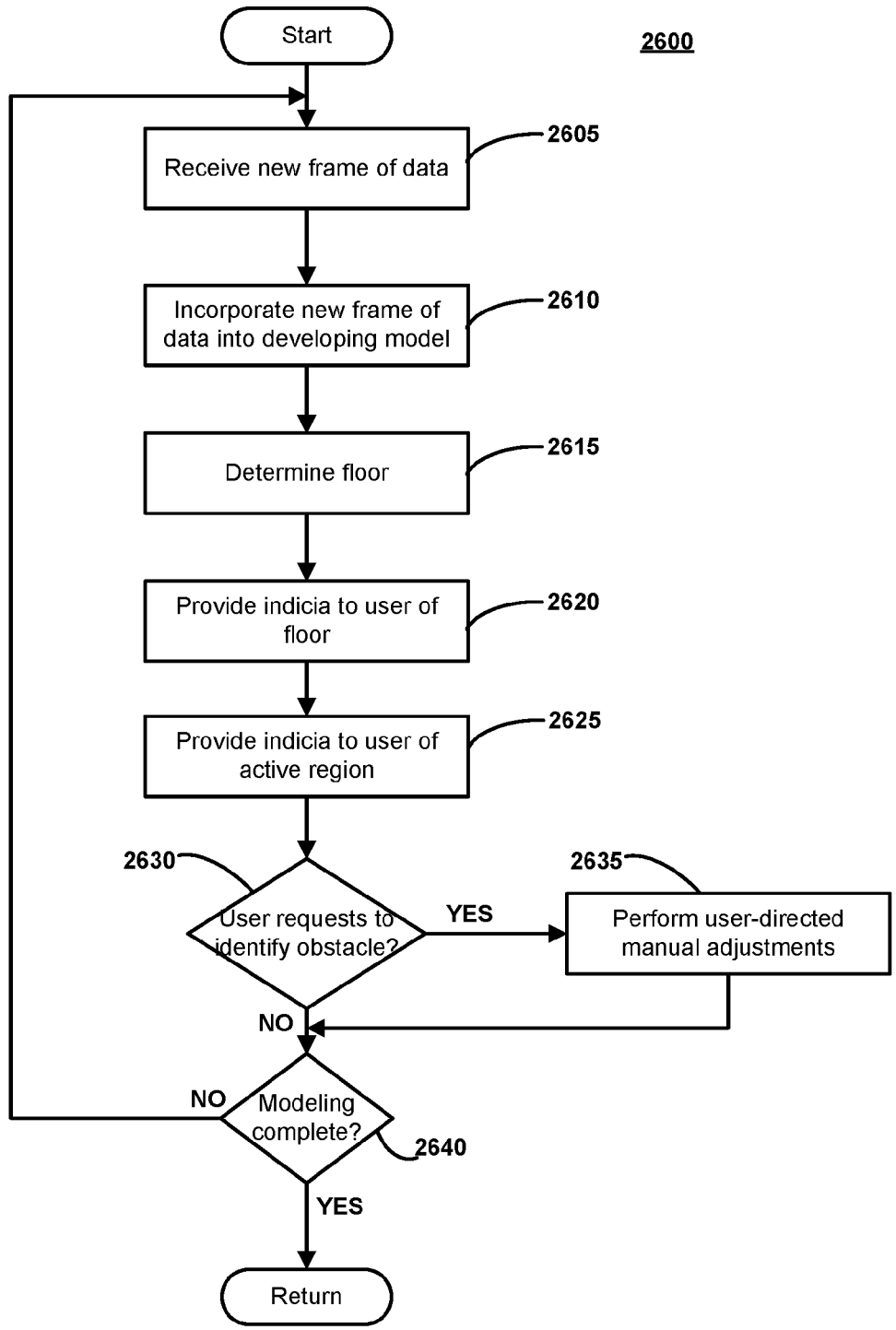
FIG. 26 is a flow diagram illustrating an example implementation of the mapping and activity region determination process of FIG. 25 as may occur in some embodiments.

FIG. 26 is a flow diagram illustrating an example implementation of the mapping and activity region determination process 2600 of FIG. 25 as may occur in some embodiments. At block 2605, the system may receive a new frame, such as an RGBD frame, from the HMD or other suitable AR device. At block 2610, the system may incorporate the new frame into the ongoing creation of a model of the environment (e.g., a vertex mesh with a texture). At block 2615, the system may determine the floor in the current user's field of view, e.g., using the methods described in Sections 12 and 13 herein. At block 2620, the system may indicate the portion of the field of view corresponding to the floor (e.g., coloring that portion of the user's field of view). The system may also provide indicia of the active region at block 2625 (which may be the same or different from the floor depending upon the embodiment).

If the user requests to manually specify an obstacle in the active region at block 2630, such as when the user observes that the glass table 2120 has been included in the active region, then the user may manually modify the active region at block 2635 (e.g., running a controller along the dimensions of the glass table 2120, or pressing a button on the HMD headset while running their fingers along the glass table, etc.). The process may continue for additional frames if the model of the environment is not yet complete at block 2640.

19. Activity Region Checking and Updating

In some embodiments, once the user has mapped out and/or generated a desired active region, the system may reuse that region in future invocations (e.g., starting a new AR or VR session within that region). The user may check and update the region rather than redefine the region during or before beginning these sessions. The system may begin this verification by relocalizing the user on the prior generated map, and showing the user the prior created active region (e.g., by coloring or tinting the floor). In some embodiments, the system may exclude all the previously user specified obstacle regions or may specify where the user indicated obstacles previously (e.g., by showing a glowing line in 3D where the user demarcated the obstacle). The system may do the same for any automatically detected objects. The system may also indicate whether any items are out of place (for example, if a new obstacle is present in the room the system can indicate that such obstacle was not present before, such as by using "clean-up mode" in e.g., U.S. Provisional Patent Application 62/080,400 or U.S. Provisional Patent Application 62/080,983). If some obstacles are now missing, the system may indicate their absence by displaying their outlines, presenting a virtual object representation at the expected location, etc. For each visible change, or alternatively for all visible changes, the user may either manually move the new obstacles out of the way (e.g., clean the room), or may mark that this obstacle (or all visible obstacles) should be updated in the active region (thereby subtracting the parts of active region where these obstacles reside). The user may additionally be able to remove and/or create new user specified obstacle regions in case the non-visible obstacles (such as glass table) have been moved.

20. Object Anticipation

Figure 27:
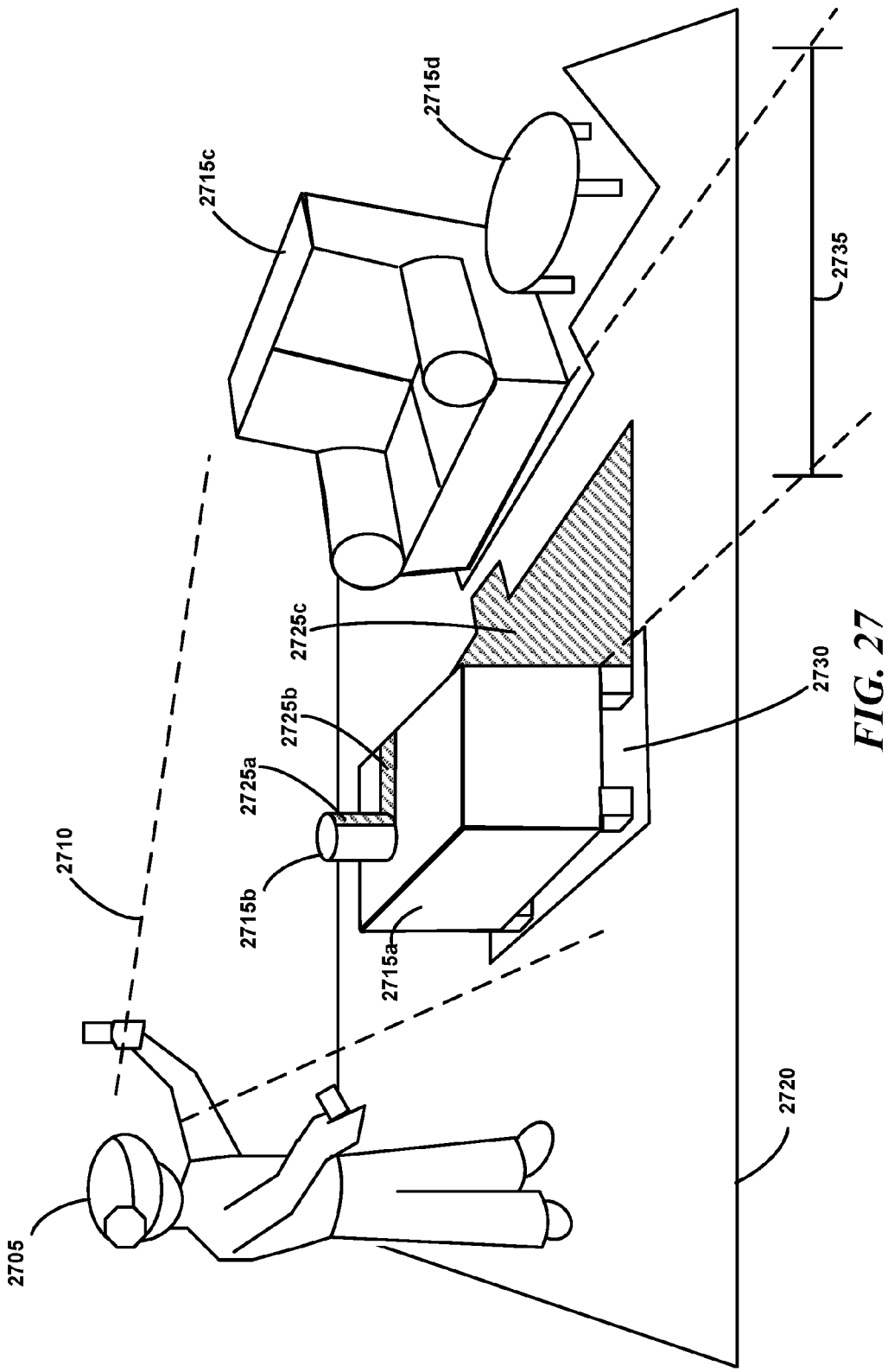
FIG. 27 is a perspective view of a real-world environment during an active region creation process wherein unknown and uncertain regions are depicted, as may occur in some embodiments.

FIG. 27 is a perspective view of a real-world environment during an active region creation process, wherein unknown and uncertain regions are depicted, as may occur in some embodiments. Particularly, as a user maneuvers the depth and/or camera sensor attached to the head-mounted system 2705, the sensor's field of view 2710 encounters different regions of the room. Here, the floor of the active region 2720 has already been partially generated in response to these motions. The system has excluded objects 2715*c* and 2715*d* from the active region. However, objects 2715*a* and 2715*b* have occluded the portions 2725*a-c* of the user's field of view (as well as the volumes immediately above them).

In some embodiments, the system may recognize an object based upon its shape, texture, or a combination of the two. The system may then identify the recognized object in a database, such as a merchant database or a database of previously recognized items, having the object's corresponding dimensions. These dimensions may then be used to infer the nature of the occluded region. In this manner, the system may exclude the portion 2730 from the active region 2720 based upon the dimensions corresponding to object 2715*a*. Similarly, if the system recognizes object 2715*b*, the system may estimate the likelihood of objects appearing in the occluded region 2725*b*. Based on this estimation the system may determine whether the occluded region must be resolved, excluded from the active region, or left for future consideration.

Particularly, the system may consult with the virtual application during active region creation to determine if occluded regions may be ignored or excluded from the active region. For example, some virtual applications may require a minimum amount of contiguous active space within which the user may move freely. Even without viewing the occluded region, the system may infer the maximum distance 2735 between objects 2715*a* and 2715*c*. If this distance is less than the virtual application's requirements, the system may exclude this region, as well as the occluded portion 2725*c*, from the active region 2730, without attempting to discern its contents.

Similarly, in some embodiments, the system may determine occluded regions that are unknown, occluded regions that are likely empty, though uncertain, and occluded regions that are unknown, but can be assessed during the virtual application, rather than before the virtual application is run. This classification can proceed based upon the dimensions of the recognized objects. For example, until the user has entered occluded region 2725*c* it may not be physically possible for the user to move their hand through the volume extending above occluded region 2725*b*. Thus, the system may defer classifying the volume extending above occluded region 2725*b* as being in or outside the active region until after the user begins to enter the region 2725*b* during the virtual application. These real-time adjustments may be especially suited to virtual applications facilitating dynamic environment creation (e.g., in a virtual environment depicting a dungeon where dungeon walls and props can be added/removed during the virtual application in accordance with newly determined active region constraints).

Figure 28:
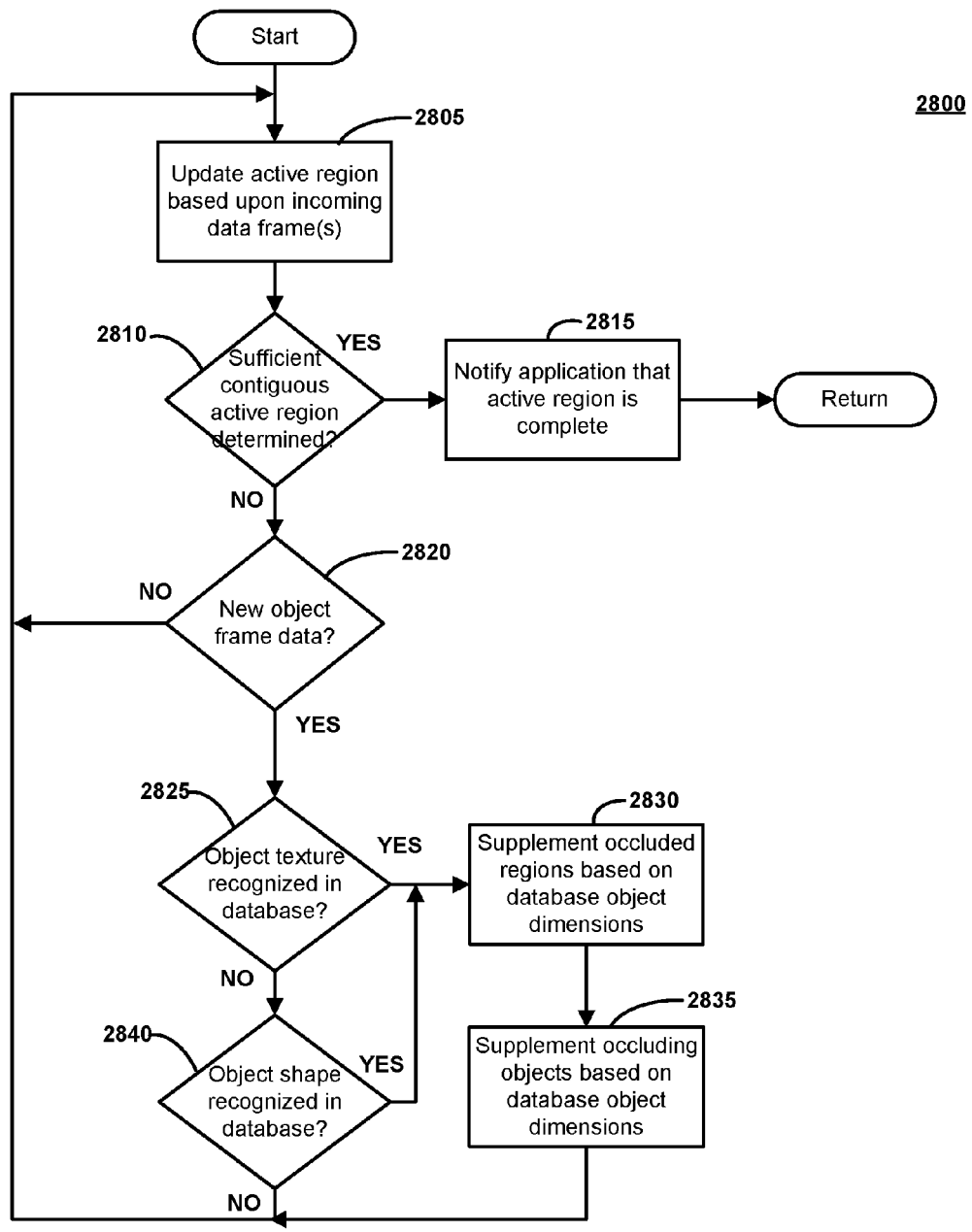
FIG. 28 is a flow diagram illustrating aspects of an example process for integrating knowledge regarding objects into the active region creation process, as may occur in some embodiments.

FIG. 28 is a flow diagram illustrating aspects of an example process 2800 for integrating knowledge regarding objects into the active region creation process, as may occur in some embodiments. At block 2805, the system may update the active region based upon incoming data frames from the head-mounted and/or related systems (as discussed herein, in some embodiments, the system may synthesize depth data from a plurality of depth determining sensors distributed around an environment). If a sufficient contiguous active region has been generated at block 2810, the system may notify the virtual application that the application may run at block 2815. The determination at block 2810 may be made in conjunction with the virtual application. For example, the system may consult with the application and its requirements as discussed below with respect to FIG. 29.

At block 2820, the system may determine whether the new depth frame permits the system to recognize an object from a database (e.g., in conjunction with previously acquired frames and/or using the object's texture). If not, the system may continue to receive depth frames as part of the active region determination process. However, if an object is present, and it has been recognized either by texture at block 2825 and/or by shape at block 2840, the system may supplement the occluded regions at block 2830, based upon the knowledge of the object as a whole. At block 2835, the system may additionally supplement the occluded regions for other objects. For example, with reference to FIG. 27, the dimensions of object 2715a can inform the nature of the volume extending above the region 2725b occluded by object 2715b. The system may then continue receiving frames until the active region is created.

Figure 29:
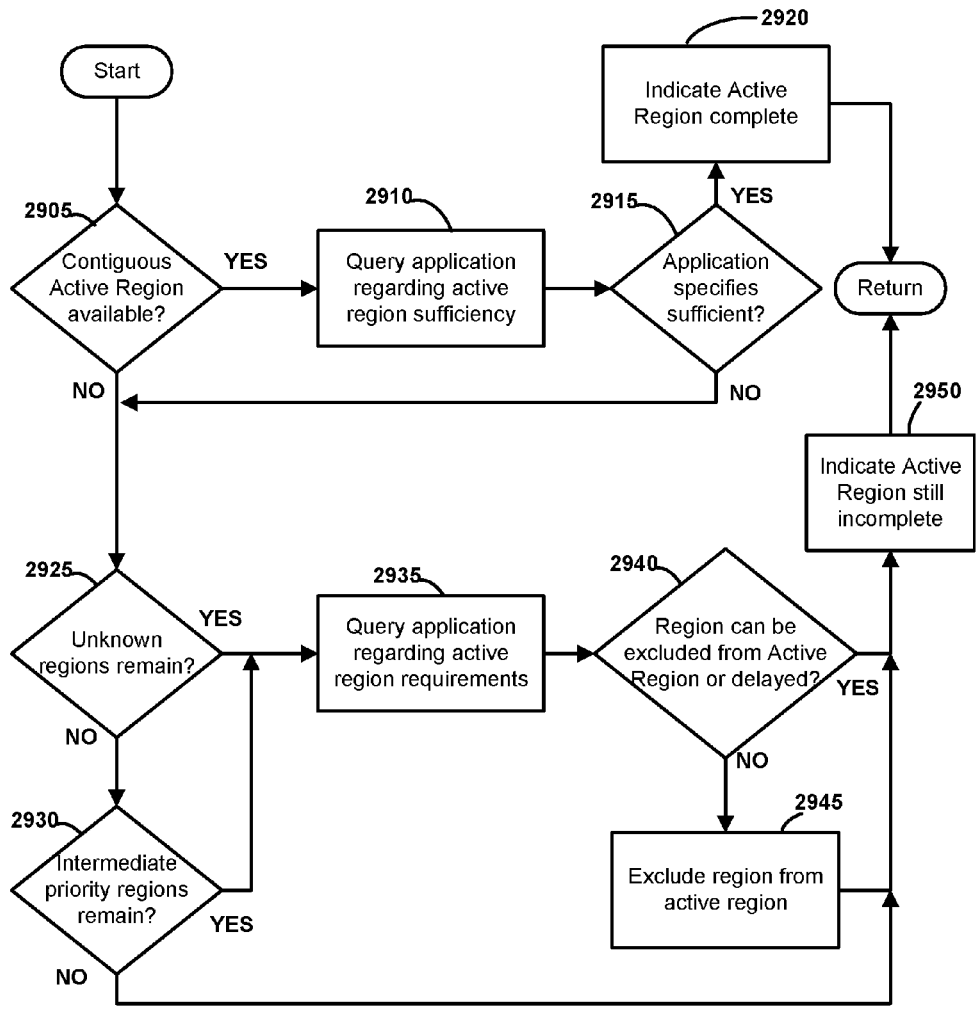
FIG. 29 is a flow diagram illustrating aspects of an example process for integrating unknown and uncertain regions into the active region creation process, e.g., as part of the determination at block 2810, as may occur in some embodiments.

FIG. 29 is a flow diagram illustrating aspects of an example process 2900 for integrating unknown and uncertain regions into the active region creation process, e.g., as part of the determination at block 2810, as may occur in some embodiments. Particularly, at block 2905, the system may determine if a contiguous active region is available. In some applications this may not be the case, but often, the user will not be able to walk between disconnected active regions. Accordingly, the system should attempt to continue to resolve ambiguous regions so as to identify a contiguous region.

When a contiguous region is not present, at block 2925, the system may determine if unknown regions remain and at block 2930, whether "intermediate" priority regions remain. "Unknown" regions may refer, e.g., to the occluded portions 2725c which are not yet known. Including such regions within the active region without confirming their free passage may be dangerous. "Intermediate priority" regions refer to regions, which may be included in the active region, but whose safety may be preferably ascertained in advance. For example, while the volume extending above occluded region 2725b could be reviewed in real-time during the virtual application's operation, it would be preferable to review the region ex ante. For these regions, the system may delegate the decision to the requirements of the virtual application.

When these regions are present, at block 2935, the system may query the virtual application to ascertain its requirements. Based on these requirements, the system can determine at block 2940, whether to exclude the region at block 2945. For example, if the width 2735 is too small for the virtual application's needs, the intervening portion may be excluded from the virtual region. Similarly, consulting with the virtual application may permit the system to convert unknown regions to "intermediate priority" regions, based upon the application's requirements.

At block 2950, the system may indicate that the active region is still incomplete. In this case, the system may continue to acquire depth frames until a contiguous grouping is found at block 2905. With a continuous grouping, the system may again consult with the application at block 2910 to verify the contiguous active region's sufficiency. This may include, e.g., ascertaining that the floor of the active region is sufficiently large, of the proper dimensions, that the active region volume is large enough, etc. Once the virtual application concurs at block 2915 that the active region is sufficient, the system may indicate as much at block 2920 and begin to transfer operation to the virtual application.

21. Unexpected Object Warnings

Figure 30:
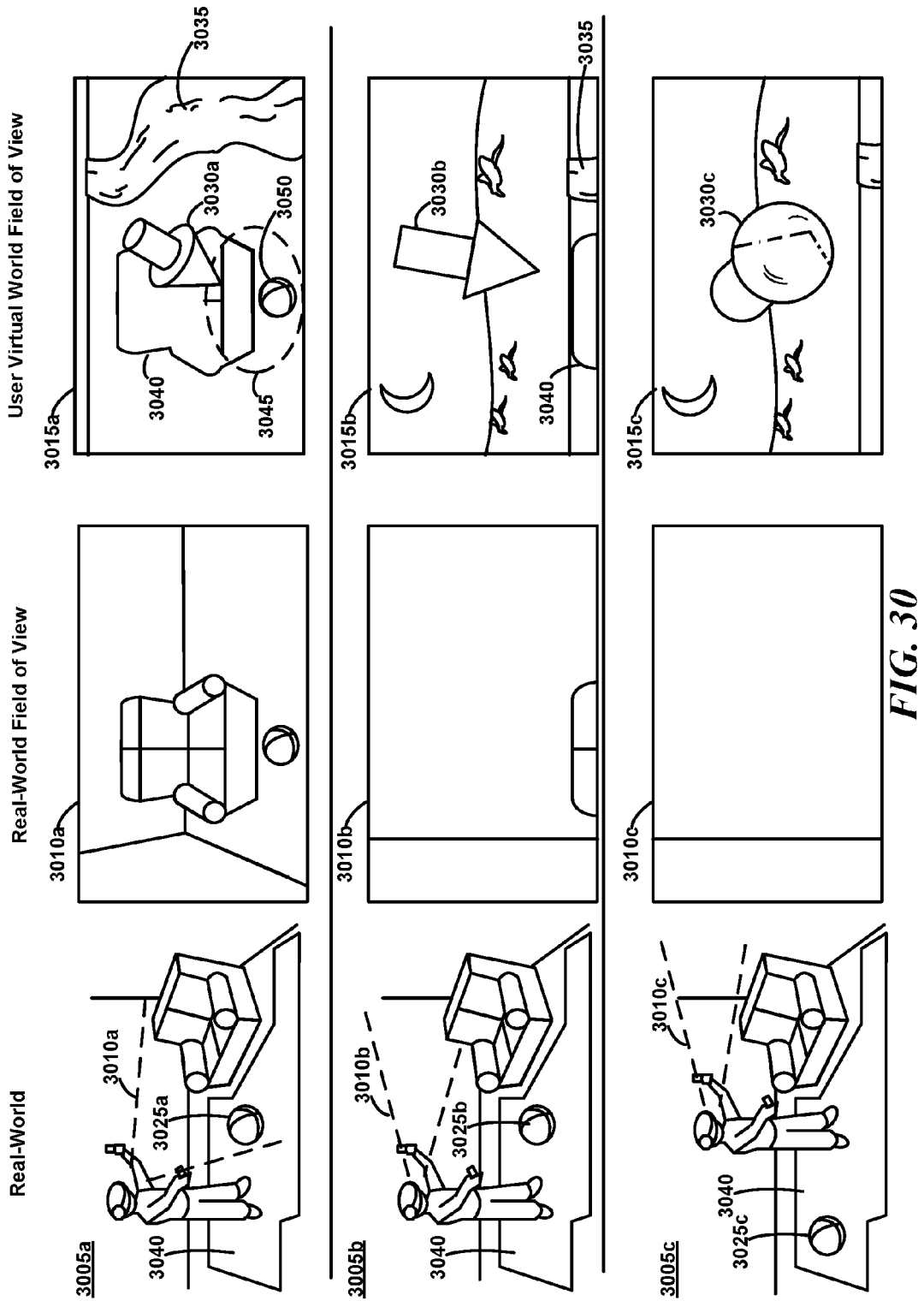
FIG. 30 is a series of views depicting a warning overlay presented to a user during a virtual application as may occur in some embodiments.

FIG. 30 is a series of views depicting a warning overlay presented to a user as may occur in some embodiments. In circumstance 3005a, the user may be engaged in a virtual application using a previously determined active region 3040, when an object, such as ball, enters the active region at position 3025a. As indicated in the user's real-world field of view 3010a, the user would be able to see the ball were they not engaged in the virtual application. Note that in some embodiments, the user's "field of view" is not the same as the depth or camera's field of view. For example, the user's gaze may vary during a virtual application as they look about their virtual environment without moving their head. Some head-mounted units include eye-tracking software and the system may infer the user's present field of view using this software. The system may then determine the interfering object's location relative to the user's field of view.

In the virtual application, the user is standing beside a river 3035 at night, while flying creatures migrate in the distance against a mountain backdrop. When an interfering object appears in the active region, the system may present an overlay in the virtual field of view 3015a to warn the user of the interference. In some embodiments, the virtual application's imagery may be made semi-transparent and/or a semi-transparent image of the real-world view superimposed. In this example, an outline 3040 of nearby real-world objects has also been provided to orient the user. The system has replaced the region 3045 of the user's field of view with the real-world image of the interfering object 3050. In contrast to the rest of the image, this portion may be entirely opaque. An arrow 3030a, may also be placed in the center of the user's field of view to direct their attention to the interfering object. In this manner, the user may be invited to remediate to interfering object, removing the object from the active region.

In some instances, the interfering object may not appear in the user's field of view. For example, in circumstance 3005b, the object's location 3025b, is outside the user's field of view 3010b. Consequently, the arrow 3030b may be adjusted in the center of the user's virtual field of view 3015b to direct the user's attention to the virtual object.

As mentioned, in some embodiments the system may include sensors in addition, or in lieu of, those appearing on the head mounted display itself. In these embodiments, and in embodiments with sensors on the back of the head-mounted system, the system may readily detect objects entering the active region from behind the user. Accordingly, in circumstance 3005c, even when the object is located at a position 3010c behind the user and outside the user's real-world field of view 3010c, the system may present the user with an arrow 3030c in the virtual field of view 3015c, directing the user to look behind themselves and remediate the interfering object. Following remediation, the system may remove the overlay and arrow. The virtual application may then resume. In some embodiments, the user may be able to trigger the real-world overlay automatically via command (e.g., so that they can locate and drink from a glass of water).

22. User Configuration Parameters and Warning Process

Figure 31:
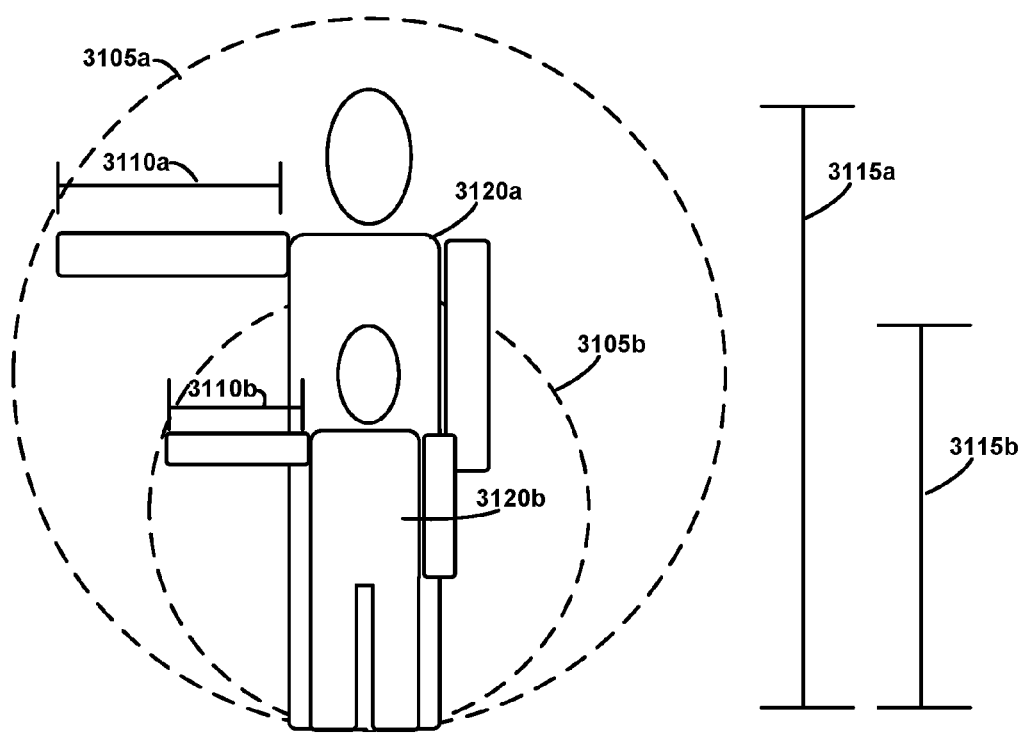
FIG. 31 illustrates relative user heights and reach ranges that may influence the active region creation process, as may occur in some embodiments.

FIG. 31 illustrates relative user heights and reach ranges that may influence the active region creation process, as may occur in some embodiments. In some embodiments, e.g., the system may ascertain the boundaries of the user's range of motion from a plurality of factors. These boundaries may then inform the necessary dimensions of the active region.

For example, the height 3115a of an adult 3120a may be correspond to a maximum reach 3110a. This reach can then inform the maximum boundary 3105a within which an adult user is likely to maneuver from a single position during the virtual application. A child 3120b may have a smaller height 3115b and smaller corresponding reach 3110b. Thus, the child may have a smaller maximum boundary 3105b than the adult.

In some embodiments, the system may use the floor plane to determine the height of the user. For example, when placed on the user's head, the system may initially calibrate based upon its perceived distance to the floor. Having thus determined height 3115a or 3115b, the system can infer the user's corresponding reach based upon average human proportions. In some embodiments, users may self-identify themselves with a unique hand or head gesture. For example, one user may rotate their head about a vertical axis, while another user moves their head in a "figure eight" motion. These gestures may serve as a "signature" so that the head mounted device can recognize the user and retrieve age, sex, and other personal information from related devices and databases. The system can then use this information to better inform the user's reach determination. In some embodiments, the reach itself may even be stored on these other devices.

Figure 32:
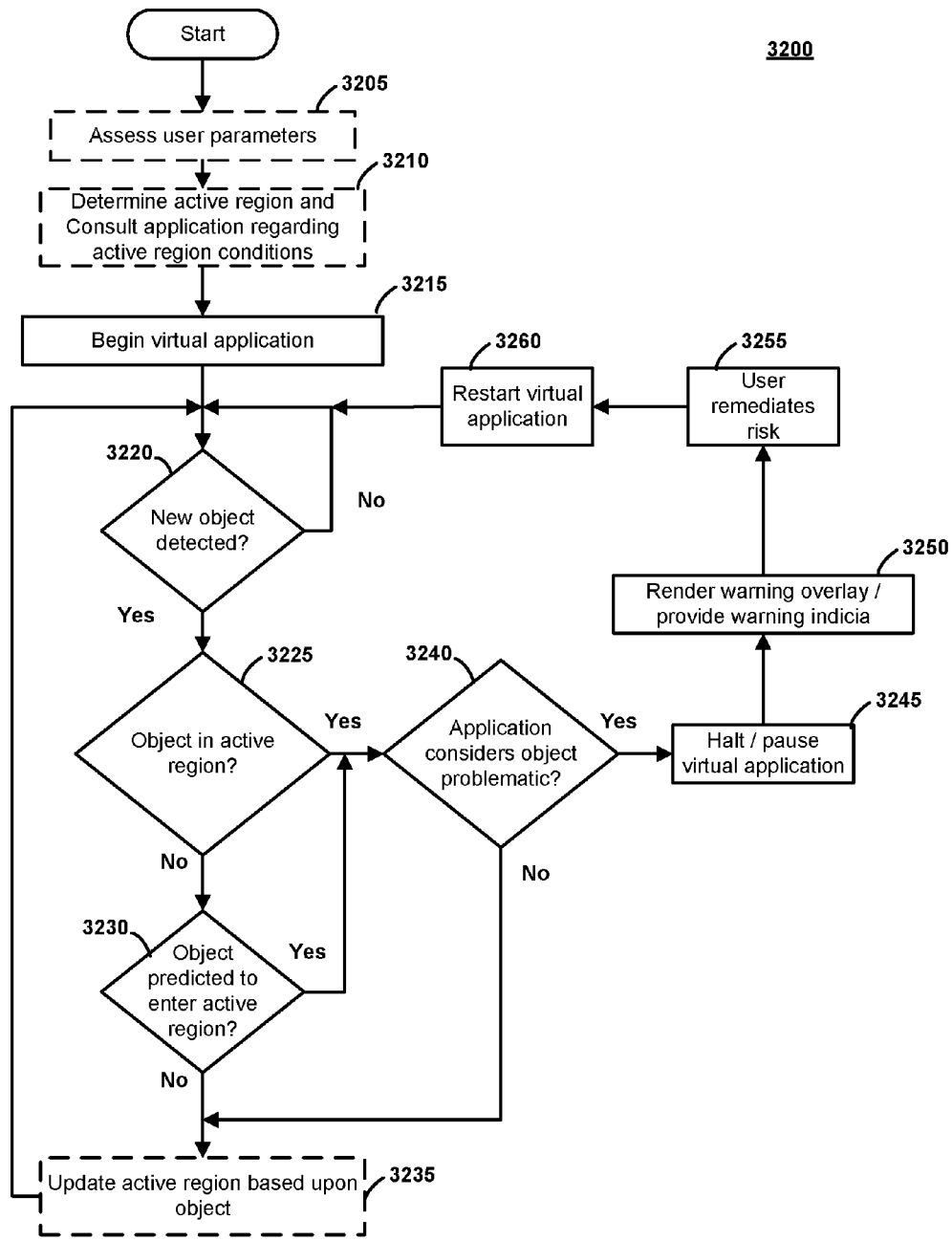
FIG. 32 is a flow diagram illustrating an example process for handling objects entering an active region during a virtual reality application, as may occur in some embodiments.

FIG. 32 is a flow diagram illustrating an example process 3200 for handling objects entering an active region during a virtual reality application, as may occur in some embodiments. At block 3205, the system may assess the user's parameters (e.g., by consulting with other devices, recognizing a user gesture, determining the distance to the floor plane, etc.). At block 3210, the system may determine an active region, while consulting with the virtual application to ascertain the application's requirements and constraints, as discussed elsewhere herein. For example, programmers developing the virtual application may specify a range of acceptable parameters (e.g., combinations of contiguous active region volume and user maximum boundaries). At block 3215, the system may begin the virtual application.

Once an interfering object has been detected at block 3220 (e.g., as an incongruity with a stored virtual model of the environment), the system may determine if the object is within the active region at block 3225, or is predicted to enter into the active region at block 3230. For example, some embodiments consider several factors, such as the velocity and acceleration of the potentially interfering object, the user's velocity and acceleration, the user's distance to the object, etc. to determine whether the object presents an issue. This analysis may be performed in consultation with the virtual application at block 3240 (e.g. a sedentary video conferencing application may view intrusions more favorably than an energetic gaming application). If the object is not determined to be an immediate threat, the system may make precautionary adjustments to the active region at block 3235.

At block 3245, the virtual application may be halted, paused, or made semi-transparent to facilitate warning the user of the problematic object. At block 3250, the system may render a warning overlay and may provide other indicia inviting the user to remove the object before continuing. For example, the system may generate sounds, music, vibrations, etc. to acquire the user's attention. The system may display the arrows and overlay as discussed herein with respect to FIG. 30.

At block 3255, the user may remediate the risk. The system may then detect the remediation automatically, or wait for the user's signal (via controller, hand gesture, etc.) that it is safe to resume, before resuming the virtual application at block 3260.

23. Computer System

Figure 33:
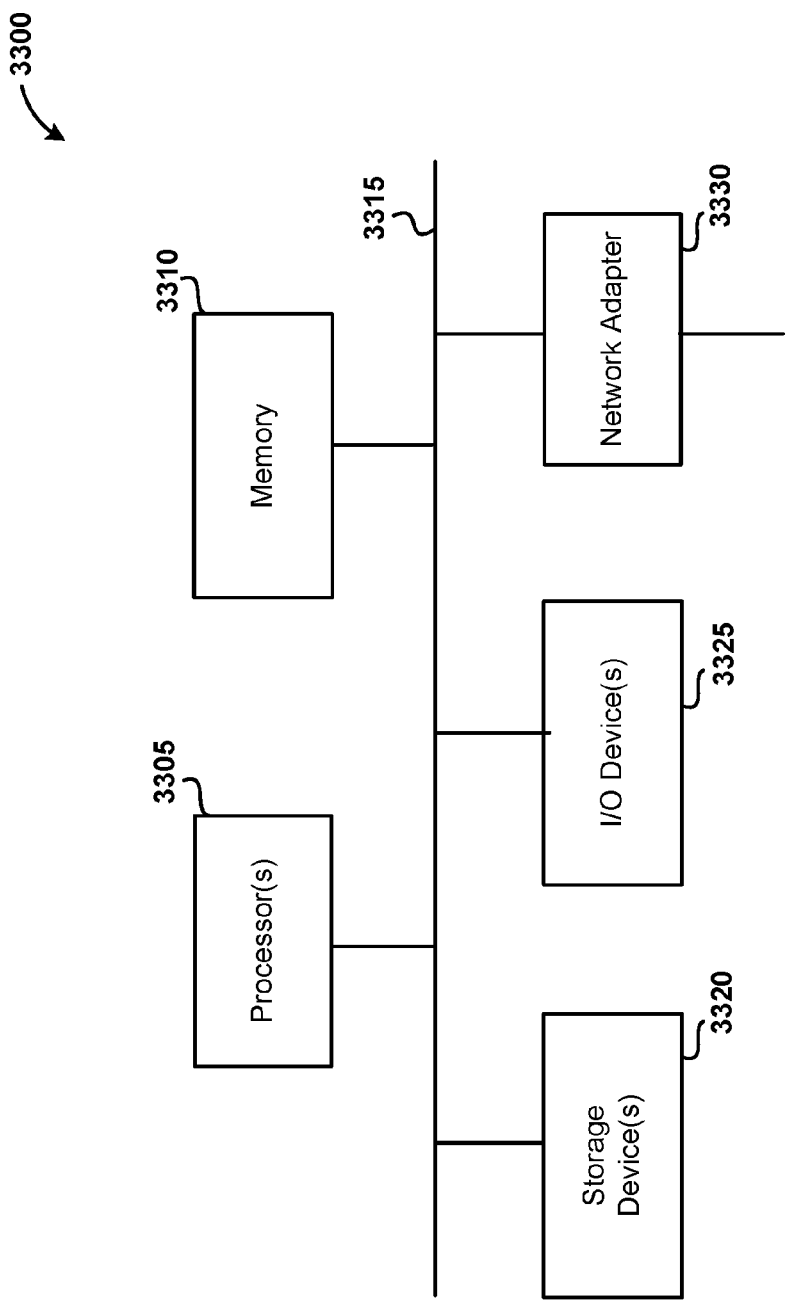
FIG. 33 is a block diagram of a computer system as may be used to implement features of some of the embodiments.

FIG. 33 is a block diagram of a computer system as may be used to implement features of some of the embodiments. The computing system 3300 may include one or more central processing units ("processors") 3305, memory 3310, input/output devices 3325 (e.g., keyboard and/or pointing devices and/or touchscreen devices, display devices, etc.), storage devices 3320 (e.g., disk drives), and network adapters 3330 (e.g., network interfaces) that are connected to an interconnect 3315. The interconnect 3315 is illustrated as an abstraction that represents any one or more separate physical buses, point to point connections, or both connected by appropriate bridges, adapters, or controllers. The interconnect 3315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 3310 and storage devices 3320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 3310 can be implemented as software and/or firmware to program the processor(s) 3305 to carry out actions described above. In some embodiments, such software or firmware may be initially provided to the processing system 3300 by downloading it from a remote system through the computing system 3300 (e.g., via network adapter 3330).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

24. Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer system for configuring an active region around a user wearing a head mounted display (HMD), comprising:
   at least one processor; and
   at least one memory comprising instructions configured to cause the at least one processor to perform a method comprising:
      receiving a frame of depth data for a real-world environment;
      incorporating the frame of depth data into a portion of a model of the real-world environment;
      determining a floor in the model;
      identifying an active region associated with the floor to a user;
      determining the existence of an object in the active region based upon the floor and the frame of depth data;
      excluding the object from the active region;
      identifying a second object from a second frame of depth data;
      determining the dimensions of the second object from a database;
      excluding a portion adjacent to the second object from the active region based upon the dimensions and constraints associated with a virtual application;
      detecting a user signature head movement;
      determining a maximum boundary associated with the user based upon a distance from the HMD to the floor and a physical characteristic associated with the user signature head movement;
      detecting a third object in the active region while a virtual application runs; and
      presenting an icon to the user identifying the position of the third object relative to the user's field of view.

2. The computer system of claim 1, wherein identifying an active region associated with the floor to a user comprises presenting a visual indication to the user within the HMD.

3. The computer system of claim 2, the method further comprising:
   receiving a user input identifying a portion of the active region to exclude; and
   adjusting the active region in response to the user input to exclude the portion of the active region.

4. The computer system of claim 3, wherein receiving a user input identifying a portion of the active region to exclude comprises detecting a hand gesture by the user.

5. The computer system of claim 3, wherein receiving a user input identifying a portion of the active region to exclude comprises receiving data from a controller moved by the user along a boundary of an obstacle.

6. The computer system of claim 1, wherein determining the existence of an object in the active region comprises determining that the object's depth values cannot be reconciled with a previously acquired portion of the model.

7. The computer system of claim 1, wherein determining the floor in the model comprises initializing a truncated signed distance function (TSDF) with a planar surface.

8. A computer-implemented method for configuring an active region around a user wearing a head mounted display (HMD) comprising:
   receiving a frame of depth data for a real-world environment;
   incorporating the frame of depth data into a portion of a model of the real-world environment;
   determining a floor in the model;
   identifying an active region associated with the floor to a user;
   determining the existence of an object in the active region based upon the floor and the frame of depth data;
   excluding the object from the active region;
   identifying a second object from a second frame of depth data;
   determining the dimensions of the second object from a database;
   excluding a portion adjacent to the second object from the active region based upon the dimensions and constraints associated with a virtual application;
   detecting a user signature head movement;
   determining a maximum boundary associated with the user based upon a distance from the HMD to the floor and a physical characteristic associated with the user signature head movement;
   detecting a third object in the active region while a virtual application runs; and
   presenting an icon to the user identifying the position of the third object relative to the user's field of view.

9. The computer-implemented method of claim 8, wherein identifying an active region associated with the floor to a user comprises presenting a visual indication to the user within the HMD.

10. The computer-implemented method of claim 9, the method further comprising:
receiving a user input identifying a portion of the active region to exclude; and
adjusting the active region in response to the user input to exclude the portion of the active region.

11. The computer-implemented method of claim 10, wherein receiving a user input identifying a portion of the active region to exclude comprises detecting a hand gesture by the user.

12. The computer-implemented method of claim 10, wherein receiving a user input identifying a portion of the active region to exclude comprises receiving data from a controller moved by the user along a boundary of an obstacle.

13. The computer-implemented method of claim 8, wherein determining the existence of an object in the active region comprises determining that the object's depth values cannot be reconciled with a previously acquired portion of the model.

14. The computer-implemented method of claim 8, wherein determining the floor in the model comprises initializing a truncated signed distance function (TSDF) with a planar surface.

15. A non-transitory computer-readable medium comprising instructions configured to cause a processor to perform a method for configuring an active region around a user wearing a head mounted display (HMD), the method comprising:
receiving a frame of depth data for a real-world environment;
incorporating the frame of depth data into a portion of a model of the real-world environment;
determining a floor in the model;
identifying an active region associated with the floor to a user;
determining the existence of an object in the active region based upon the floor and the frame of depth data;
excluding the object from the active region;
identifying a second object from a second frame of depth data;
determining the dimensions of the second object from a database;
excluding a portion adjacent to the second object from the active region based upon the dimensions and constraints associated with a virtual application;
detecting a user signature head movement;
determining a maximum boundary associated with the user based upon a distance from the HMD to the floor and a physical characteristic associated with the user signature head movement;
detecting a third object in the active region while a virtual application runs; and
presenting an icon to the user identifying the position of the third object relative to the user's field of view.

16. The non-transitory computer-readable medium of claim 15, wherein identifying an active region associated with the floor to a user comprises presenting a visual indication to the user within the HMD.

17. The non-transitory computer-readable medium of claim 16, the method further comprising:
receiving a user input identifying a portion of the active region to exclude; and
adjusting the active region in response to the user input to exclude the portion of the active region.

18. The non-transitory computer-readable medium of claim 17, wherein receiving a user input identifying a portion of the active region to exclude comprises detecting a hand gesture by the user.

19. The non-transitory computer-readable medium of claim 17, wherein receiving a user input identifying a portion of the active region to exclude comprises receiving data from a controller moved by the user along a boundary of an obstacle.

\* \* \* \* \*